United States Patent [19]
Houjou et al.

[11] Patent Number: 6,038,236
[45] Date of Patent: Mar. 14, 2000

[54] TRANSMISSION CONTROL METHOD IN NETWORK SYSTEM FOR SIGNAL TRANSMISSION BY PLURAL CHANNELS AND NETWORK SYSTEM THEREFOR

[75] Inventors: Kazuhiko Houjou, Kawasaki; Mitsuru Yamamoto, Yokohama, both of Japan

[73] Assignee: Canon Kabushiki Kaisha, Tokyo, Japan

[21] Appl. No.: 08/792,797

[22] Filed: Feb. 3, 1997

[30] Foreign Application Priority Data

| Feb. 9, 1996 | [JP] | Japan | .................................... 8-017432 |
| Feb. 9, 1996 | [JP] | Japan | .................................... 8-017433 |
| Jan. 27, 1997 | [JP] | Japan | .................................... 9-012593 |

[51] Int. Cl.[7] ................................................. H04J 14/00
[52] U.S. Cl. ............................................................. 370/465
[58] Field of Search ........................................ 370/464, 465, 370/468, 351, 400, 408, 386, 420, 463, 412, 418, 431, 437, 462; 375/260; 359/119, 117, 120, 118, 124, 125, 135, 137

[56] References Cited

U.S. PATENT DOCUMENTS

| 4,831,616 | 5/1989 | Huber | ...................................... 359/137 |
| 5,541,657 | 7/1996 | Yamamoto et al. | ...................... 348/388 |
| 5,631,902 | 5/1997 | Yoshifuji | .................................. 370/464 |

FOREIGN PATENT DOCUMENTS 8-237306  9/1996  Japan .

Primary Examiner—Huy D. Vu
Attorney, Agent, or Firm—Fitzpatrick, Cella, Harper & Scinto

[57] ABSTRACT

In a network system for effecting signal transmission by plural channels, there are provided plural channel alteration units each of which is adapted to receive signals through plural channels and to output each of the signals entered by said plural channels in any of plural channels. Transmission control is executed in such a manner that mutually proximate plural signals, which have to be outputted by a designated same channel among the plural channels from a first one of the plural channel alteration units, are entered through respectively different channels into the first channel alteration unit. As the first channel alteration unit receives the plural signals by different channels, there can be resolved the drawback of a long waiting time for the output of the signals by a desired channel, encountered in case the signals are entered by a signal channel.

33 Claims, 32 Drawing Sheets

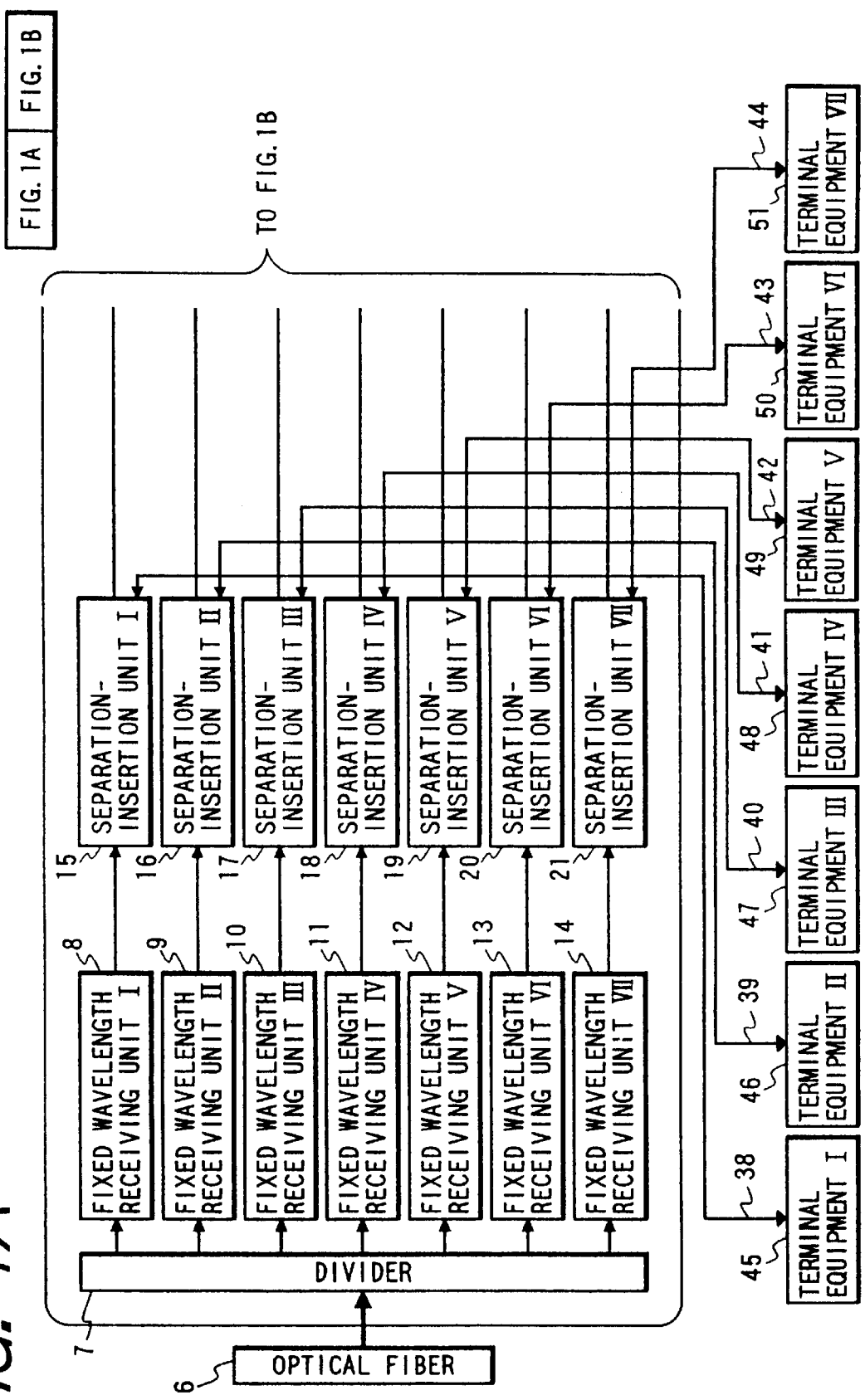

FIG. 8

| OPERATION TIME / NODE DEVICE | T1 | T2 | T3 | T4 | T5 | T6 | T7 | T8 | T9 | T10 | T11 | T12 | T13 | T14 | T15 | T16 | T17 | T18 | T19 | T20 | T21 | T22 | T23 |
|---|---|---|---|---|---|---|---|---|---|---|---|---|---|---|---|---|---|---|---|---|---|---|---|
| ROM IN NODE DEVICE I | 0 | 1 | 2 | 3 | | | | | | | | | | | | | | | | | | | |
| ROM IN NODE DEVICE II | | | 6 | 0 | 1 | 2 | 3 | | | | | | | | | | | | | | | | |
| ROM IN NODE DEVICE III | | | | | 3 | 4 | 5 | 6 | 0 | 1 | | | | | | | | | | | | | |
| ROM IN NODE DEVICE IV | | | | | | | 3 | 4 | 5 | 6 | 0 | 1 | 2 | 3 | 4 | 5 | 6 | 0 | 1 | 2 | 3 | 4 | |
| ROM IN NODE DEVICE V | | | | | | | | | 6 | 0 | 1 | 2 | 3 | 4 | 5 | 6 | 0 | 1 | 2 | 3 | 4 | 5 | 6 |

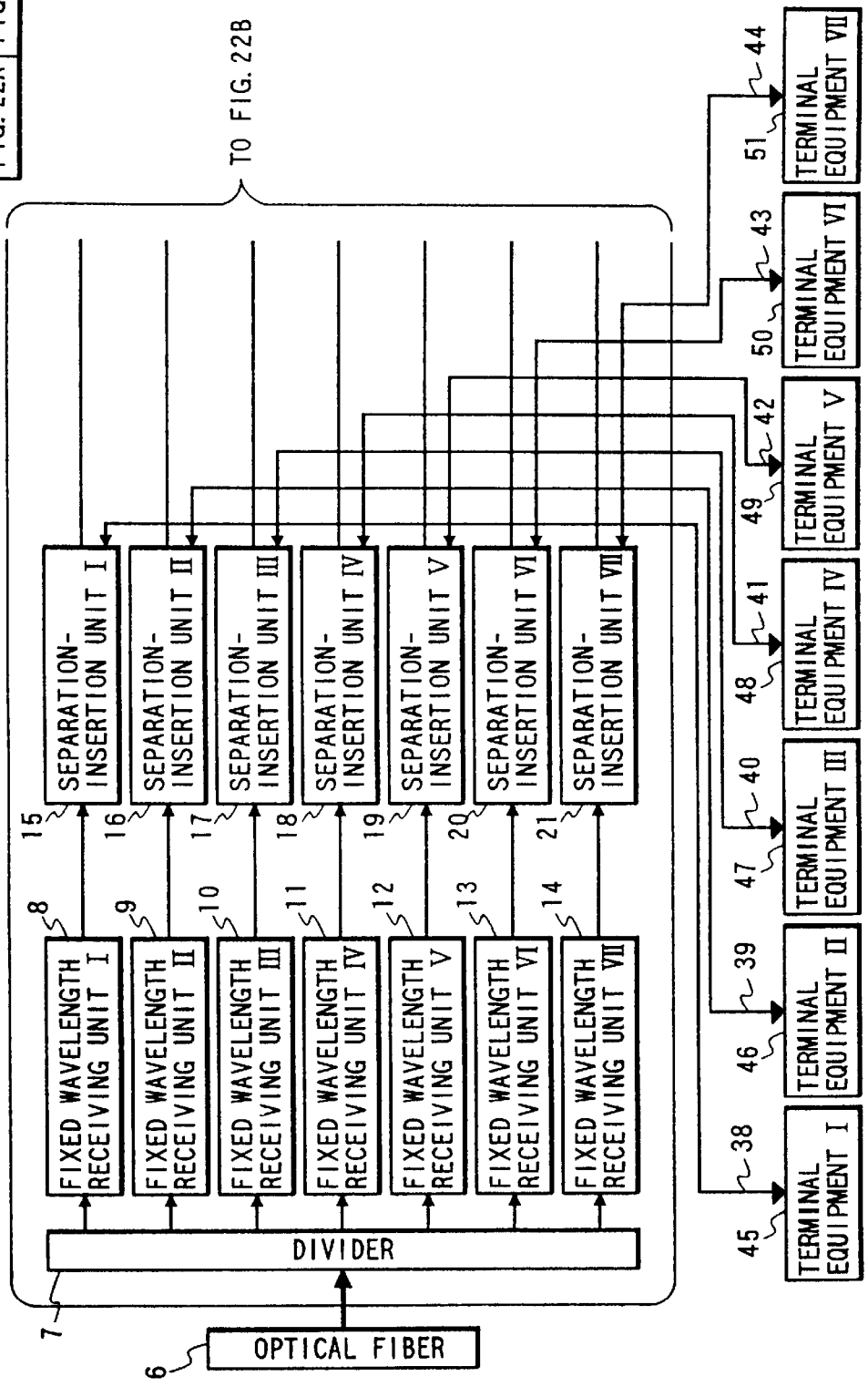

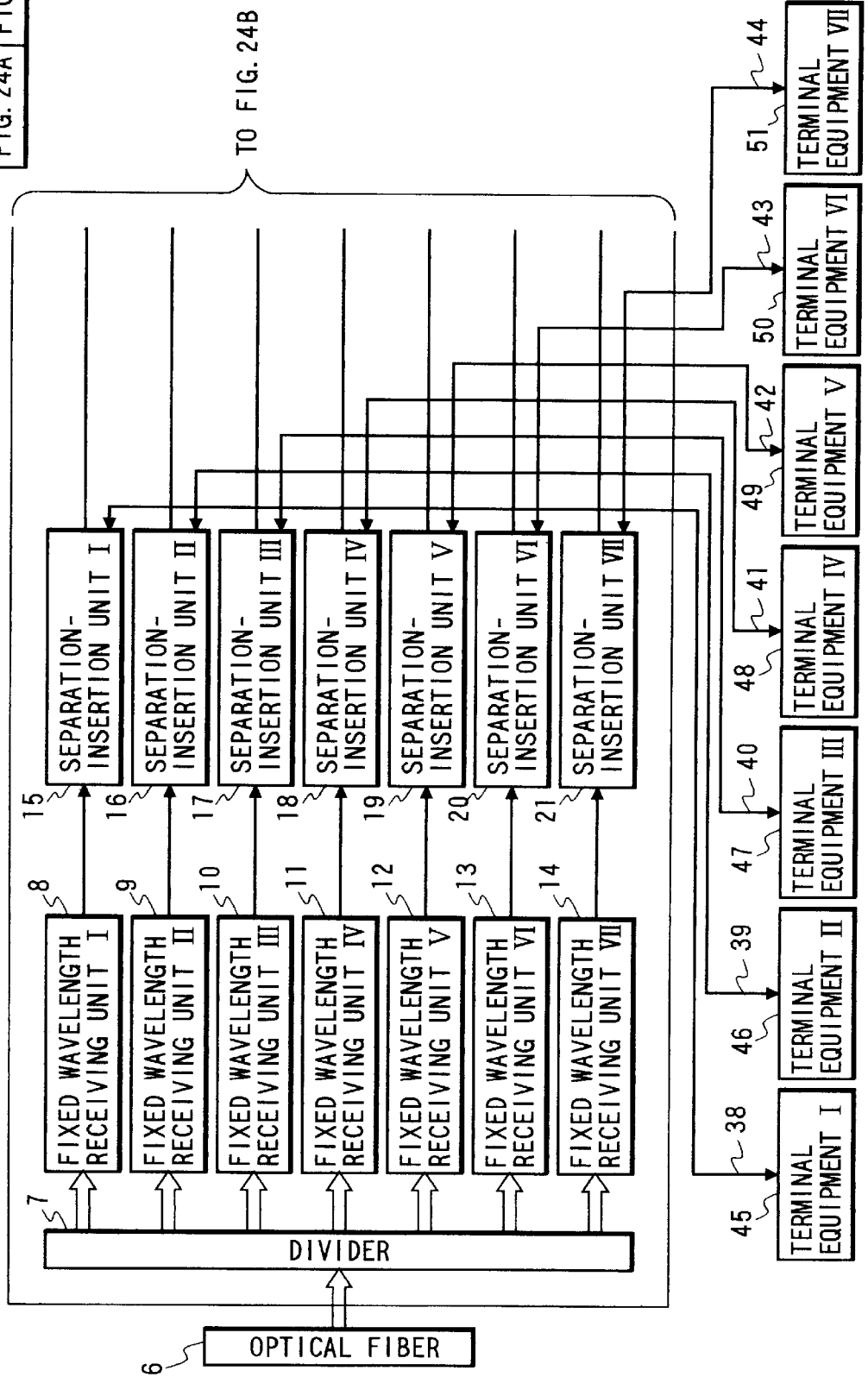

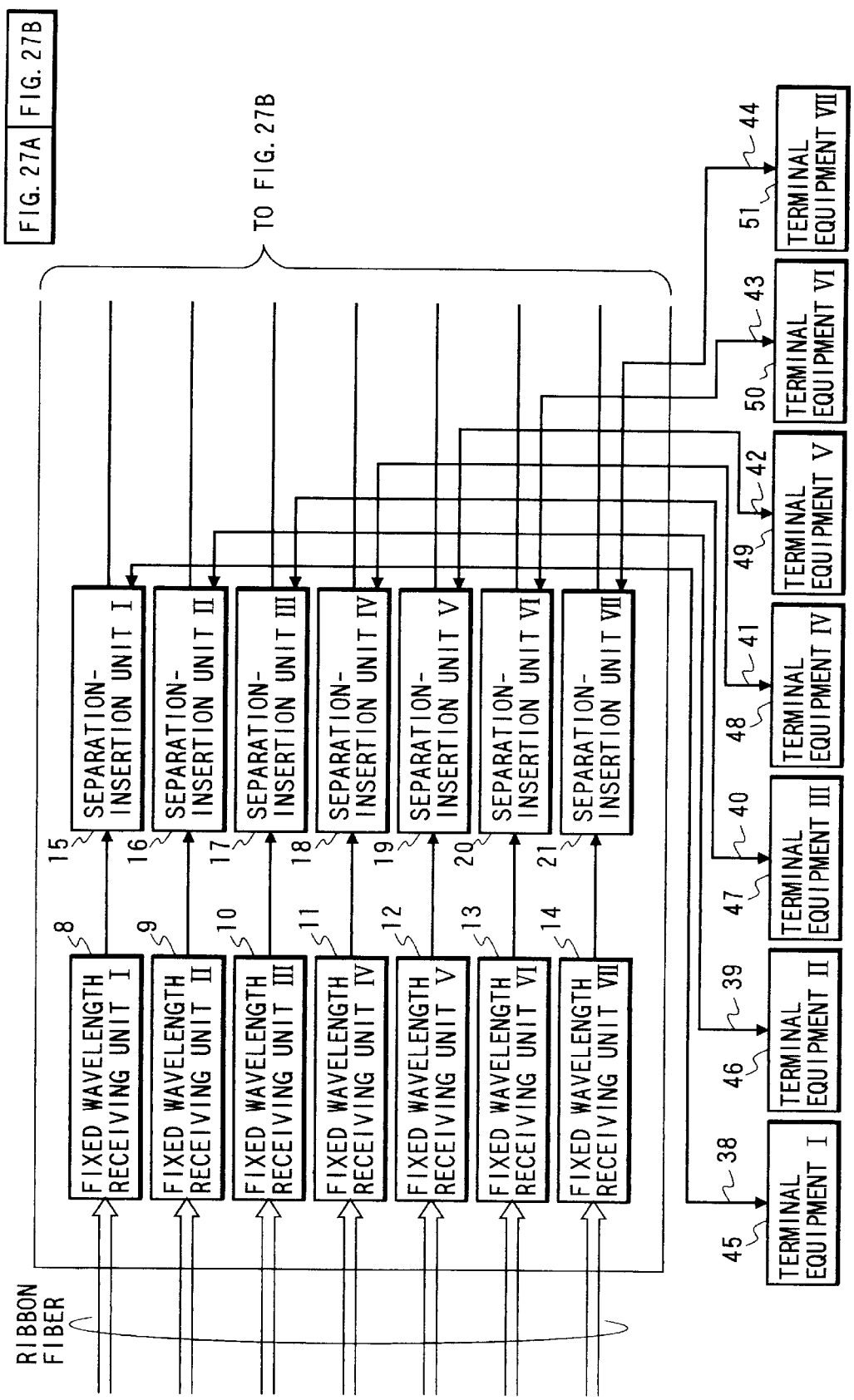

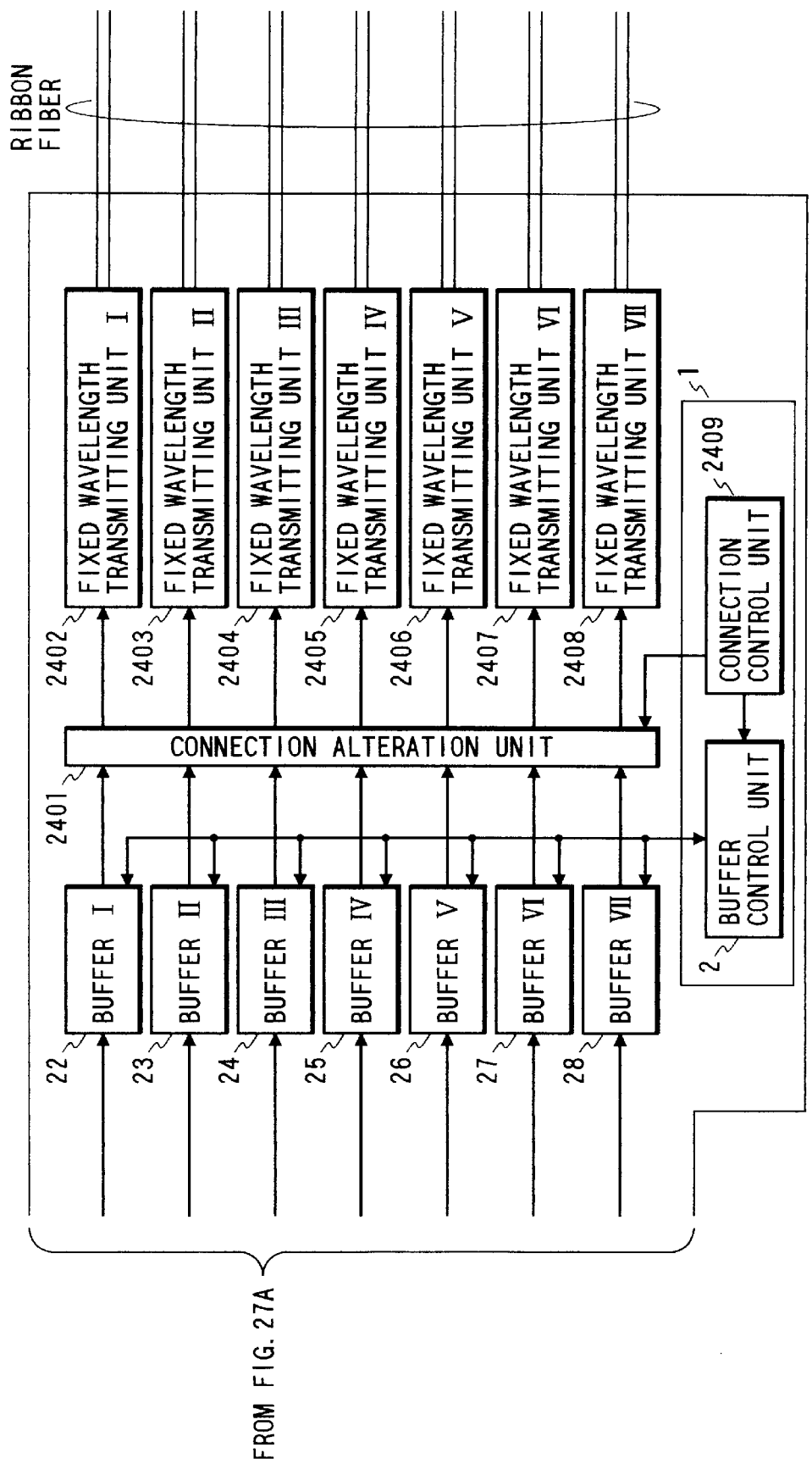

TRANSMISSION CONTROL METHOD IN NETWORK SYSTEM FOR SIGNAL TRANSMISSION BY PLURAL CHANNELS AND NETWORK SYSTEM THEREFOR

BACKGROUND OF THE INVENTION

1. Field of the Invention

The present invention relates to a network system and a transmission control method, and more particularly to a network system of a configuration with plural node devices connected with plural channels. More specifically it relates to a network system of a configuration in which plural terminal equipments are respectively connected to the plural channels through each of the node devices.

2. Related Background Art

Recently, active development has been conducted on the network systems for effecting communication by connecting plural pieces of terminal equipment, and there are already known various configurations such as a bus-type configuration in which the plural terminal equipments are connected to a bus line, a ring-type configuration in which the terminal equipments are connected to a ring-shaped transmission path, and a star-type configuration in which the terminal equipment are connected through active or passive couplers. Also for increasing the transmission capacity, there is known a multi-channel configuration in which node devices, to which the terminal equipment are connected, are connected with plural channels. Also a configuration utilizing lights of mutually different wavelengths as the plural channels and multiplexing such lights is known as a wavelength-division-multiplexed network system.

The present invention relates in particular to a network system of a configuration in which the node devices are connected with plural channels.

In the conventionally known network systems utilizing plural channels, a large switching device has to be employed for the transmission control of the signals, in order to process the signals transmitted in the plural channels.

An object of the present invention is to provide a network system and a transmission control method, facilitating such control.

SUMMARY OF THE INVENTION

Prior to the explanation of the configuration of the present invention, there will be explained, as a reference example, the configuration disclosed in the Japanese Patent Laid-Open Application No. 8-237306.

Referring to FIGS. 16A and 16B, a control unit 93 for the node devices of this reference example is provided therein with a buffer control unit 94 and a wavelength control unit 5. The buffer control unit 94 is provided with a buffer reading control unit 3 for effecting the read control of the buffer, in case a sub-transmission path used for the destination of transmission of a packet stored in the buffer is connected to an adjacent node device, so as not to read such packet from the buffer until the wavelength received by a fixed wavelength receiving unit of the adjacent node device which is adapted to output the packet to a separation-insertion unit to which the sub-transmission path of the destination is connected coincides with a transmission wavelength of a variable wavelength transmitting unit for transmitting such packet in the adjacent node device. The wavelength control unit 5 controls the transmission wavelength of the variable wavelength transmitting means according to the pattern of a predetermined transmission wavelength control table to be explained later. An optical fiber 6 that is an optical wavelength division multiplexing transmission path serves as a transmission path between a wavelength multiplexer of an upstream adjacent node device and a divider of the local (self) node device. A divider 7 divides optical signals transmitted through the optical fiber 6 and sends them to seven fixed wavelength receiving units. Numerals 8 to 14 indicate fixed wavelength receiving units I–VII constituting fixed wavelength receiving means, each of which is composed of an optical filter of a fixed wavelength and a photodiode, and each of which only receives a packet of optical signals with one of wavelengths $\lambda 1$ to $\lambda 7$. Numerals 15 to 21 indicate separation-insertion units I–VII constituting separation-insertion means, which serve to separate a packet flow from the fixed wavelength receiving units 8–14 into packets to be transmitted to respective sub-transmission paths and those to be sent to the buffers, and to insert packets, transmitted from the respective sub-transmission paths, into the packet flow supplied from the fixed wavelength receiving units 8–14 to the buffers. Numerals 95–101 indicate buffers I–VII constituting buffer means and serving to temporarily storing the packets, released from the separation-insertion units 15–21, in memory regions respectively corresponding to the transmission wavelengths of the variable wavelength transmitting units. Numerals 29–35 indicate variable wavelength transmitting units I–VII constituting variable wavelength transmitting means utilizing tunable laser diodes (TLD) and serving to convert the packets, released from the buffer units 95–101, into optical signals of predetermined wavelengths among the wavelengths $\lambda 1–\lambda 7$ under the control of the wavelength control unit 5, for transmission through a wavelength multiplexer 36 to an optical fiber 37 constituting an optical wavelength division multiplexing transmission path. In the present embodiment, the fixed wavelength receiving unit I 8, the separation-insertion unit I 15, the buffer I 95 and the variable wavelength transmitting unit I 29 are combined as a set, and the packet received in the fixed wavelength receiving unit I 8 is processed only in this set. Similarly the fixed wavelength receiving unit II 9, the separation-insertion unit II 16, the buffer II 96 and the variable wavelength transmitting unit II 30 are combined as a set, and other fixed wavelength receiving units, separation-insertion units, buffers and variable wavelength transmitting units are also combined similarly. A wavelength multiplexer 36 multiplexes the optical signals of wavelengths $\lambda 1–\lambda 7$ released from the seven variable wavelength transmitting units, and emits the multiplexed optical signal to the optical fiber 37. The optical fiber 37, constituting an optical wavelength division multiplexing transmission path, serves as the transmission path between the wavelength multiplexer 36 of the local (self) node device and the divider 37 of the downstream adjacent node device. Numerals 38–44 are sub-transmission paths I–VII serving as packet transmission paths between the separation-insertion units 15–21 and terminal equipment. Numerals 45–51 indicate terminal equipment units I–VII respectively connected to the sub-transmission paths I 38–VII 44, serving to receive the packets released from the separation-insertion units 15–21, and to prepare packets to be transmitted to other units of terminal equipment, and to transmit them to the separation-insertion units 15–21 through the sub-transmission paths 38–44.

FIG. 2 shows an example of configuration of a network system utilizing the node devices shown in FIGS. 16A and 16B, wherein five node devices are connected through optical fibers. Numerals 57–61 indicate node devices shown in FIGS. 16A and 16B, each of which is connected to seven terminal equipment units through seven sub-transmission paths. Numerals 52–56 indicate optical fibers constituting the optical wavelength division multiplexing transmission paths.

FIG. 17 shows the internal configuration of the buffers I 95–VII 101 employed in the node devices. The buffers I–VII have an identical internal configuration. In FIG. 17, a decoder 102 reads an address portion of the input packet, discriminates whether the destination of the packet is a sub-transmission path connected to an adjacent node device, and, if not, instructs a demultiplexer 105 so as to direct the output thereof to a FIFO 107. On the other hand, if the destination of the packet is a sub-transmission path connected to the adjacent node device, the decoder 102 instructs the demultiplexer 105 so as to direct the output thereof to a dual-port memory 106 and instructs a write address counter 103 of a write start address of a memory region assigned to the packet.

A write address counter 103 supplies the dual port memory 106 with identification signals of the memory regions in which the packets are to be written, in succession from the write start address released from the decoder 102. The memory region of the dual port memory 106, where the packet is to be stored, is related with the destination terminal equipment of the packet. For example, in case the packet destination is a terminal equipment II 46 connected to the adjacent node device, in order that the packet can reach such terminal equipment II 46 which is connected to the separation-insertion unit II 16, the packet has to be entered as the optical signal of wavelength $\lambda 2$ in the fixed wavelength receiving unit II 9 connected to the separation-insertion unit II 16 in the node device, and for conversion into the optical signal of wavelength $\lambda 2$, the packet has to be stored in the memory region II in the dual port memory 106.

A read address counter 104 supplies the dual port memory 106 with address signals for reading the packets, in succession starting from a read start address represented by an offset value released from the buffer reading control unit 3.

A demultiplexer 105 sends the input packet either to the dual port memory 106 or to the FIFO 107, according to the instruction from the decoder 102. The dual port memory 106 is provided for effecting the writing and the reading of the packet data in mutually independent manner, and is provided with memory regions in such a manner that the transmission packets correspond to the wavelengths of the optical signals to be converted. For example, a packet stored in a memory region IV is read only when the transmission wavelength of the variable wavelength transmitting unit is set at the wavelength $\lambda 4$, and is transmitted thereby as the optical signal of wavelength $\lambda 4$. The packet stored in each memory region is converted into the optical signal of a wavelength corresponding to each memory region and released from the node device. The head addresses of the memory regions I–VII are respectively A1, A2, A3, A4, A5, A6 and A7.

A FIFO (first-in-first-out) register 107 temporarily stores the input packets and releases them in the order of input to a selector 108, which connects either one of output terminals of the dual port memory 106 and the FIFO 107 to the variable wavelength transmitting unit according to the instruction from the buffer reading control unit 3.

FIG. 5 shows the configuration of the buffer reading control unit 3 in the buffer control unit 94, wherein numerals 76–82 indicate buffer control tables I–VII, which are read in succession by the addresses released from the wavelength control unit 5 and send the read predetermined offset values to a read address counter 104 for the buffers I–VII. These tables are composed of read-only memories (ROM), and have contents to be explained later. A reading control unit 83 sends a read control signal, for reading the packet either from the dual port memory 106 or from the FIFO 107, to the buffers I 95–VII 101, by counting clock signals released from the wavelength control unit.

FIG. 7 shows the internal configuration of the wavelength control unit 5, wherein numerals 85–91 indicate wavelength control tables I–VII, which are read in succession by the addresses released from a ROM counter 84 to send predetermined wavelength control signals to a drive unit of the variable wavelength transmitting unit. These wavelength control tables are composed of a read-only memory (ROM) and have contents to be explained later. A clock generator 92 generates a predetermined clock signal for supply to the buffer control unit, and divides the frequency of the clock signal, for supply to the ROM counter.

The contents of the above-mentioned wavelength control tables I–VII indicate the transition of the wavelengths of the optical signals transmitted by the variable wavelength transmitting unit, and are set, as an example, as shown in Table 1, wherein numerals 1–7 respectively stand for the wavelengths $\lambda 1-\lambda 7$.

TABLE 1

| Table name | Address | | | | | | |
| --- | --- | --- | --- | --- | --- | --- | --- |
| | 0 | 1 | 2 | 3 | 4 | 5 | 6 |
| Wavelength control table I | 1 | 3 | 5 | 7 | 6 | 4 | 2 |
| Wavelength control table II | 3 | 5 | 7 | 6 | 4 | 2 | 1 |
| Wavelength control table III | 5 | 7 | 6 | 4 | 2 | 1 | 3 |
| Wavelength control table IV | 7 | 6 | 4 | 2 | 1 | 3 | 5 |
| Wavelength control table V | 6 | 4 | 2 | 1 | 3 | 5 | 7 |
| Wavelength control table VI | 4 | 2 | 1 | 3 | 5 | 7 | 6 |
| Wavelength control table VII | 2 | 1 | 3 | 5 | 7 | 6 | 4 |

Also the offset values corresponding to the address value in the aforementioned buffer control tables I–VII are set as shown in Table 2.

TABLE 2

| Table name | Address | | | | | | |
| --- | --- | --- | --- | --- | --- | --- | --- |
| | 0 | 1 | 2 | 3 | 4 | 5 | 6 |
| Buffer control table I | A1 | A3 | A5 | A7 | A6 | A4 | A2 |
| Buffer control table II | A3 | A5 | A7 | A6 | A4 | A2 | A1 |
| Buffer control table III | A5 | A7 | A6 | A4 | A2 | A1 | A3 |
| Buffer control table IV | A7 | A6 | A4 | A2 | A1 | A3 | A5 |
| Buffer control table V | A6 | A4 | A2 | A1 | A3 | A5 | A7 |
| Buffer control table VI | A4 | A2 | A1 | A3 | A5 | A7 | A6 |
| Buffer control table VII | A2 | A1 | A3 | A5 | A7 | A6 | A4 |

These wavelength control tables and buffer control tables, fourteen in total number, are read in synchronization by the ROM counter 84, whereby the transmission wavelength of each tunable laser diode (TLD) is cyclically shifted in the order of $\lambda 1, \lambda 3, \lambda 5, \lambda 7, \lambda 6, \lambda 4, \lambda 2, \lambda 1, \ldots$, and the offset value for reading the memory region in the dual port memory of the buffer connected to each tunable laser diode synchronized with this transition is also cyclically shifted in the order of A1, A3, A5, A7, A6, A4, A2, A1, . . . Thus, according to these wavelength control tables and the buffer control tables, the packet in the memory region corresponding to the cyclically shifted transmission wavelength of the variable wavelength transmitting unit is released so as to be converted into an optical signal of the current transmission wavelength of the variable wavelength transmitting unit.

The cyclic transitions of the transmission wavelength of the tunable laser diodes are mutually shifted in phase, in order that the transmission in a given wavelength is not simultaneously conducted by plural tunable laser diodes. The transmission wavelength of the variable wavelength transmitting units are controlled by the wavelength control tables I–VII set in the above-explained manner.

In the following there will be explained the transmission control method of the present network system, with reference to FIGS. 2, 4, 5, 7, 16A and 16B, and 17, Tables 1 and 2, and timing charts in FIGS. 8, 9, 10, 18, 19 and 20. The operation times shown in FIGS. 8, 9, 10, 18, 19 and 20 are common in these timing charts. For example, an operation T3 in FIG. 8 is same as that in FIG. 9.

Now the function of the transmission control method is explained by an example of transmission of a packet dispatched from a terminal equipment I 45, connected to the sub-transmission path I 38 of the node device I 57, and having the destination at a terminal equipment II 46 connected to the sub-transmission path II 39 of the node device V 61. In the following there will be explained the transmission of three packets A, B and C. For the purpose of clarity, equivalent components in the different node devices are represented by same numbers as those in FIGS. 4, 5, 7, 16A and 16B, and 17.

The operations of the node devices I 57–V 61 at different operation times will be explained with respective reference to FIGS. 9, 10, 18, 19 and 20. Also it is assumed that the addresses (sync signals) from the ROM counter 84 for reading the buffer control tables and the wavelength control tables in the node device are independent in each node device, as shown in FIG. 8. Thus the read address values from the ROM counter 84 of the wavelength control unit 5 is displaced in phase, among the different node devices. Also these address values are given in FIG. 8 only for periods corresponding to the operation times of the packet relaying functions of the different node devices in the relevant drawings and are omitted in other periods. For example, in this reference example, the packet relaying operation of the node device II 58 is explained in a period from an operation time T3 to an operation time T7 in FIG. 9, so that the address values for the node device II 58 in FIG. 8 are given only in a corresponding period.

In the following there will be explained the communicating operation of the node device I 57 with reference to FIG. 9. At the start of an operation time T1, the terminal equipment I 45 connected to the sub-transmission path I 38 of the source node device I 57 adds, to the transmission data, the address of the terminal equipment II 46 connected to the sub-transmission path II 39 of the destination node device V 61, and releases a packet A through the sub-transmission path I 38 to the separation-insertion unit I 15 of the node device I 57.

In the operation time T1, the separation-insertion unit I 15 of the node device I 57 finds a gap in the packet flow received by the fixed wavelength receiving unit I 8, and sends the packet A, entered through the sub-transmission path I 38, to the buffer I 95 by inserting the packet A into such gap. In the operation time T1, the decoder 102 of the buffer I 95 reads the address portion of the entered packet A. Since the destination of the packet A is not the terminal equipments connected to the adjacent node device II 58, the decoder 102 directs the output of the demultiplexer 105 to the FIFO 107, whereby the packet A is written therein.

In an operation time T2, the separation-insertion unit I 15 of the node device I 57 finds a gap in the packet flow received by the fixed wavelength receiving unit I 8, and sends a packet B, entered through the sub transmission path I 38, to the buffer I 95 by inserting the packet B into such gap. In the operation time T2, the decoder 102 of the buffer I 95 reads the address portion of the entered packet B. Since the destination of the packet B is not the terminal equipments connected to the adjacent node device II 58, the decoder 102 directs the output of the demultiplexer 105 to the FIFO 107 whereby the packet B is written therein.

In the operation time T2, the ROM counter 84 of the wavelength control unit 5 sends a read address value 1 simultaneously to the wavelength control tables I 85–VII 91 (cf. FIG. 8), for reading the contents of the wavelength control tables. In this content reading, as shown in Table 1, the wavelength control tables I, II, III, IV, V, VI and VII respectively provide control signals corresponding to wavelengths $\lambda 3, \lambda 5, \lambda 7, \lambda 6, \lambda 4, \lambda 2$ and $\lambda 1$. These control signals are respectively supplied to the variable wavelength transmitting units I 29–VII 35, which in response emit optical signals of predetermined wavelengths.

The read address value 1 from the ROM counter 84 of the wavelength control unit 5 is also supplied to the buffer control tables I–VII of the buffer control unit 94, for reading the contents of the buffer control tables. In this content reading, as shown in Table 2, the buffer control tables I, II, III, IV, V, VI and VII respectively provide offset values A3, A5, A7, A6, A4, A2 and A1 respectively corresponding to the memory regions III, V, VII, VI, IV, II and I. These offset values are respectively supplied to the read address counters 104 of the buffers I 95–VII 101.

Also in the operation time T2, the read control unit 83 of the buffer control unit 94 provides, based on the clock signal released from the wavelength control unit 5, the selector 108 with a control signal for enabling the reading of the dual port memory 106 and disabling the reading of the FIFO 107 in a predetermined dual port memory reading time Td within the operation time T2, and then provides the selector 108 with a control signal for enabling the reading of the FIFO 107 and disabling the reading of the dual port memory 106 in a predetermined FIFO reading time Tf (=T−Td). Thus the input terminal of the selector 108 is connected to either one of the FIFO 107 and the dual port memory 106.

In the dual port memory reading time Td within the operation time T2, the read address counter 104 in the buffer I 95 generates, for supply to the dual port memory 106, an address for reading the packet written in the memory region III, by loading the offset value A3 released from the buffer control table I 76 and by successive increments of the count. In response to this read address, a packet is read from the output port of the dual port memory 106 and is supplied to the variable wavelength transmitting unit I 29. Since no packet is stored in the memory region III of the buffer I 95 in the operation time T2, no packet is supplied to the variable wavelength transmitting unit I 29.

In this example, however, for the purpose of understanding, there will be explained a case of reading only one packet in the times Td and Tf.

In the FIFO reading time Tf (=operation time T−Td) within the operation time T2, the read control unit 83 in the buffer reading control unit 3 sends a control signal, for enabling the reading of the FIFO 107 and disabling the reading of the dual port memory 106, to the selector 108, which in response sends the packet A, stored in the FIFO 107, to the variable wavelength transmitting unit I 29. Since the transmission wavelength of each variable wavelength transmitting unit is constant within each operation time T, regardless of the time Tf or Td, the packet A is converted into an optical signal of wavelength λ3 by the variable wavelength transmitting unit I 29 and supplied to the wavelength multiplexer 36.

Also the variable wavelength transmitting units II 30–VII 35 respectively convert the packets released from the buffers II 96–VII 101 into optical signals of predetermined wavelength, based on the wavelength control signal from the wavelength control unit 5 and sends these optical signals to the wavelength multiplexer 36. As explained in the foregoing, the optical signals released from the variable wavelength transmitting units II 30, III 31, IV 32, V 33, VI 34 and VII 35 respectively have wavelengths λ5, λ7, λ6, λ4, λ2, and λ1. Since the optical signals released from the seven variable wavelength transmitting units have mutually different wavelengths under the control of the wavelength control unit 5, these optical signals are mixed without mutual interference in the wavelength multiplexer 36, whereby the lights of all the wavelengths enter the optical fiber 37 and are transmitted to the downstream adjacent node device II 58.

In an operation time T3, a packet C is inserted into the packet flow in the separation-insertion unit I 15, and is stored in the FIFO 107 in the buffer I 95 in the same manner as the packet B.

In the operation time T3, the packet is read from the buffer and transmitted in the following manner. A read address value 2 (cf. FIG. 8) is supplied from the ROM counter 84 of the wavelength control unit 5, simultaneously to the wavelength control tables I–VII for reading the contents thereof. The transmission wavelength of the variable wavelength transmitting unit I 29 is set at λ5.

In the dual port memory read time Td within the operation time T3, the read address counter 104 of the buffer I 95 loads the offset value A5 released from the buffer control table I 76 and generates an address for reading the packet written in the memory region V, for supply to the dual port memory 106. According to the read address, the packet is read from the output port of the dual port memory 106 and supplied to the variable wavelength transmitting unit I 29, but, in the operation time T3, since the memory region V does not store any packet, the variable wavelength transmitting unit I 29 does not receive any packet.

In the FIFO read time Tf (=operation time T–Td) within the operation time T3, the read control unit 83 sends the control signal, for enabling the reading of the FIFO 107 and disabling the reading of the dual port memory 106, to the selector 108, which in response sends the packet B, stored in the FIFO 107, to the variable wavelength transmitting unit I 29. The packet B is converted in the variable wavelength transmitting unit I 29 into an optical signal of a wavelength λ5 and supplied to the wavelength multiplexer 36. However, the transmission wavelength of each variable wavelength transmitting unit is constant within the operation time T, regardless of the time Tf or Td.

The packet C in an operation time T4 is similarly read from the FIFO 107 of the buffer I 95, supplied to the selector 108, then converted by the variable wavelength transmitting unit I 29 into an optical signal of λ7 and supplied to the wavelength multiplexer 36.

Consequently, the packets A, B and C are released from the node device I 57 to the optical fiber 37, respectively in the wavelengths λ3, λ5, and λ7 in the operation times T2, T3 and T4. It is assumed that thus released packets A, B and C are respectively received, in the operation times T3, T4 and T5, by the fixed wavelength receiving units III 10, V 12 and VII 14 in the node device II 58.

The timing chart showing the function of each node device only shows the contemplated operations and the remaining parts are left blank. For example, FIG. 9 shows the transmission wavelengths of the variable wavelength transmitting unit I in the operation times T2, T3 and T4, but the unit I emits the optical signal of wavelength λ1 in the operation time I also.

In the following there will be explained the function of the node device II 58 with reference to FIG. 10. In the operation time T3, the fixed wavelength receiving unit III 10 receives the packet A by the optical signal of λ3. The packet A is transmitted by the separation-insertion unit III 17 and is supplied to the buffer III 97, in which the decoder 102 reads the address portion of the input packet A, and, as the destination of the packet A is not terminal equipments connected to the adjacent node device III 59, directs the output of the demultiplexer 105 to the FIFO 107. The packet A is switched by the demultiplexer 105 and stored in the FIFO 107 of the buffer III 97.

In an operation time T4, the fixed wavelength receiving unit V 12 receives the packet B by the optical signal of λ5. The packet B is transmitted by the separation-insertion unit V 19 and is supplied to the buffer V 99, in which the decoder 102 reads the address portion of the input packet B, and, as the destination of the packet B is not any of the terminal equipment units connected to the adjacent node device III 59 and it need not be released by designating the channel or the wavelength, directs the output of the demultiplexer 105 to the FIFO 107.

Also in the operation time T4, a read address value 0 released from the ROM counter 84 of the wavelength control unit 5 (cf. FIG. 8) sets the transmission wavelengths of the variable wavelength transmitting units III, V and VII respectively at λ5, λ6 and λ2. In the FIFO read time Tf (=operation time T–Td) within the operation time T4, the read control unit 83 sends the control signal, for enabling the reading of the FIFO 107 and disabling the reading of the dual port memory 106, to the selector 108, which in response sends the packet A stored in the FIFO 107 to the variable wavelength transmitting unit III 31. The packet A is converted by the variable wavelength transmitting unit III 31 into an optical signal of wavelength λ5 and supplied to the wavelength multiplexer 36.

In an operation time T5, the fixed wavelength receiving unit VII 14 receives the packet C of the optical signal of λ7. The packet C is stored, like the packet B in the FIFO 107 of the buffer VII 10. Also the packet B is supplied, by the variable wavelength transmitting unit V 33, as an optical signal of λ4 to the node device III 59.

In an operation time T6, the packet C is supplied, by the variable wavelength transmitting unit VII 35, as an optical signal of λ3 to the node device III 59.

In the following there will be explained the function of the node device III 59 with reference to FIG. 11. It is assumed that the packets A, B and C are respectively received, in operation times T5, T6 and T7, by the fixed wavelength receiving units V 12, IV 11 and III 10 in the node device III 57.

In an operation time T 5, the fixed wavelength receiving unit V 12 receives the packet A of the optical signal of λ5. The packet A is transmitted by the separation-insertion unit V 19 and is applied to the buffer V 99, in which the decoder 102 reads the address portion of the input packet A, and, as the destination of the packet A is not any of the terminal equipment units connected to the adjacent node device IV 60, directs the output of the demultiplexer 105 to the FIFO 107. The packet A is stored in the FIFO 107 of the buffer V 99.

In an operation time T6, the packet B is received by the fixed wavelength receiving unit IV 11, and is stored in the FIFO 107 of the buffer IV 98. Also in the operation time T6, a read address value 4 released from the ROM counter 84 of the wavelength control unit 5 controls the variable wavelength transmitting unit V 33 so as to emit the optical signal of wavelength λ3 in the operation time T6, and in the FIFO read time Tf (=operation time T−Td) thereof, the packet A is supplied by the variable wavelength transmitting unit V 33 as an optical signal of λ3 to the node device IV 60.

In an operation time T7, the packet C is received by the fixed wavelength receiving unit III 10, and is stored in the FIFO 107 of the buffer III 97. Also in the operation time T7, the packet B is supplied by the variable wavelength transmitting unit IV 32 as an optical signal of λ3 to the node device IV 60, and, in an operation time T8, the packet C is supplied by the variable wavelength transmitting unit III 31 as an optical signal of λ3 to the node device IV 60.

In the following there will be explained the function of the node device IV 60 with reference to FIG. 19. The packets A, B and C are respectively received, in operation times T7, T8 and T9, by the fixed wavelength receiving unit III 10 in the node device IV 60.

In the operation time T7, the packet A of the optical signal of wavelength λ3 is received by the fixed wavelength receiving unit III 10 and supplied to the buffer III 97, in which the decoder 102 reads the address portion of the input packet A. As the destination of the packet A is the terminal II 46 connected to the adjacent node device V 61, the decoder 102 directs the output of the demultiplexer 105 to the dual port memory 106 and sends a predetermined write start address A2 for the packet A to the write address counter 103, which in response supplies the dual port memory 106 with identification signal of the write start address of the memory region, from which the packet A is to be written. The packet A is stored in the memory region II in the dual port memory 106, because the packet A is addressed to the terminal II 46 connected to the node device V 61 and it has to be converted into an optical signal of λ2 and supplied to the fixed wavelength receiving unit II 9 connected to the separation-insertion unit II 16 of the node device V 61 in order that the packet A can reach the terminal II 46, as it is connected to the above-mentioned separation-insertion unit II 16. The packet stored in the memory region II of the dual port memory 106 is read only when the transmission wavelength of the variable wavelength transmitting unit is controlled to λ2, the packet A is thus converted into an optical signal of λ2 and released to the node device V 61.

In the operation time T8, the fixed wavelength receiving unit III 10 receives the packet B as the optical signal of λ3 and sends it to the buffer III 97, in which the decoder 102 reads the address portion of the input packet B. Since the destination of the packet B is the terminal II 46 connected to the adjacent node device V 61, the packet B is also stored in the memory region II of the dual port memory 106.

Also in the operation time T8, the ROM counter 84 of the wavelength control unit 5 sends a read address value 4 simultaneously to the wavelength control tables I–VII (cf. FIG. 8). This address value reads the contents of the wavelength control tables, and the wavelength control table III 87 sends a control signal corresponding to the wavelength λ2 to the variable wavelength transmitting unit III 31, of which transmission wavelength is therefore set at λ2. In the dual port memory read time Td within the operation time T8, the read control unit 83 of the buffer reading control unit 3 sends the control signal, for the reading of the dual port memory 106 and disabling the reading of the FIFO 107, to the selector 108, which in response connects the dual port memory 106 with the variable wavelength transmitting unit III 31. Also in response to the read address value 4 from the ROM counter 84 of the wavelength control unit 5, the buffer control tables read the read address value in the respective dual port memories and send them to the address counter 104. For example the buffer control table III 78, in response to the read address value 4 from the ROM counter 84 of the wavelength control unit 5, reads the head address A2 of the memory region II and sends it to the address counter 104. Thus the dual port memory 106 sends the packet A to the variable wavelength transmitting unit III 31, by which the packet A is converted into an optical signal of λ2 and supplied to the wavelength multiplexer 36.

In an operation time T9, the fixed wavelength receiving unit III 10 of the node device IV 60 receives the packet C as the optical signal of λ3. The packet C is stored in the memory region II of the dual port memory 106.

In the operation time T9, the variable wavelength transmitting unit III 31 is set at a transmission wavelength λ1 by a read address value 5 from the ROM counter 84 of the wavelength control unit 5 (cf. FIG. 8), and is therefore unable to transmit the packet B stored in the memory region II 70 in the dual port memory. Consequently, during operation times T10, T11, T12, T13 and T14 in which the variable wavelength transmitting unit III 31 is set respectively at λ3, λ5, 7, λ6 and λ4, the packets B and C stored in the memory region II of the dual port memory 106 are not converted by the variable wavelength transmitting unit III 31 into the optical signal of wavelength of λ2.

In an operation time T15, the variable wavelength transmitting unit III 31 is set at wavelength λ2, whereby the packet B stored in the memory region II of the dual port memory is converted by the variable wavelength transmitting unit III 31 into an optical signal of λ2 and transmitted to the wavelength multiplexer 36. After the lapse of operation times T16, T17, T18, T19, T20 and T21, the variable wavelength transmitting unit III 31 is set in an operation time T22 at the transmission wavelength λ2, whereupon the packet C stored in the memory region II of the dual port memory 106 is converted thereby into an optical signal of λ2 and transmitted to the wavelength multiplexer 36.

In the following there will be explained the function of the node device V 61, with reference to FIG. 20. It is assumed that the packets A, B and C are received by the fixed wavelength receiving unit II 9 of the node V 61, respectively in operation times T9, T16 and T23.

The packet A, received in the operation time T9, is separated by the separation-insertion unit II 16 from the packets to be transmitted to the buffer II 96, and supplied to the destination terminal II 46. Similarly the packet B, received in the operation time T16 is separated from the packets to be transmitted to the buffer II 96, and supplied to the destination terminal II 46. Also the packet C, received in the operation time T23 is similarly supplied to the destination terminal II 46.

In the transmission control method of the above-explained reference example, it is necessary for plural packets having the same destination of transmission (the receiving terminal equipment is same) to be converted, into optical signals of a fixed wavelength receivable by the fixed wavelength receiving unit to which the destination terminal equipment is connected through the separation-insertion unit when those packets are sent to the node device to which the destination terminal equipment is connected. If all the plural packets having the same destination are entered into a fixed wavelength receiving unit of a node device which will output those packets to the node device to which the destination terminal equipment is connected, such plural packets are transmitted only at a predetermined transmission wavelength of the variable wavelength transmitting unit.

For example, in the reference example explained above, among the packets A, B and C received in the operation times T7, T8 and T9 shown in FIG. 19, waiting in the memory region II of the dual port memory 106 must be made for the packet B until the transmission wavelength is set at λ2 after about a cycle of the wavelength control table III which controls the variable wavelength transmitting unit III, and waiting in the memory region II of the dual port memory 106 must be made for the packet C until the transmission wavelength is set at λ2 after about two cycles of the wavelength control table III which controls the variable wavelength transmitting unit III. Thus, in a case where all the plural packets having the same destination are entered into a fixed wavelength receiving unit of a node device B which will output the packets to a node device A to which the destination terminal equipment is connected, there is required a long time for the transmission of such plural packets from the node device B to A.

The present invention to be explained in the following provides a novel transmission control in which, in the course of transmission to the destination, in passing a channel altering unit such as a variable wavelength transmitting unit or a switch, which is passed last in the transmission to the destination and an immediately preceding channel altering unit in the upstream side of the former channel altering unit, the plural packets in proximity to be transmitted in a same channel from the above-mentioned last channel altering unit are so controlled as to be transmitted in respectively different channels from the immediately preceding channel alterning unit mentioned above. In the foregoing reference example, the separation unit for separating the packets is positioned in front, in the node device, of the variable wavelength transmitting unit constituting the channel altering unit. Therefore, referring to the configuration of the reference example, the control is made such a manner that, in a node device immediately preceding the node device to which the destination terminal equipment is connected, the plural packets which have to be transmitted in the same channel (for example in the same wavelength) from such immediately preceding node device are not entered therein in same channel in proximity. More specifically, at a point where the packets must be passed through at least two channel altering units such as variable wavelength transmitting units before reaching the destination, namely at a second preceding node device in front of the node device to which the destination terminal equipment is connected, control is made such that the plural packets in proximity, that have to be entered through the same channel to the node device to which the destination terminal equipment is connected are transmitted in respectively different channels (to the one preceding node device), so that the node device immediately preceding the node device to which the destination terminal equipment is connected receive such packets, that have to be entered through the same channel to the node device to which the destination terminal equipment is connected, in respectively different channels.

Thus the transmission control method of the present invention, adapted for use in a network system including plural channel alteration units each of which receives signals in plural channels and transmits the signals entered by such plural channels in any of plural channels and adapted to effect signal transmission among such plural channel alteration units, has as one feature the that plural signals in proximity that have to be outputted by the same designated channel among the plural channels from a first one of the plural channel alteration units are entered in respectively different channels into the above-mentioned first channel alteration unit.

In particular, in order to enter the plural signals in proximity, which have to be outputted by the same channel among the plural channels from the first one of the plural channel alteration units, into such first channel alteration unit in respectively different channels, a second channel alteration unit that sends the signals to the first channel alteration unit transmits the plural signals in proximity, which have to be outputted by a same channel among the plural channels from the first channel alteration unit, in respectively different channels.

For this purpose, there are provided a method of monitoring, in the second channel alteration unit, the signals entered by the plural channels, and, upon receiving within a predetermined time plural signals which have to be outputted by the same channel among the plural channels from the first channel alteration unit, outputting such plural signals in respectively different channels, and a method in which the plural signals in proximity which have to be outputted in the designated channel from the first channel alteration unit have channel designation information for the second channel alteration unit, for designating the output channels therefrom, wherein the channel designation information for the second channel alteration unit in such plural signals in proximity indicate respectively different channels, and the second channel alteration unit outputs such plural signals in proximity according to the channel designation information for the second channel alteration unit.

For channel alteration, the entered plural signals can be stored temporarily. For this purpose, the channel alteration unit receives the signals transmitted by the plural channels through a storage unit which temporarily stores such transmitted signals, and the storage unit is so constructed as to separately store the entered signals for respective input channels and to release the signals from different output ports respectively corresponding to such channels.

In the present invention, as explained in the foregoing, since in the channel alteration unit there are present signals to be outputted with channel designation and those to be outputted without channel designation, the storage unit preferably stores the entered signals in divided manner in those which are to be outputted with channel designation from the channel alteration unit receiving the signals from such storage unit and in those which are to be outputted without channel designation.

Also for efficient output of the signals to be outputted with channel designation, the storage unit preferably stores the entered signals in divided manner according to the output channels for such signals from the channel alteration unit receiving the signals from such storage unit.

Also the channel alteration unit may determine the output channel of each entered signal by arbitration based on the information of each signal, but such arbitration control may be dispensed with if the channel alteration unit is rendered capable of altering the output channels for the signals entered from the above-mentioned different output ports and the storage unit is rendered capable of outputting the signals in the channels which are set, by the channel alteration unit, for the output of the signals from the respectively different output ports, whereby achieved is the reduction in control load and the simplification of configuration. In such situation, in order to avoid the collision of the signals, the channel alteration unit may be rendered capable of channel alteration in such a manner that plural ones among the different output ports can effect simultaneous outputs to the respectively different channels, and the controls for the channel alteration for the signal reading are facilitated if the channel alteration unit executes the channel alteration according to a predetermined pattern.

The channel alteration unit includes switching means for switching the connection relationship between input terminals respectively receiving the signals from the different output ports and output terminals respectively corresponding to the plural channels and adapted to output the signals in the respective channels, and may have a configuration to alter the connection relationship in such a manner that the storage unit outputs, from the respective different output ports, the signals which are to be outputted from the output terminals connected, by the connection relationship set by the channel alteration unit, to the input terminals respectively corresponding to the above-mentioned different output ports. Such configuration may be achieved by altering the connection relation-ship with plural switches such as selectors. The alteration of the connection relationship between the plural input channels and the plural output channels may also be achieved by a configuration, in which the channel alteration unit has variable channel transmitting units respectively receiving the signals from the different output ports and is adapted to alter the transmission channels of the variable channel transmitting units, and the storage unit is adapted to output, respectively from the different output ports, the signals which are to be outputted by the channels set, by the variable channel transmitting units respectively corresponding to the different output ports, for the output of the signals from the above-mentioned different output ports. As an example, in a case where plural channels are composed of lights of mutually different wavelengths, the variable channel transmitting means are composed of variable wavelength transmitting means, and, more specifically, the channels or the wavelengths are altered by a light source capable of controlled alteration of wavelength, such as a semiconductor laser.

Also for connecting a terminal equipment such as a computer or a unit of input/output equipment to the network system, there may be employed various configurations. For example the above-mentioned channel alteration unit may be rendered capable of outputting the signals not only by the channels connected to another channel alteration unit but also by a channel connected to the terminal equipment without being connected to another channel alteration unit. Also as shown in the following embodiment of the present invention, there may also be adopted a configuration in which the signal is separated, in the course of transmission from a channel alteration unit to another, from the channel and is supplied to the destination such as a terminal equipment. In such configuration, the switching among plural channels can be executed in the channel alteration unit while the signal separation from the channel can be executed in a separation unit, whereby are prevented the drawbacks of complicated configuration and the heavily increased control load of the channel alteration unit, encountered particularly in the network system involving channel switching.

In the above-explained network system, the signal employed therein is preferably so constructed that the output channel for the signal from the channel alteration unit can be identified from the information contained in the signal. For this purpose, the signal may be provided with address information of the destination. Such signal can be a packet with address information, as exemplified by an ATM cell.

If such address information contains information indicating the output channel for the signal in the above-mentioned first channel alteration unit, the first channel alteration unit mentioned above, or, in the following embodiments, the last channel alteration unit which the signal passes is passed last before reaching the destination, can output such signal according the information indication the output channel for the signal in such first channel alteration unit.

In the present invention, the above-mentioned channel alteration unit may be provided in various configurations, but, in the following embodiments, a channel alteration unit is provided in each node device. Particularly in a case where the signal between the node devices and that in each node device are respectively realized in a form suitable for transmission and a form suitable for processing, such as an optical signal and an electrical signal, the signal processing units such as the channel alteration unit for channel switch and the separation unit for signal separation from the channel are preferably provided collectively in the node device. Also the signal input from a terminal equipment unit can be achieved by providing an insertion unit in the node device.

Also in the present invention, plural channels may be provided in various configurations, such as a configuration of separating the channels by the wavelength as explained above, or a configuration of assigning different transmission paths to the channels. It is also possible to distinguish the channels by code division. Consequently the channel between the channel alteration units can also assume various physical forms, such as an electric cable or an optical fiber. Also transmission in space can be utilized.

BRIEF DESCRIPTION OF THE DRAWINGS

FIGS. 8, 9, 10, 11, 12, 13 and 14 are timing charts of an embodiment of the present invention;

FIG. 27, which is composed of FIGS. 27A and 27B, is a view showing the configuration of a node device in another embodiment of the present invention.

DETAILED DESCRIPTION OF THE PREFERRED EMBODIMENTS

Now the present invention will be clarified in detail by preferred embodiments thereof, with reference to the attached drawings.

First Embodiment

Figure 1B:
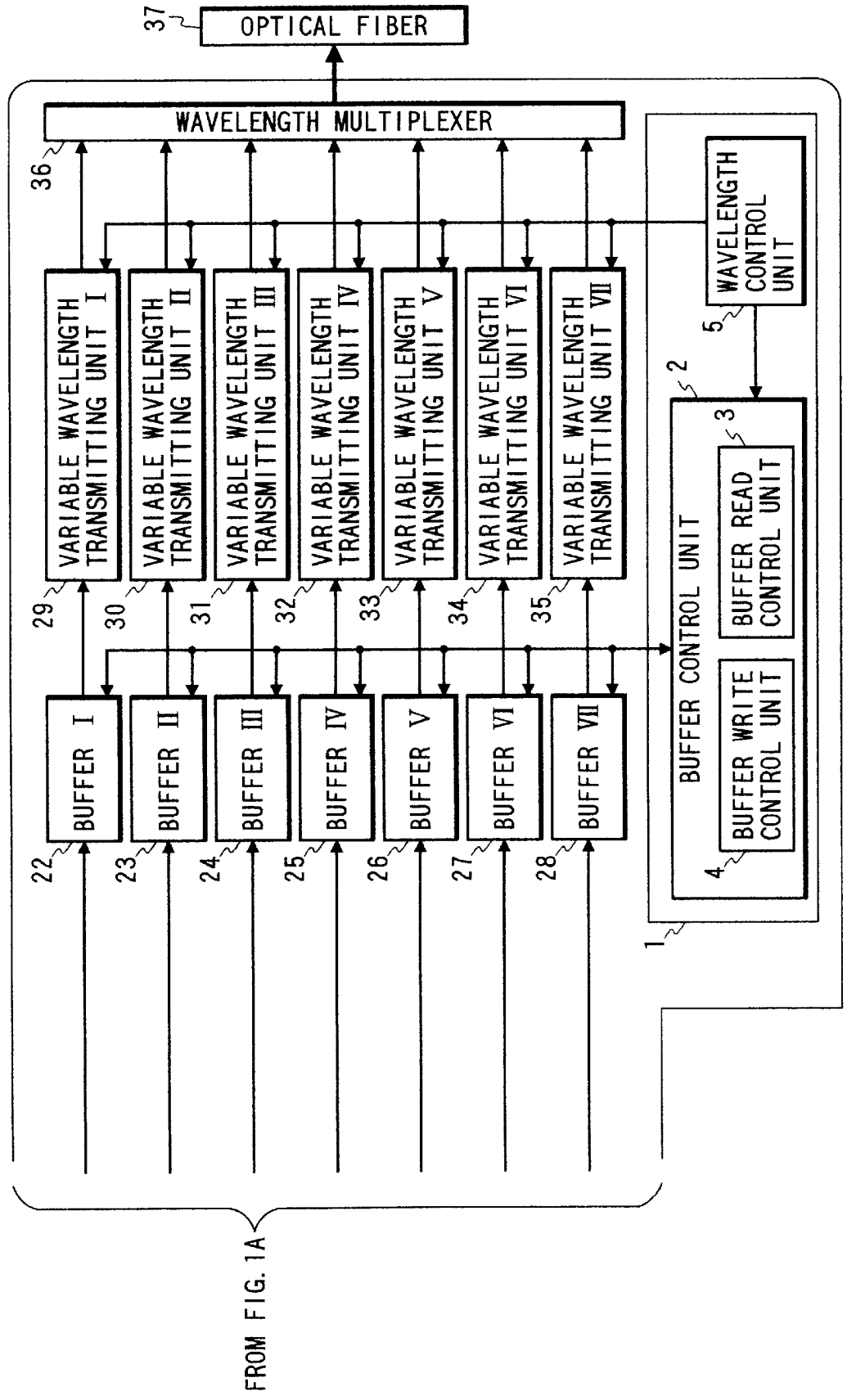
FIG. 1, which is composed of FIGS. 1A and 1B, is a view showing the configuration of a node device constituting a first embodiment of the present invention.

FIGS. 1A and 1B show an embodiment of the node device of the present invention, different from that of the reference example in the structure of the buffer and of the buffer control unit. Particularly, in the buffer control unit, there is newly provided a write control unit for controlling the packet writing according to the transmission control method of the present invention to be explained in the following.

Configuration of Each Node Device

Figure 16A:
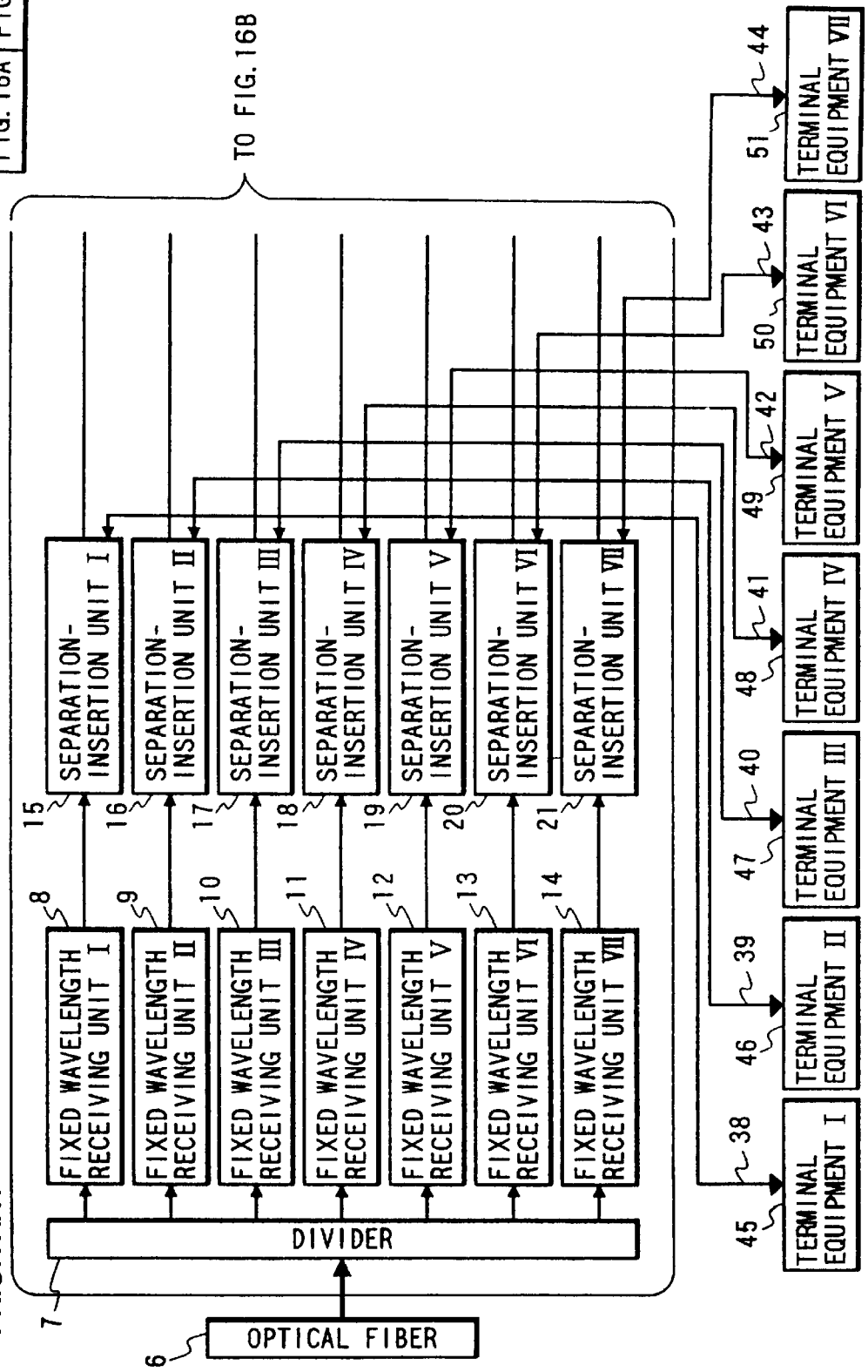
FIG. 16, which is composed of FIGS. 16A and 16B, is a view showing the configuration of a node device in a reference example.
Figure 16B:
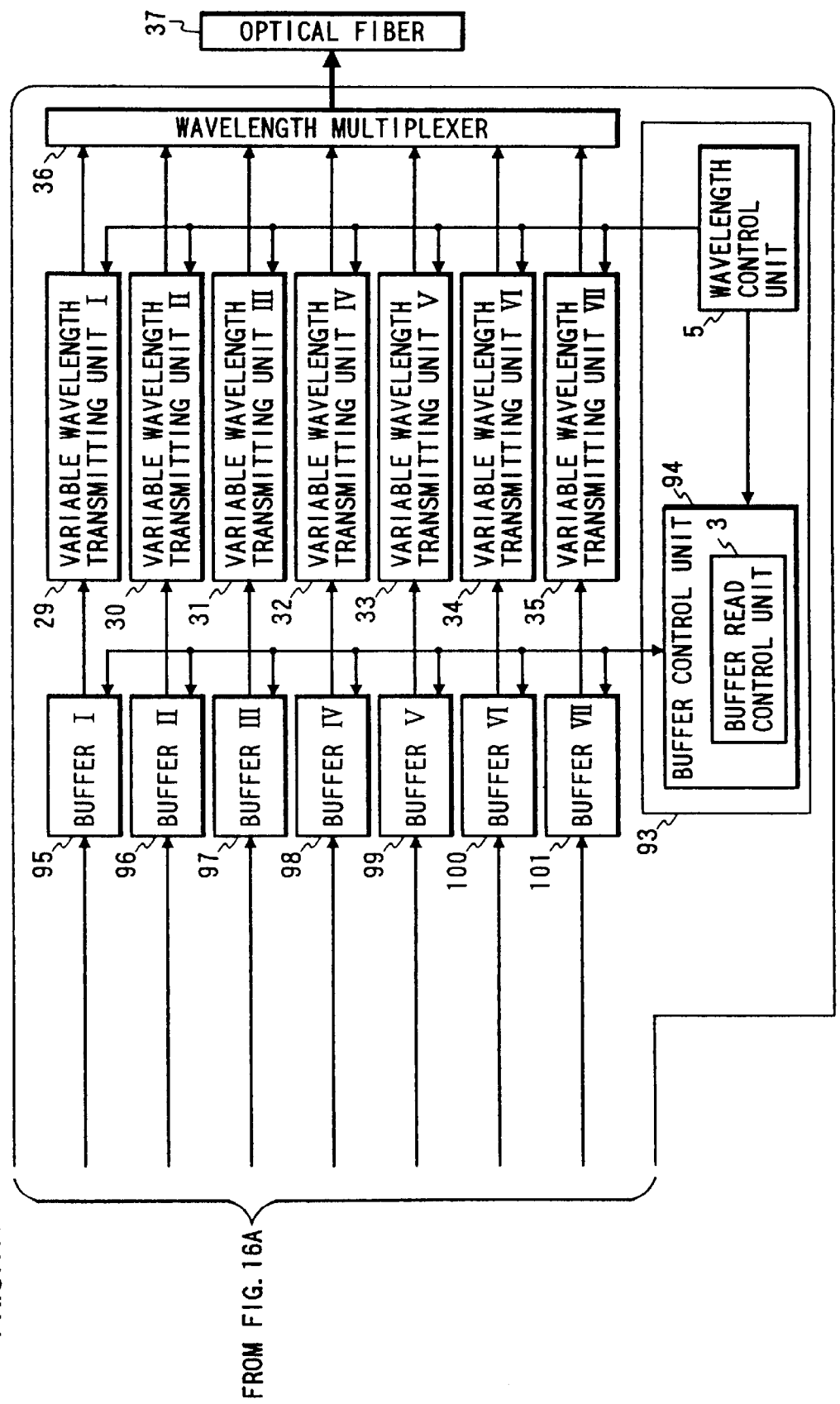
Figure 17:
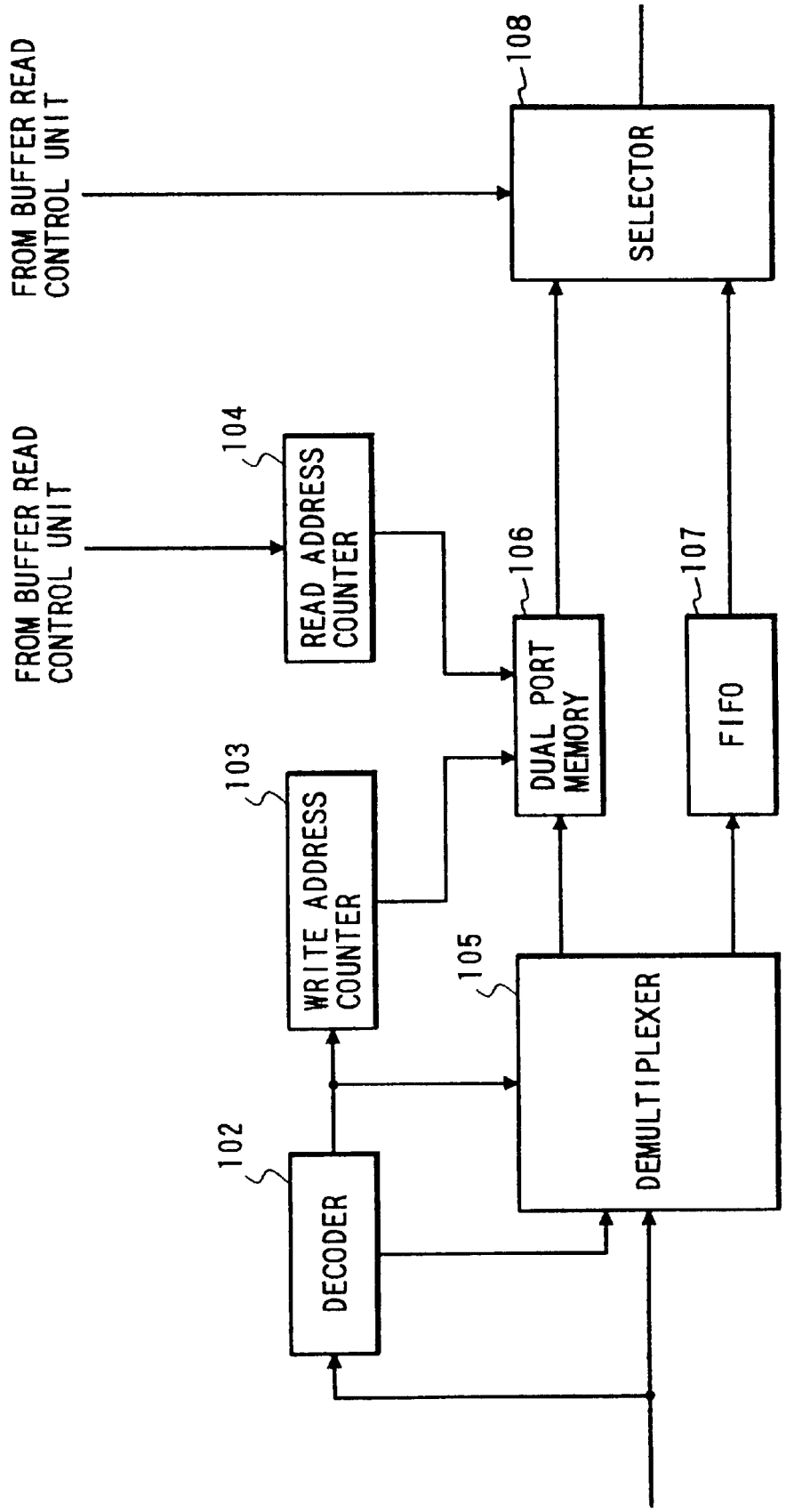
FIG. 17 is a view showing the configuration of a buffer in the reference example.
Figure 18:
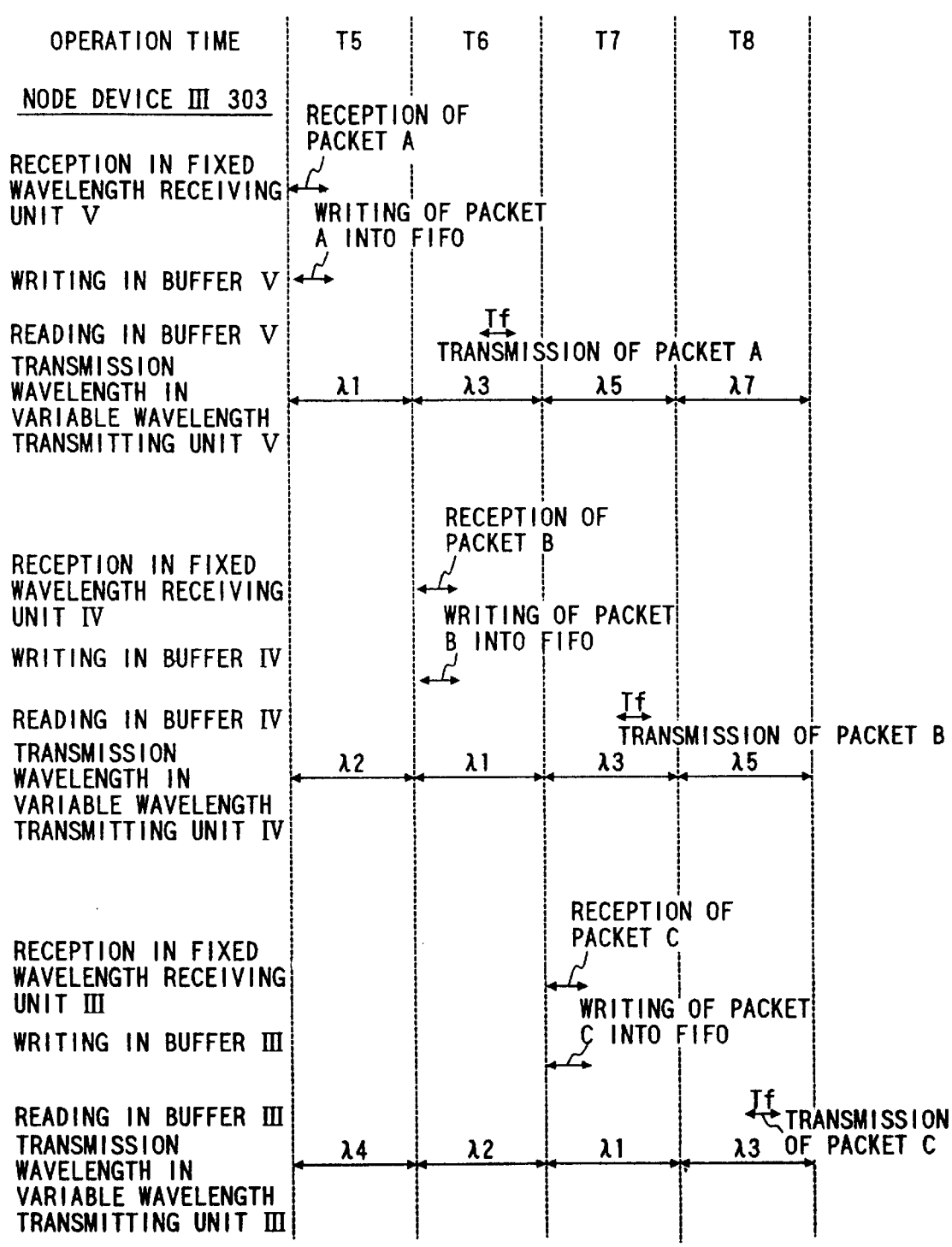
FIGS. 18, 19 and 20 are timing charts of the reference example.
Figure 19:
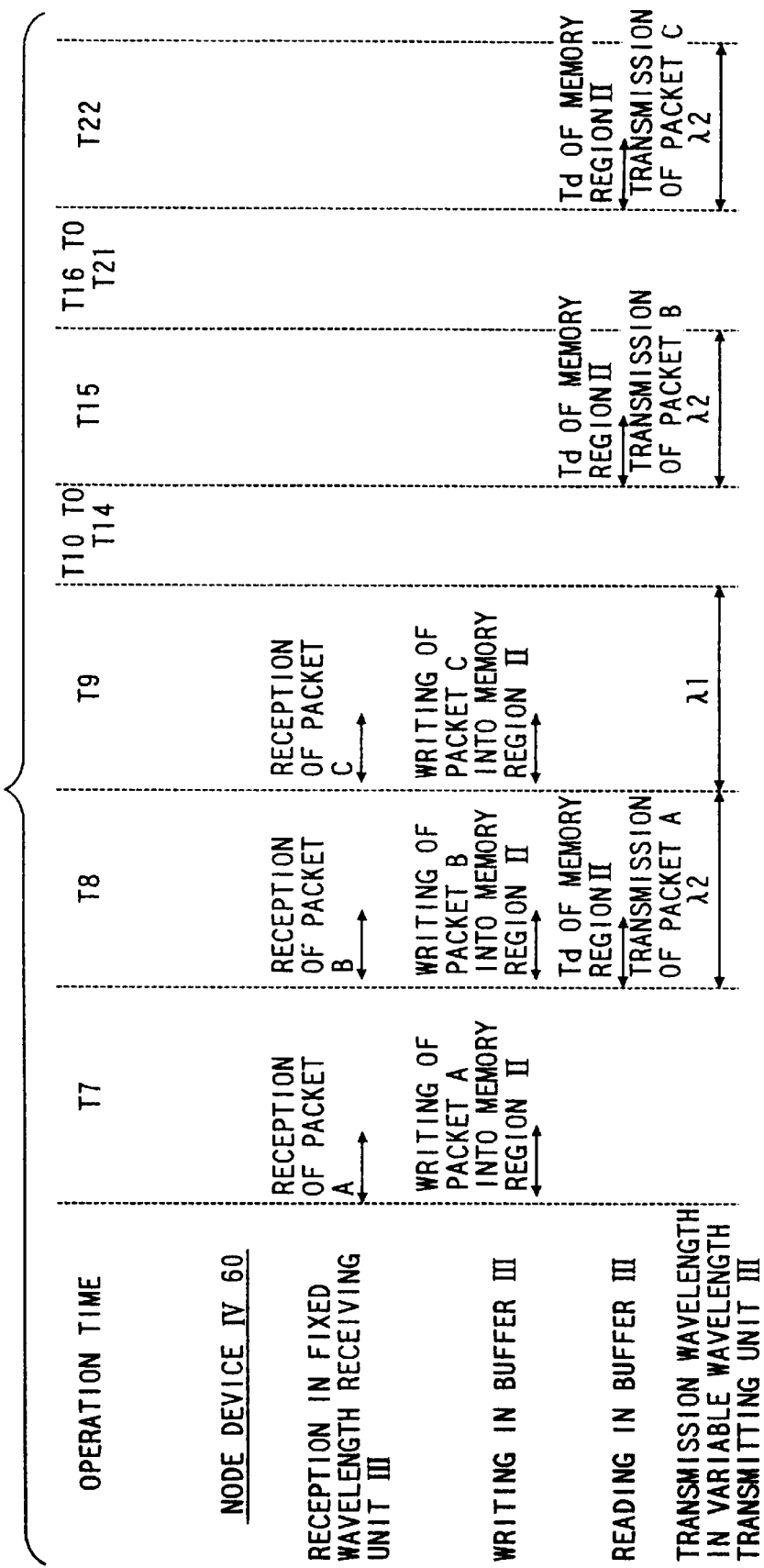
Figure 20:
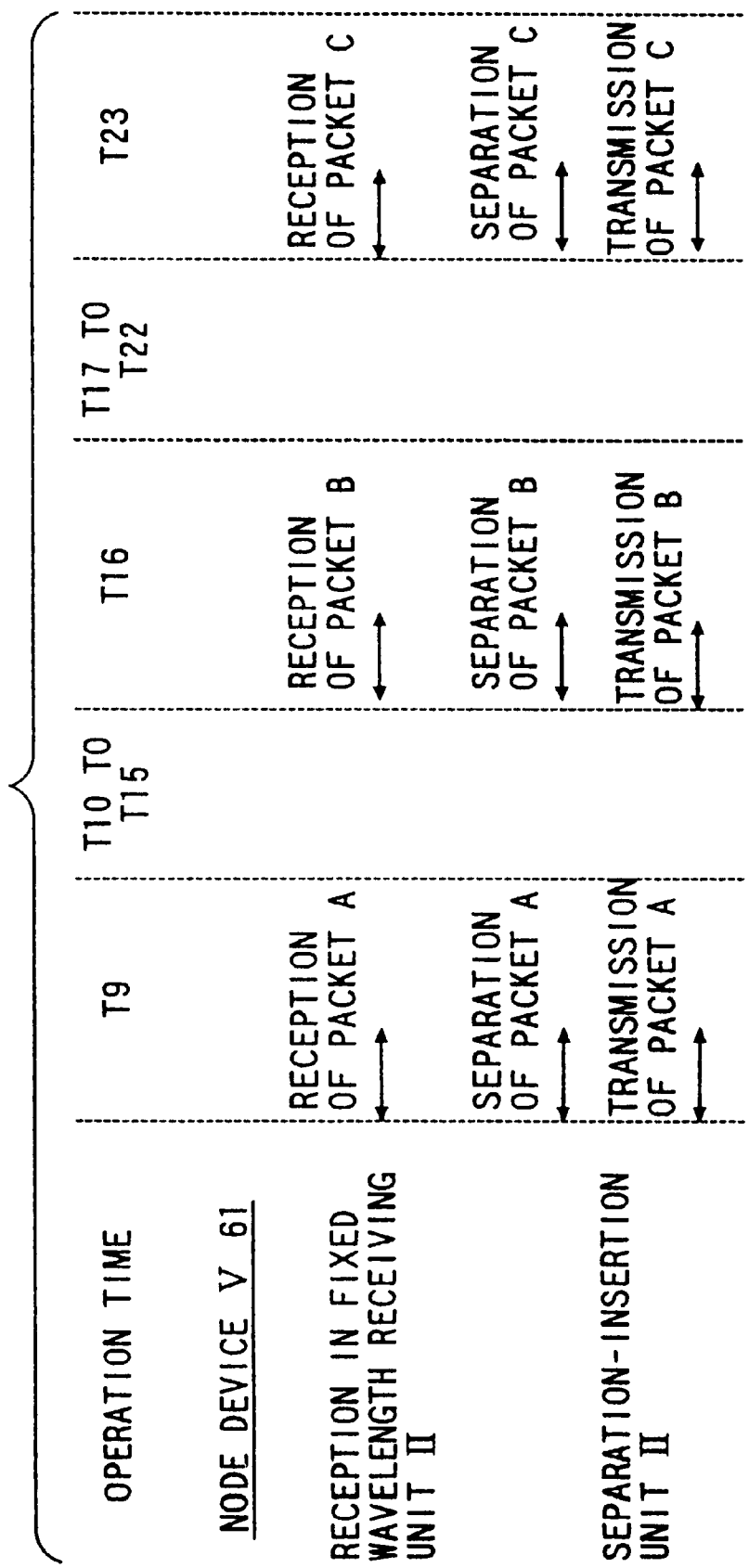

In FIGS. 1A and 1B, components represented by same numerals as in FIGS. 16A and 16B are of similar or equivalent functions and will not therefore be explained. In FIGS. 1A and 1B, a control unit 1 is provided therein with a buffer control unit 2 and a wavelength control unit 5. A buffer control unit 2 is composed of a buffer reading control unit 3 for controlling reading operation in the buffer so as to inhibit reading of the packet stored in the buffer in case a sub-transmission path corresponding to the destination of the packet stored in the buffer is connected to an adjacent node device, until in the adjacent node device the wavelength received by the fixed wavelength receiving units 8–14 for sending the packet to the separation-insertion unit 15–21 to which the sub-transmission path of the destination is connected coincides with the transmission wavelength of the variable wavelength transmitting units 29–35 for transmitting such packet, and a buffer writing control unit 4 for controlling the packet writing according to the transmission control method to be explained later. The wavelength control unit 5 controls the transmission wavelengths of the variable wavelength transmitting units in accordance with a predetermined pattern of a transmission wavelength control table to be explained later.

Buffers I–VII (22–28), constituting buffer means, serve to temporarily store the packets, released from the separation-insertion units 15–21, in memory regions respectively corresponding to the transmission wavelengths of the variable wavelength transmitting units 29–35.

Configuration of Network

Figure 2:
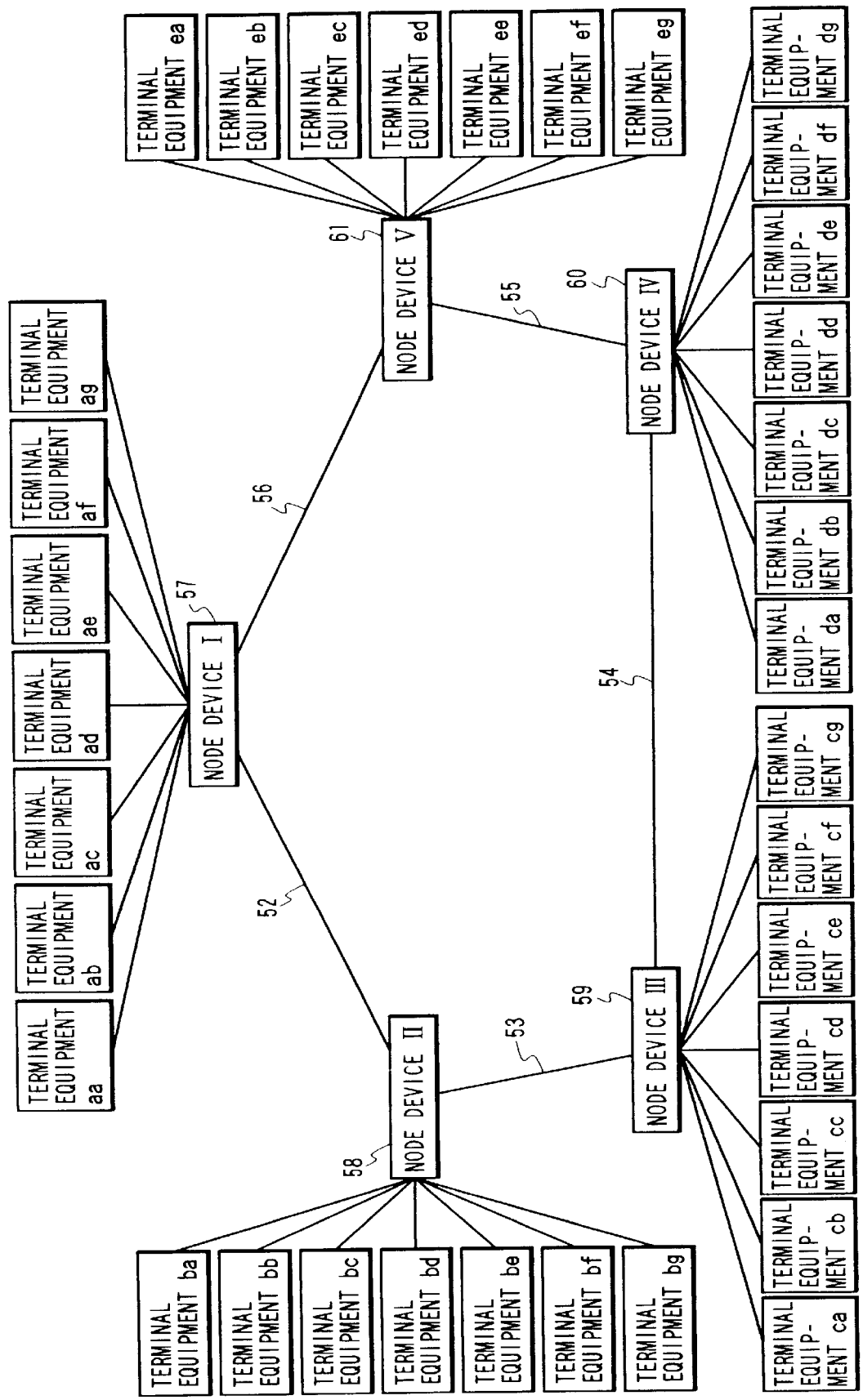
FIG. 2 is a view showing an example of the configuration of the network system of the present invention.

FIG. 2 shows an example of the configuration of a network system employing the node devices shown in FIGS. 1A and 1B, the example consisting of five node devices 57–61 connected with optical fibers 52–56, wherein the optical signal containing packets is transmitted counterclockwise in the drawing.

Buffers I–VII

Figure 3:
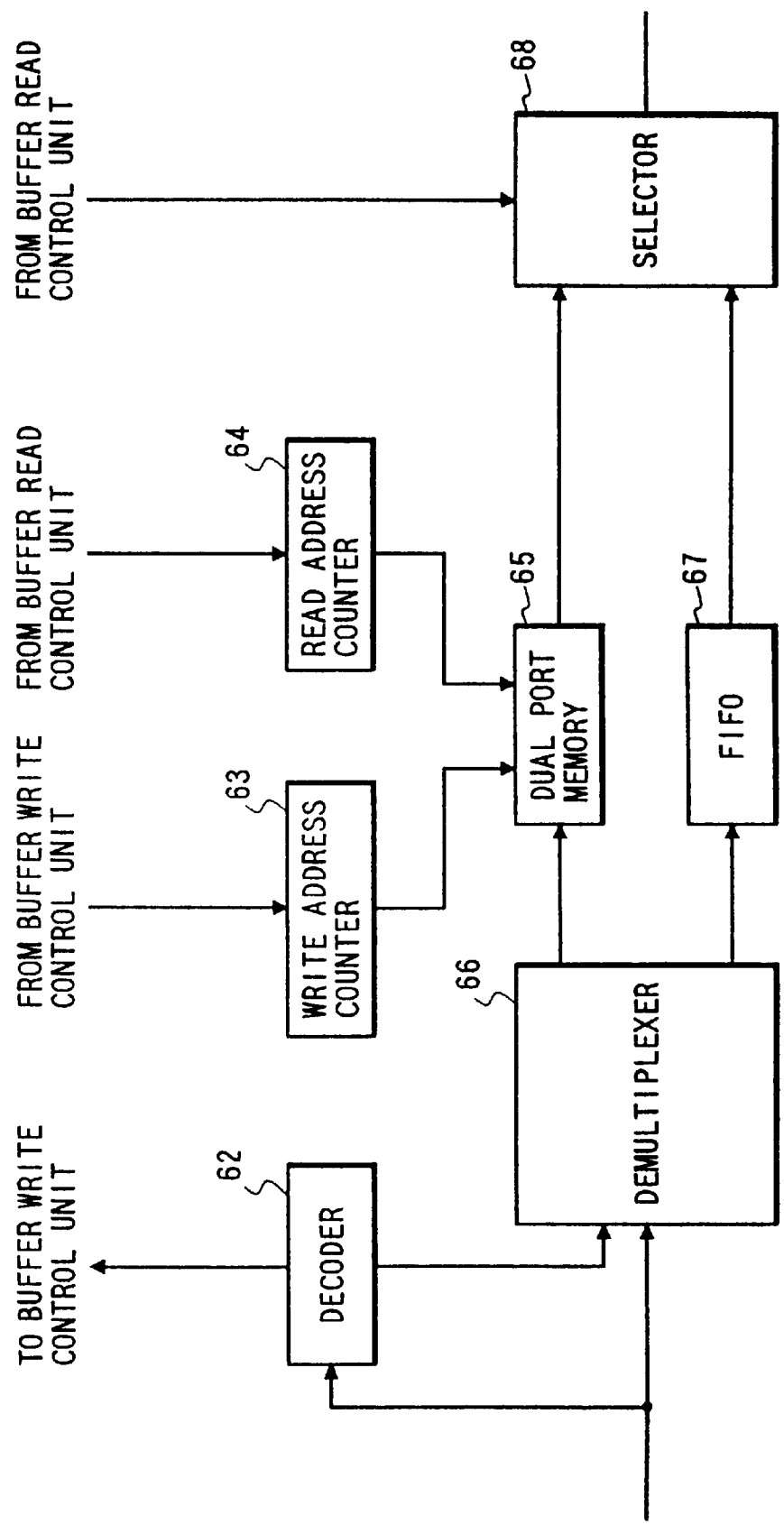
FIG. 3 is a view showing the configuration of a buffer in the first embodiment of the present invention.
Figure 6:
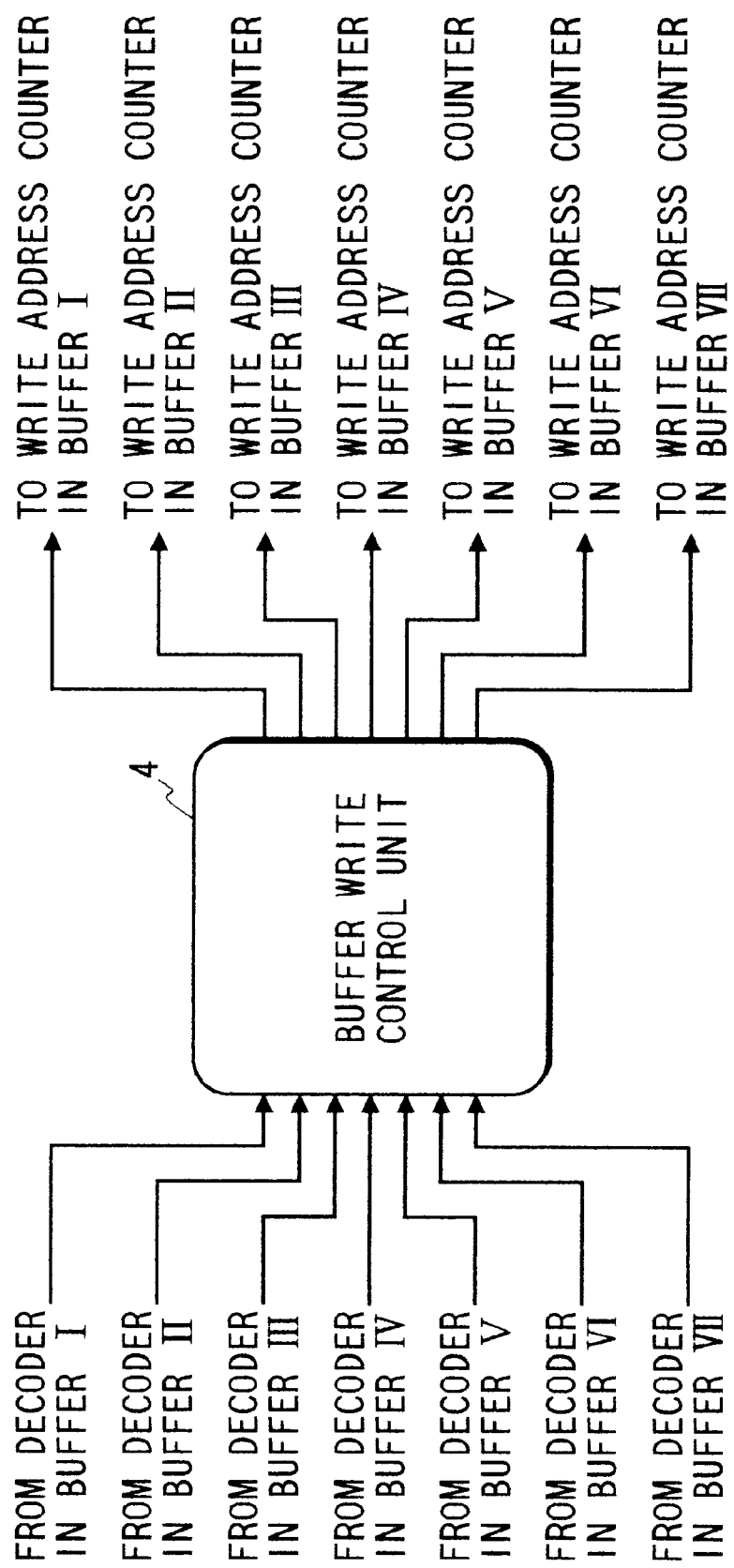
FIG. 6 is a view showing the configuration of a buffer writing control unit in the first embodiment of the present invention.

FIG. 3 shows the internal structure of a first embodiment of the buffer of the present invention. The buffers I to VII have an identical internal structure. In FIG. 3, a decoder 62 reads the address portion of the packet entered from the separation-insertion units 15–21, then discriminates whether the packet can reach a node device connecting to the destination terminal equipment within two relaying operations including the relay by the local (self) node device, and controls output connections of a demultiplexer 66 according to the result of such discrimination. In case the packet cannot reach the destination within two relays, the decoder 62 sets the output of the demultiplexer 66 to an FIFO 67 for storing the packets to be outputted without designation of the transmission channel (wavelength), but, in a case where the packet can reach the destination within two relays, it sets the output of the demultiplexer 66 to a dual port memory 65 for storing the packets to be outputted with designation of the transmission channel. Then the decoder 62 sends the address of the received packet to a buffer writing control unit 4 in the buffer control unit 2. The buffer writing control unit 4 shown in FIG. 6 provides, according to a transmission control algorithm to be explained later in relation to FIG. 15 from an address value of the packet a write address counter 63 with a write start address of a memory region where the packet is to be written.

Figure 4:
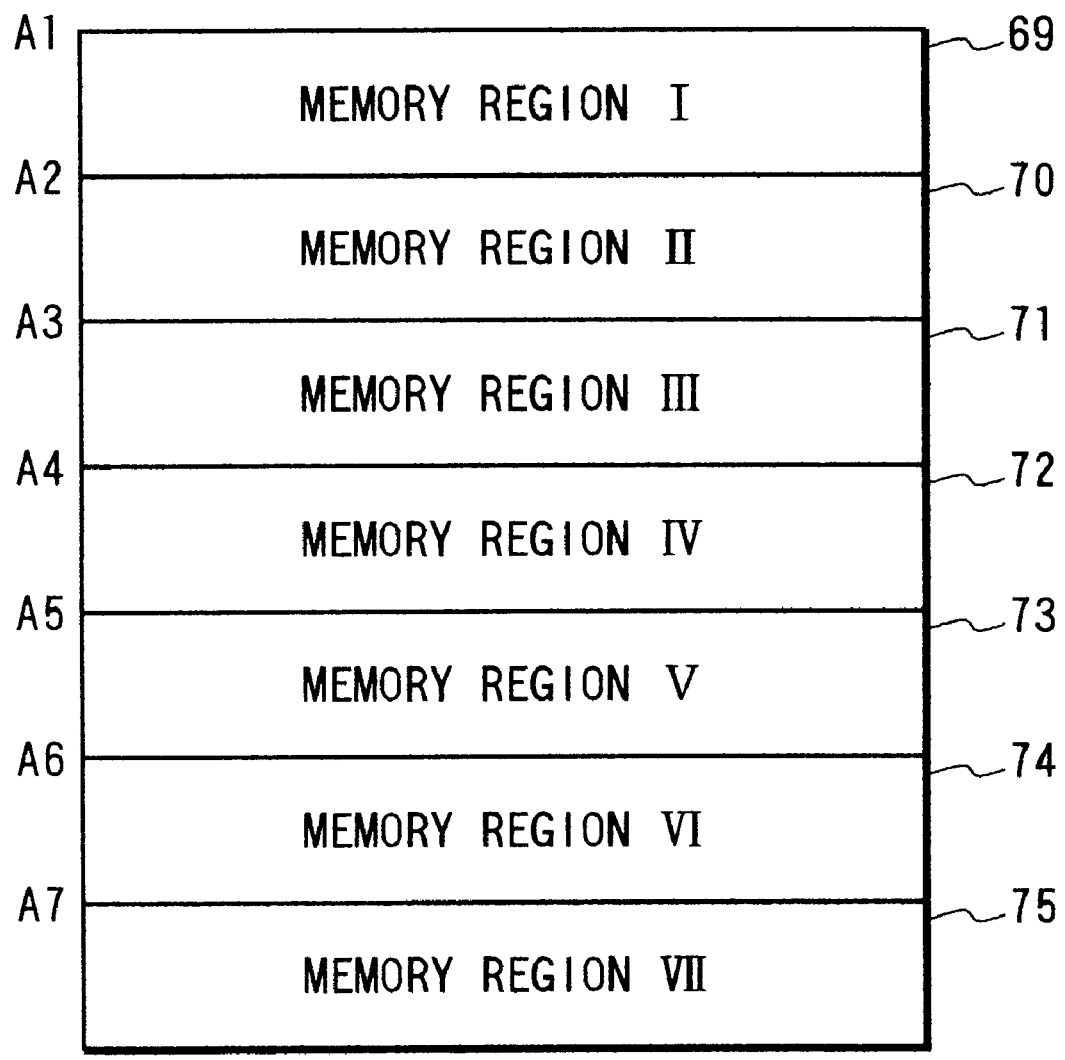
FIG. 4 is a view showing the memory map of a dual port memory in the present invention.

A write address counter 63 sends, to the dual port memory 65, a signal of an address area, in which the packet is to be written in succession from a write start address value released from the buffer writing control unit 4. A read address counter 64 sends, to the dual port memory 65, an address signal for reading the packet in succession, from an offset value released from the buffer reading control unit 3 in the buffer control unit 2 as a read start address. A demultiplexer 66 sends the input packet to the dual port memory 65 or the FIFO 67 according to the instruction from the decoder 62. A dual port memory 65 is provided for effecting the writing and the reading of the packet data independently, and is provided therein with memory regions for storing packets, corresponding to the wavelengths of the optical signals into which the packets are to be converted, as shown in a memory map of FIG. 4. For example the packet stored in a memory region IV is read when the transmission wavelength of the variable wavelength transmitting unit is set at $\lambda 4$ and is outputted as an optical signal of wavelength of $\lambda 4$. The packets stored in the respective memory regions are converted into the optical signals of wavelengths corresponding to the respective memory regions and are thus outputted from the node device. The head addresses of the memory regions are respectively A1, A2, A3, A4, A5, A6 and A7. A FIFO (first-in-first-out) 67 temporarily stores the input packets and releases them in the order of input to a selector 68, which connects either an output of the dual port memory 65 or an output of the FIFO 67 to the variable wavelength transmitting unit 29–35 according to the instruction from the buffer reading control unit 3 in the buffer control unit 2.

The present buffer structure is different from that of the reference example in that an output terminal of the decoder is connected to the buffer writing control unit 4 in the buffer control unit 2 and that an input terminal of the write address counter 63 for the control signal is connected to the buffer writing control unit 4.

Buffer Control Unit

Figure 5:
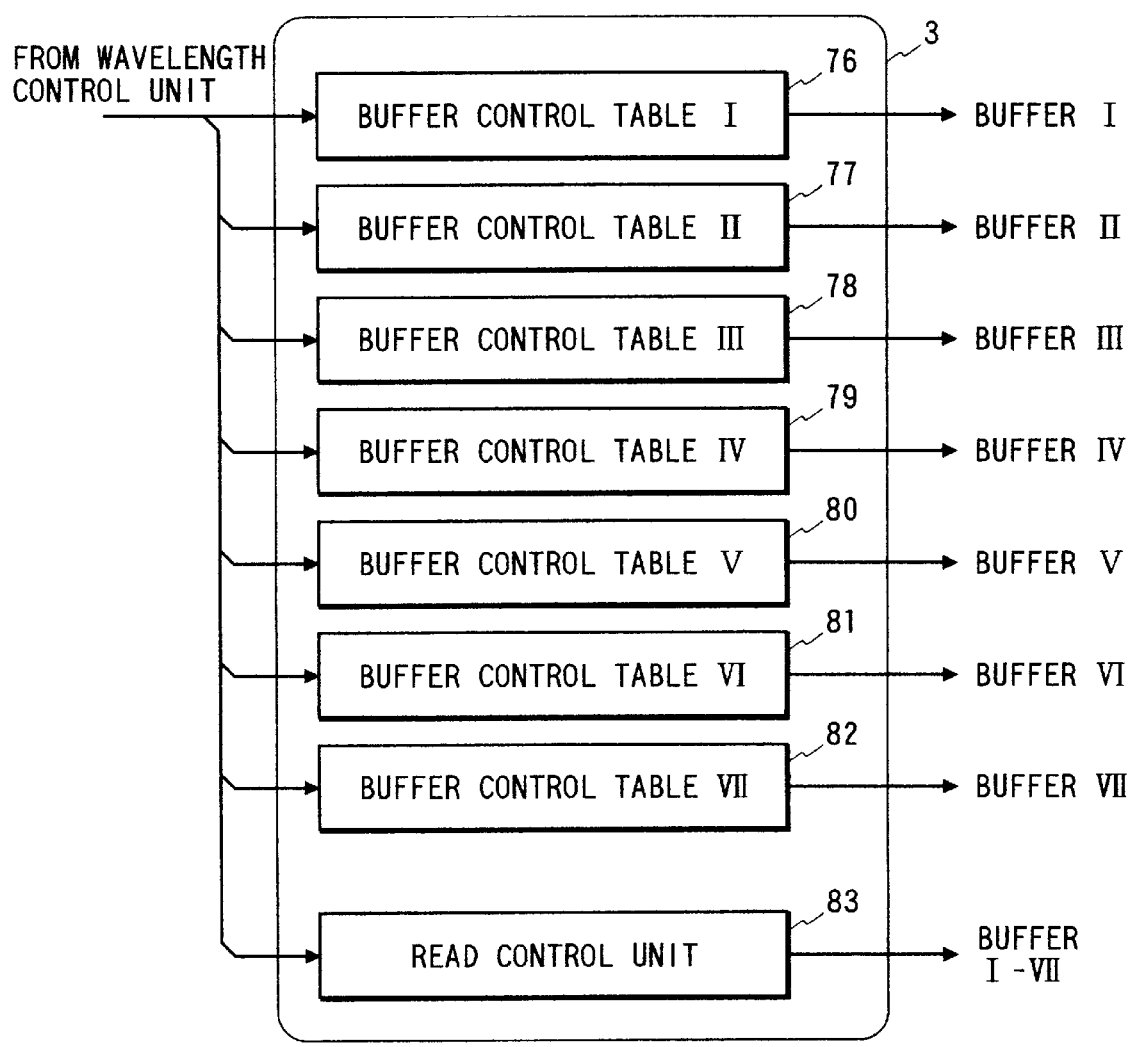
FIG. 5 is a view showing the configuration of a buffer reading control unit in the first embodiment of the present invention.

FIG. 5 shows the configuration of a portion for read control in the buffer control unit 2, wherein shown are buffer control tables I–VII (76–82). The buffer control tables I–VII are read in succession by the read address values from a ROM counter 84 of a wavelength control unit 5 to be explained later, thereby sending predetermined offset values to a read address counter 64 for the buffers I–VII. These tables are composed of read-only memories (ROM), and have contents the same as those of the reference example, shown in Table 2. A read control unit 83 counts the clock signal released from the wavelength control unit 5 and supplies the buffers I–VII with a read control signal for controlling to read the packets either from the dual port memory 65 or from the FIFO 67. A buffer reading control unit 3 is composed of the buffer control tables I 76–VII 82 and the read control unit 83.

FIG. 6 shows the configuration of the buffer writing control unit 4 in the buffer control unit 2. The buffer writing control unit 4 sends, to the write address counter 63, a write start address of a memory region where each received packet is to be written, according to the transmission control algorithm to be explained later with reference to FIG. 15 from address information of the received packet read by the decoder 62 in each buffer.

Wavelength Control Unit

Figure 7:
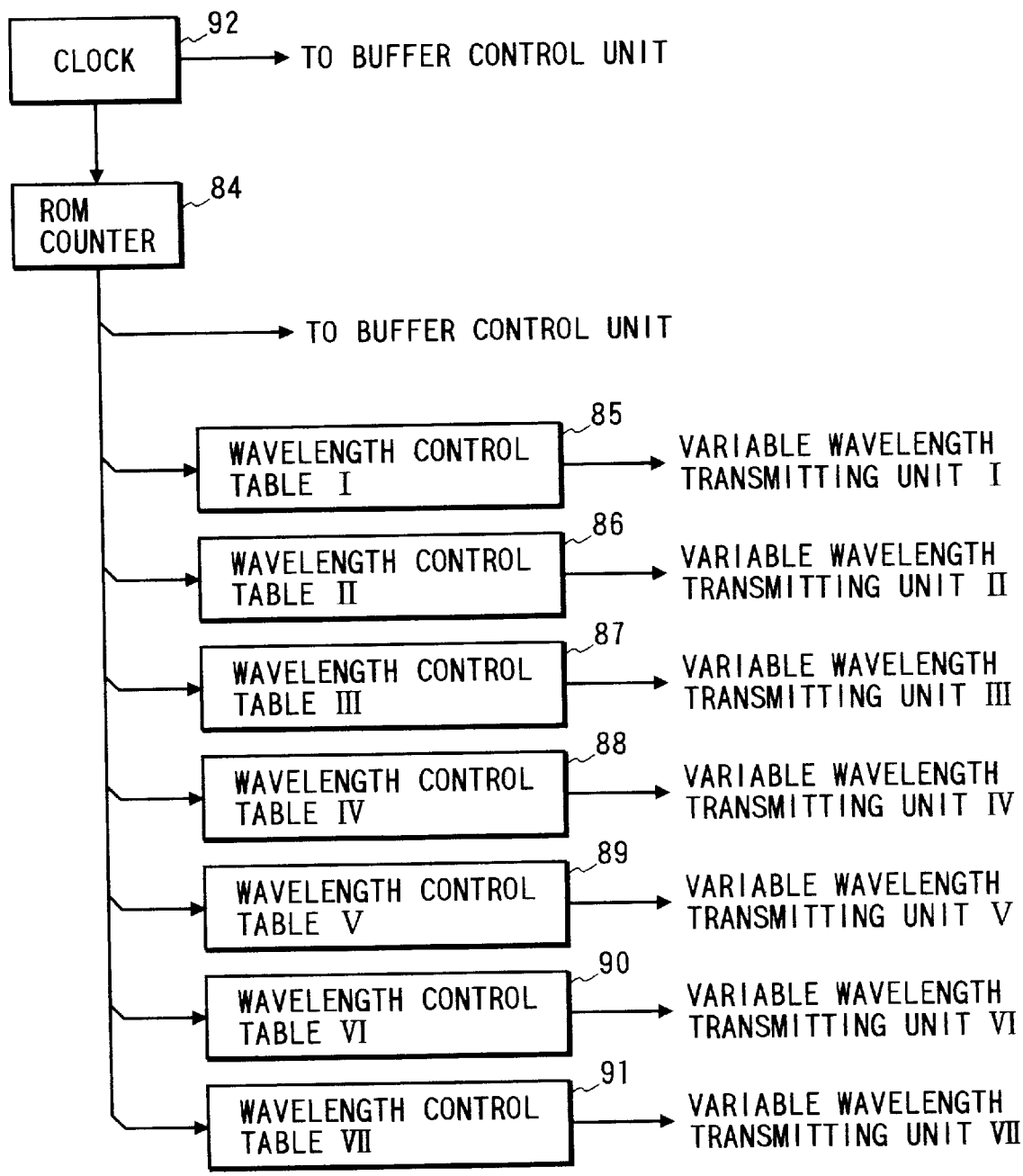
FIG. 7 is a view showing the configuration of a wavelength control unit of the present invention.

FIG. 7 shows the internal structure of the wavelength control unit 5, wherein provided are wavelength control tables I–VII (85–91), which are read in succession according to address values released from a ROM counter 84 to output predetermined wavelength control signals to drive units of the variable wavelength transmitting units. These tables are composed of read-only memories (ROM), and have contents same as those of the reference example, shown in Table 1. A clock generator 92 generates a clock signal for supply to the buffer control unit, and also divides the frequency of the clock signal for supply to the ROM counter. The wavelength control tables 85–91 and the buffer control tables 76–83 are read in synchronization achieved by the ROM counter 84 whereby the transmission wavelength of each tunable laser diode (TLD) is shifted cyclically in the order or $\lambda 1$, $\lambda 3$, $\lambda 5$, $\lambda 7$, $\lambda 6$, $\lambda 4$, $\lambda 2$ and $\lambda 1$, and the offset value for reading the memory region in the dual port memory of the buffer connected to each tunable laser diode (TLD) is shifted in synchronization in the order of A1, A3, A5, A7, A6, A4, A2 and A1. Consequently, according to the contents of the wavelength control tables 85–91 and the buffer control tables 76–83, the packet in the memory region corresponding to the transmission wavelength of the variable wavelength transmitting units 29–35 with the cyclically shift of the transmission wavelength is converted into the optical signal of the current transmission wavelength of the variable wavelength transmitting unit which corresponds to the memory region storing that packet and is outputted.

Transmission Control Algorithm

Figure 15:
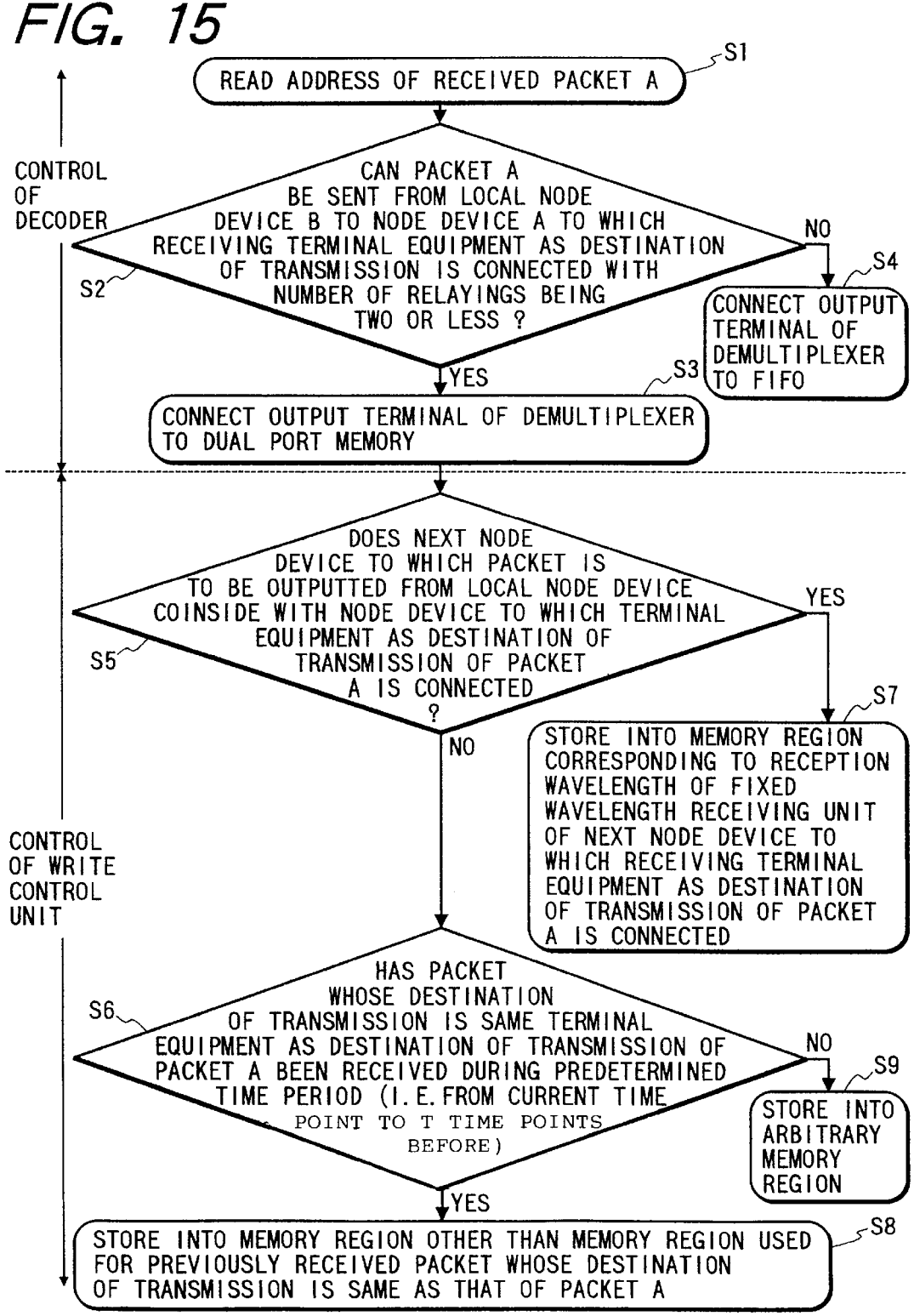
FIG. 15 shows a transmission control algorithm of the first embodiment of the invention.

FIG. 15 shows a first embodiment of the transmission control algorithm representing the transmission control method of the present invention, and the decoder 62 and the buffer writing control unit 4 of the buffer control unit 2 effect the packet writing control according to such transmission control algorithm.

The drawback in the relaying operation of the node device in the reference example results from the fact that plural packets having a same destination are received by a fixed wavelength receiving unit in the node device which sends the packets to the node device connecting with the destination terminal equipment. The plural packets having the same destination and outputted from the same variable wavelength transmitting unit have to be converted into an optical signal of a fixed wavelength of the fixed wavelength receiving unit connected to the destination terminal equipment through the separation-insertion unit. However, since the variable wavelength transmitting unit effects the cyclical wavelength shift among the transmission wavelengths, the plural packets for the same destination can be outputted only at one of such transmission wavelengths. Consequently, in a case of converting the plural packets into the optical signals of a wavelength in a variable wavelength transmitting unit and transmitting the optical signals, there are required some cyclic shifts of the wavelength control table for the transmission of all the plural packets, whereby a long time is required.

Such drawback, resulting from the fact that the plural packet having the same destination are received by a fixed wavelength receiving unit in a node device which sends the packets to the node device connecting with the destination terminal equipment, can be resolved by a control method in which the plural packets are not received by a fixed wavelength receiving unit in the node device which sends the packets to the node device connecting with the destination terminal equipment. Such transmission control method is achieved, in relaying the plural packets having the same destination and reaching such destination through two relaying operations in channel alteration units such as variable wavelength transmitting units, by transmitting such packets as the signals of different channels whereby such packets are entered in the different channels into the channel alteration unit which performs the next relying operation. FIG. 15 shows the algorithm of such transmission control method.

Function of Transmission Control Method

In the following there will be given an explanation of the transmission control method of the present network system with reference to FIGS. 1A and 1B, 2, 3, 4, 5, 6, 7, 8 to 14 and 15, and Tables 1 and 2. Operation times shown in timing charts in FIGS. 8 to 14 are mutually common. For example, an operation time T3 in FIG. 8 is same as that in FIG. 9.

Now the packet transmission control method of the present invention will be explained in an example, where the transmission route is the same as that explained in the foregoing reference example, with the transmission source being the terminal I 45 connected to the sub-transmission path I 38 of the node device I 57 and the destination terminal equipment is the terminal II 46 connected to the sub-transmission path II 39 of the node device V 61. Also in this case there will be explained the transmission of three packets A, B and C. Corresponding components of the different node devices are represented by the reference numerals shown in FIGS. 1A and 1B, 3, 4, 5 and 7, and the transmission control which is the same as that in the reference example will not be explained further.

Figure 9:
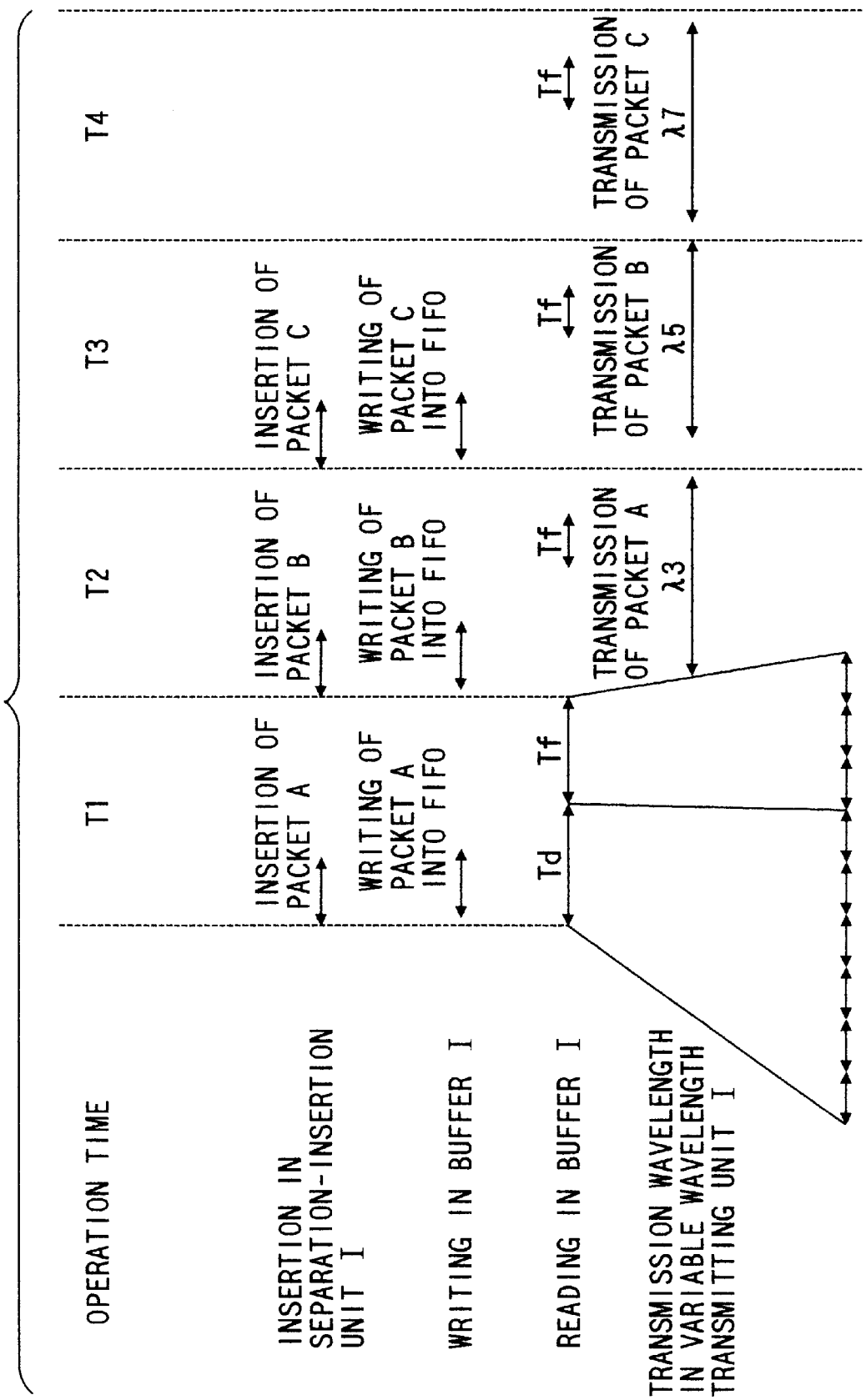

The functions of the node devices I 57–V 61 in the respectively operation times are explained with reference to FIGS. 9 to 14. The address values (sync signals) released from the ROM counter 84 for reading the buffer control tables and the wavelength control tables in each node device are assumed to be the same as the values in the respective operation times as shown in FIG. 8. The read address values shown in FIG. 8, released from the ROM counter 84 of the wavelength control unit 5 in each node device are values only shown in the periods corresponding to the operation times in the timing charts for explaining the packet relaying operation of the respective node devices and are omitted in other periods. For example, in the reference example, the packet relaying operation in the node device II 58 is explained in a period of the operation times T3 to T7 shown in FIG. 9, so that the address values of the node device II 58 are given in FIG. 8 only in a period of the operation times T3 to T7. Also each timing chart showing the function of each node device only shows the contemplated operation, so that other columns are left as blank. For example FIG. 9 shows the transmission wavelengths of the variable wavelength transmitting unit I in the operation times T2, T3 and T4 and does not show the transmission wavelength in the operation time T1, but, as will be apparent from Table 1, the variable wavelength transmitting unit I emits the optical signal of wavelength $\lambda 1$ in the operation time T1.

Operation in Node Device I 57

In the following there will be explained the communicating operation of the node device I 57 with reference to FIG. 9. It is assumed that, at the start of an operation time T1, the terminal equipment I 45 connected to the sub-transmission path I 38 of the node device I 57 as a transmission source adds, to the transmission data, the address of the destination terminal equipment II 46 connected to the sub-transmission path II 39 of the node device V 61, and releases a packet A including the above mentioned address and the transmission data through the sub-transmission path I 38 to the separation-insertion unit I 15 of the node device I 57.

In the operation time T1, the packet A is inserted by the separation-insertion unit I 15 in a gap in the packet flow received by the fixed wavelength receiving unit I 8, and is sent to the buffer I 22. In the operation time T1, the decoder 62 in the buffer I 22 reads the address portion of the entered packet A and controls the demultiplexer 66 according to the transmission control algorithm shown in FIG. 15. The destination of the packet A is a terminal equipment unit connected to the node device V 61, and, for reaching the node device V 61, there are required four relaying operations at variable wavelength transmitting unit including that in the local (self) node device I 57, namely passing of four channel alteration units. Consequently the transmission from the local node device does not require channel designation, so that the decoder 62 directs the output of the demultiplexer 66 to the FIFO 67 whereby the packet A is written therein.

In an operation time T2, the packet B is inserted by the separation-insertion unit I 15 in a gap in the packet flow and is sent to the buffer I 22, in which the decoder 62 reads the address portion of the entered packet B and controls the demultiplexer 66 according to the transmission control algorithm shown in FIG. 15. The destination of the packet B is also a terminal equipment connected to the node device V 61, and, for reaching the node device V 61, there are required four relaying operations at variable wavelength transmitting unit including that in the local (self) node device I 57. Consequently the decoder 62 directs the output of the demultiplexer 66 to the FIFO 67 whereby the packet B is written therein.

Now there will be explained the transmission wavelength control of the variable wavelength transmitting units and the packet reading control from the buffer in the operation time T2. The ROM counter 84 of the wavelength control unit 5 sends a read address value 1 simultaneously to the wavelength control tables I–VII, for reading the contents of the wavelength control tables. In this content reading, as shown in Table 1, the wavelength control tables I, II, III, IV, V, VI and VII respectively provide control signals corresponding to wavelengths $\lambda 3, \lambda 5, \lambda 7, \lambda 6, \lambda 4, \lambda 2$ and $\lambda 1$. These control signals are respectively supplied to the variable wavelength transmitting units I 29–VII 35, which in response emit optical signals of predetermined wavelengths.

The read address value 1 from the ROM counter 84 of the wavelength control unit 5 is also supplied to the buffer reading control unit 3 of the buffer control unit 2, for reading the contents of the buffer control tables I–VII. In this content reading, as shown in Table 2, the buffer control tables I, II, III, IV, V, VI and VII respectively provide offset values A3, A5, A7, A6, A4, A2 and A1 respectively corresponding to the memory regions III, V, VII, VI, IV, II and I. These offset values are respectively supplied to the read address counters 64 of the buffers I 22–VII 28. Also the read control unit 83 of the buffer control unit 2 provides, based on the clock signal released from the wavelength control unit 5, the selector 68 with a control signal for enabling the reading of the dual port memory 65 and disabling the reading of the FIFO 67 in a predetermined dual port memory reading time Td within the operation time T2, and then provides the selector 68 with a control signal for enabling the reading of the FIFO 67 and disabling the reading of the dual port memory 65 in a predetermined FIFO reading time Tf (=operation time T–Td).

In the dual port memory reading time Td within the operation time T2, the read address counter 64 in the buffer I 22 generates, for supply to the dual port memory 65, an address for reading the packet written in the memory region III, by loading the offset value A3 released from the buffer control table I 76. In response to this read address, a packet is read from the output port of the dual port memory 65 and is supplied to the variable wavelength transmitting unit I. Since no packet is stored in the memory region III of the buffer I 22 in the operation time T2, no packet is supplied to the variable wavelength transmitting unit.

In the FIFO reading time Tf (=operation time T–Td) within the operation time T2, the read control unit 83 in the buffer control unit 2 sends a control signal, for enabling the reading of the FIFO 67 and disabling the reading of the dual port memory 65, to the selector 68, which in response sends the packet A, stored in the FIFO 67, to the variable wavelength transmitting unit I 29. Since the transmission wavelength of the variable wavelength transmitting unit I 29 is set at $\lambda 3$ within the operation time T2 by the read address value 1, the packet A is converted into an optical signal of wavelength $\lambda 3$ by the variable wavelength transmitting unit I 29 and supplied to the wavelength multiplexer 36. However the transmission wavelength of each variable wavelength transmitting unit is constant, regardless of the time Tf or Td, within the operation time T. Also the variable wavelength transmitting units II 30–VII 35 respectively convert the packets released from the buffers II 23–VII 28 into optical signals of predetermined wavelengths, based on the wavelength control signal from the wavelength control unit 5 and sends these optical signals to the wavelength multiplexer 36. As explained in the foregoing, the optical signals released from the variable wavelength transmitting units II 30, III 31, IV 32, V 33, VI 34 and VII 35 respectively have wavelengths $\lambda 5, \lambda 7, \lambda 6, \lambda 4, \lambda 2$ and $\lambda 1$. Since the optical signals released from the seven variable wavelength transmitting units have mutually different wavelengths under the control of the wavelength control unit 5, these optical signals are mixed without mutual interference in the wavelength multiplexer 36, whereby the lights of all the wavelengths enter the optical fiber 37 and are transmitted to the downstream adjacent node device II 58.

In an operation time T3, a packet C is inserted into a gap in the packet flow by the separation-insertion unit I 15, and is supplied in the buffer I 22. The destination of the packet C is also the terminal equipment connected to the node device V 61, and, for reaching the node device V 61, there are required four relaying operations at variable wavelength transmitting unit including that in the present node device I 57. Consequently the decoder 62 directs the output of the demultiplexer 66 to the FIFO 67 whereby the packet C is written therein.

In the operation time T3, the packet B is read from the buffer and transmitted as explained in the foregoing. A read address value 2 is supplied from the ROM counter 84 of the wavelength control unit 5, simultaneously to the wavelength control tables I–VII for reading the contents thereof. The content read from the wavelength control table I is a control signal corresponding to a wavelength $\lambda 5$, which is supplied to the variable wavelength transmitting unit I 29. In the dual port memory read time Td within the operation time T3, since the memory region V does not store any packet, the variable wavelength transmitting unit does not receive any packet. In the FIFO read time Tf (=operation time T–Td) within the operation time T3, the read control unit 83 of the buffer control unit 2 sends a control signal, for enabling the reading of the FIFO 67 and disabling the reading of the dual port memory 65, to the selector 68, which in response sends the packet B, stored in the FIFO 67, to the variable wavelength transmitting unit I 29. As the transmission wavelength of the variable wavelength transmitting unit I 29 is set at a wavelength $\lambda 5$ by the read address value 2 in the operation time 3, the packet B is converted in the variable wavelength transmitting unit I 29 into an optical signal of a wavelength $\lambda 5$ and supplied to the wavelength multiplexer 36.

The packet C in an operation time T4 is similarly read from the FIFO 67 of the buffer I, supplied to the selector 68, then converted by the variable wavelength transmitting unit I 29 into an optical signal of $\lambda 7$ and supplied to the wavelength multiplexer 36.

Consequently, the packets A, B and C are released from node device I 57 to the optical fiber 37, respectively in the operation times T2, T3 and T4.

It is assumed that thus released packets A, B and C are respectively received, in the operation times T3, T4 and T5, by the fixed wavelength receiving units III 10, V 12 and VII 14 in the node device II 58.

Operation of Node Device II 58

Figure 10:
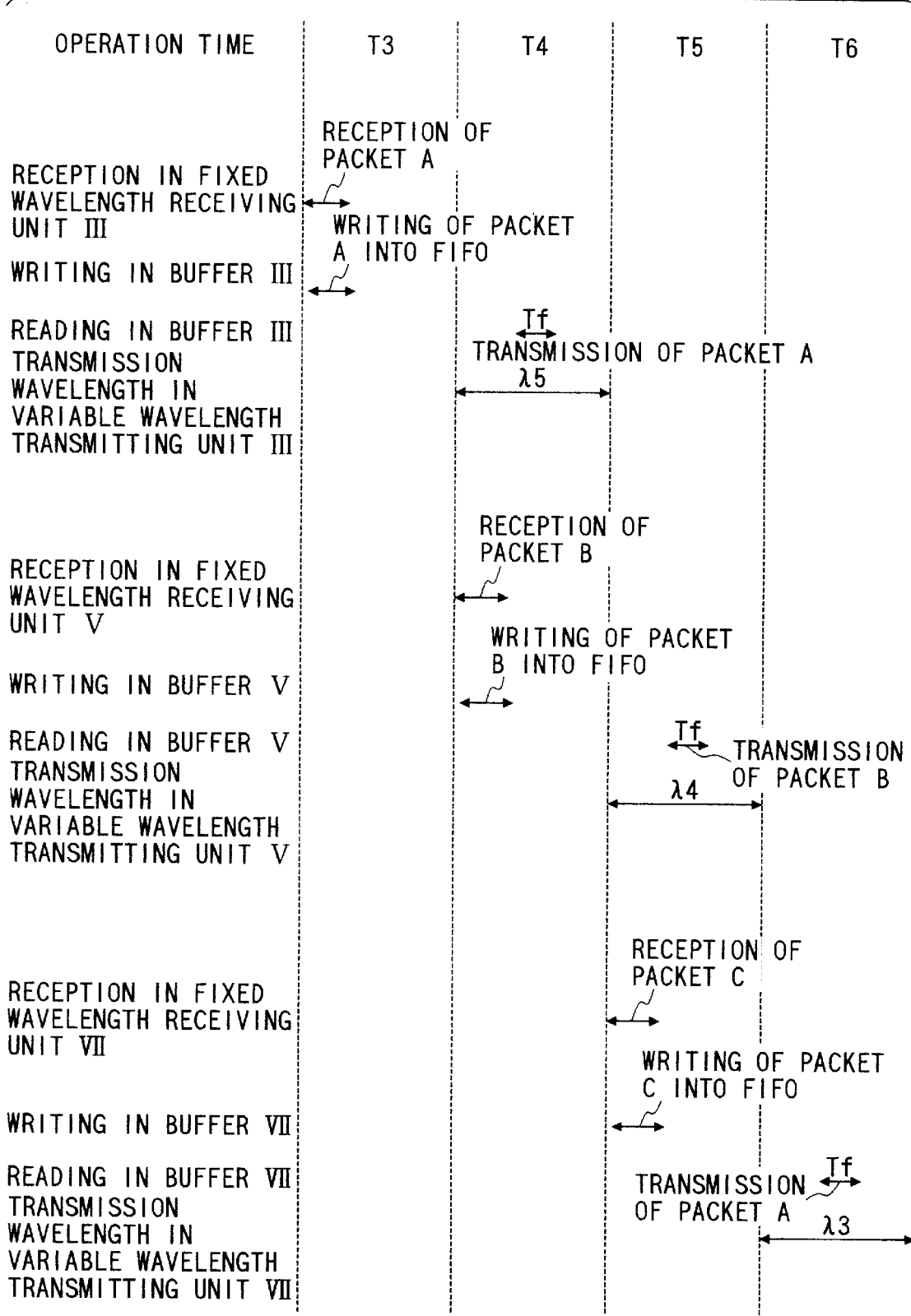

In the following there will be explained the function of the node device II 58 with reference to FIG. 10. In the operation time T3, the fixed wavelength receiving unit III 10 receives the packet A in the form of an optical signal of wavelength $\lambda 3$ and sends it to the buffer III 24, in which the decoder 62 reads the address portion of the entered packet A and controls the demultiplexer 66 according to the transmission control algorithm shown in FIG. 15. The destination of the packet A is a terminal equipment unit connected to the node device V 61, and, for reaching the node device V 61, there are required three relaying operations including that in the present node device II 58. Consequently the decoder 62 directs the output of the demultiplexer 66 to the FIFO 67 whereby the packet A is written therein.

In an operation time T4, the fixed wavelength receiving unit V 12 receives the packet B as an optical signal of wavelength $\lambda 5$ and sends it to the buffer V 26, in which the decoder 62 likewise directs the output of the demultiplexer 66 to the FIFO 67 whereby the packet B is written therein.

Also in the operation time T4, the read address value 0 from the ROM counter 84 of the wavelength control unit 5 controls the variable wavelength transmitting units III, V and VII respectively at transmission wavelengths $\lambda 5$, $\lambda 6$ and $\lambda 2$, whereby the packet A is converted by the variable wavelength transmitting unit III 31 into an optical signal of $\lambda 5$ and transmitted to the node device III 59 in the FIFO read time Tf (=operation time T–Td) within the operation time T4.

In an operation time T5, the fixed wavelength receiving unit VII 14 receives the packet C as an optical signal of wavelength $\lambda 7$. Also the packet B is transmitted by the variable wavelength transmitting unit V 33, as an optical signal of $\lambda 4$, to the node device III 59.

In an operation time T6, the packet C is transmitted by the variable wavelength transmitting unit VII 35, as an optical signal of $\lambda 3$, to the node device III 59.

Figure 11:
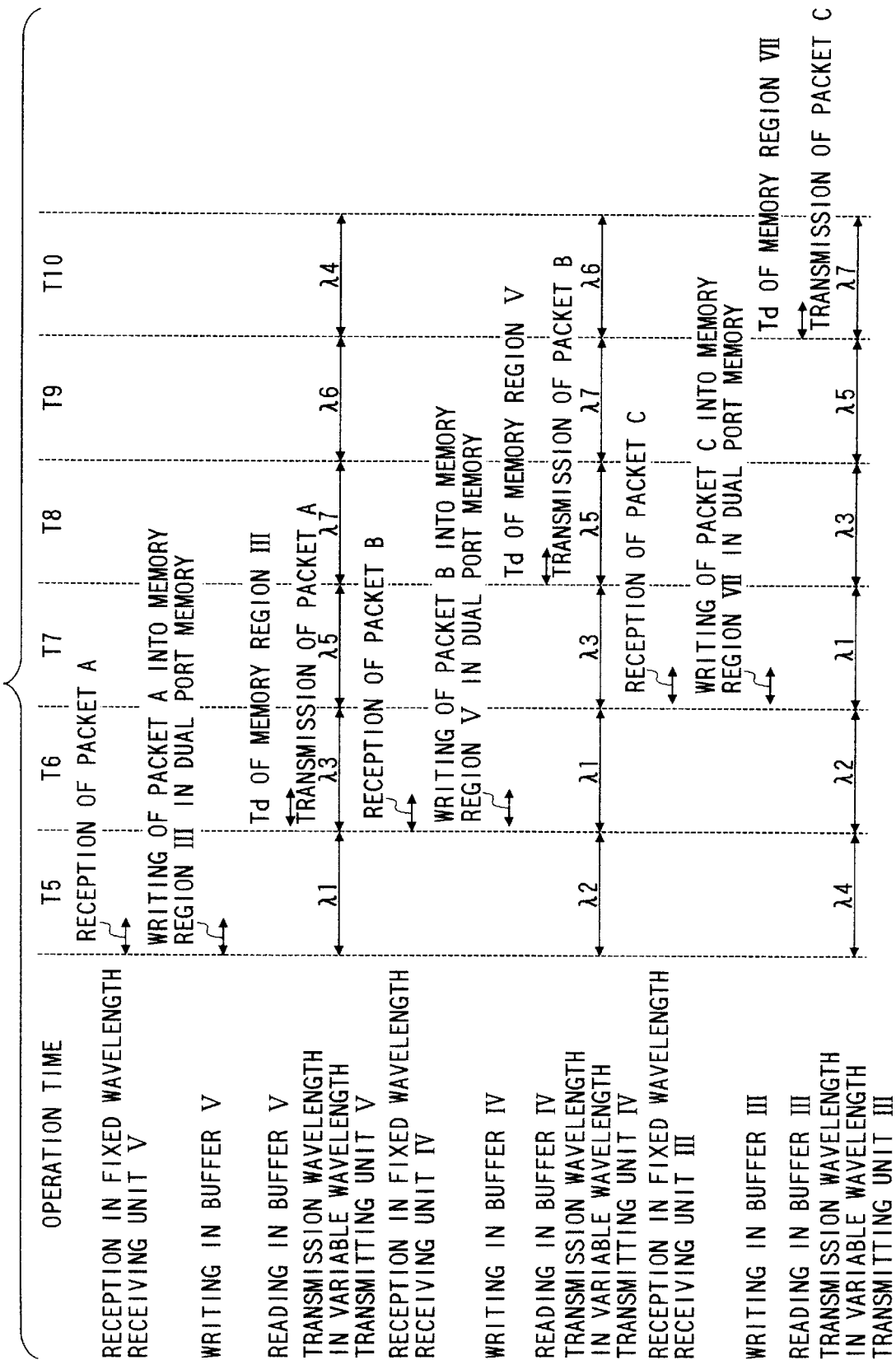

In the following there will be explained the function of the node device III 59 with reference to FIG. 11. The packets A, B and C entered into the node device III 59 have to be transmitted by two channel alteration units before reaching the destination, and the control in this node device best represents the feature of the present invention. It is assumed that the packets A, B and C are respectively received, in operation times T5, T6 and T7 by the fixed wavelength receiving units V 12, IV 11 and III 10 of the node device III 59.

In the operation time T5, the fixed wavelength receiving unit V 12 receives the packet A in the form of an optical signal of wavelength $\lambda 5$ and sends it to the buffer V 26, in which the decoder 62 reads the address portion of the entered packet A and controls the demultiplexer 66 according to the transmission control algorithm shown in FIG. 15 and outputs the address value of the packet to the buffer writing control unit 4 of the buffer control unit 2. The destination of the packet A is the terminal equipment unit connected to the node device V 61, and, for reaching the node device V 61, there are required two relaying operations including that in the present node device III 59. Consequently, since the transmission from the variable wavelength transmitting unit constituting the channel alteration unit may be made with channel designation, the decoder 62 directs the output of the demultiplexer 66 to the dual port memory 65 for storing the packets to be outputted with channel designation, and sends the address of the packet A to the buffer writing control unit 4. The buffer writing control unit 4 discriminates, according to the transmission control algorithm shown in FIG. 15, whether a packet addressed to the destination terminal equipment of the packet A has been received within a period from a past time T to the current time. It is assumed that such packet has not been received. Thus the buffer writing control unit 4 supplies the write address counter 63 with a write start address value of an arbitrary memory region, a start address value A3 of the memory region III in this case, of the buffer V 26, whereby the packet A is stored in the memory region III of the dual port memory 65 in the buffer V 26. The above-mentioned time T is defined by the product of an operation time unit and the number of alterable wavelength (T=Tn×7). However, the setting of the time T is related to the specifications of the network system and is not limited to the above-mentioned definition.

In the operation time T6, the fixed wavelength receiving unit IV 11 receives the packet B in the form of an optical signal of wavelength $\lambda 4$ and sends it to the buffer IV 25, in which the decoder 62 reads the address portion of the entered packet B and controls the demultiplexer 66 according to the transmission control algorithm shown in FIG. 15 and outputs the address value of the packet B to the buffer writing control unit 4 of the buffer control unit 2. The destination of the packet B is the terminal equipment connected to the node device V 61, and, for reaching the node device V 61, there are required two relaying operations including that in the present node device III 59. Consequently, since the transmission from the variable wavelength transmitting unit constituting the channel alteration unit may be made with channel designation, the decoder 62 directs the output of the demultiplexer 66 to the dual port memory 65. Also as a packet A addressed to the destination terminal equipment of the packet B has been received in an immediately preceding operation time unit, namely within the time T, the buffer writing control unit 4 designates, according to the transmission control algorithm shown in FIG. 15, an arbitrary memory region of the buffer IV 25 other than the memory region III, the memory region V in this case, and supplies the write address counter 63 with a write start address A5 of the memory region V.

In the operation time T6, the ROM counter 84 of the wavelength control unit 5 sends a read address value 4 to the wavelength control tables I 85–VII 91 (cf. FIG. 8), whereby the variable wavelength transmitting unit V 33 is set at a transmission wavelength λ3 (cf. Table 1). In the dual port memory read time Td within the operation time T6, the read control unit 83 of the buffer reading control unit 3 sends a control signal for enabling the reading of the dual port memory and disabling the reading of the FIFO to the selector 68. In response to the read address value 4 from the ROM counter 84 of the wavelength control unit 5, each buffer control table provides the reading address counter 64 with a control signal indicating the memory region, from which the packet is to be read, in the respective dual port memory. For example the buffer control table V 80 provides the read address counter 64 with a head address A3 of the memory region III storing the packet A. Thus the packet A is supplied through the selector 68 to the variable wavelength transmitting unit V 33, then converted therein into an optical signal of λ3 and supplied to the wavelength multiplexer 36. Also in the operation time T6, the variable wavelength transmitting units IV 32 and III 31 have respectively transmission wavelengths λ1 and λ2.

In the operation time T7, the fixed wavelength receiving unit III 10 receives the packet C, and the decoder 62 of the buffer III 24 reads the address portion of the entered packet C, then directs the output of the demultiplexer 66 to the dual port memory 65 according to the transmission control algorithm shown in FIG. 15 and sends the address value of the packet C to the buffer writing control unit 4. Based on a fact that the packets A and B have been received respectively in the immediately preceding and second preceding operation time units, namely within the time T, the buffer writing control unit 4 designates an arbitrary memory region of the buffer III 24 other than the memory regions III and V, the memory region VII in this case, according to the transmission control algorithm, and provides the write address counter 63 with a write start address value A7 of the memory region VII.

In the operation time T8, the ROM counter 84 of the wavelength control unit 5 sends a read address value 6 to the wavelength control tables I 85–VII 91 (cf. FIG. 8). The wavelength control table IV 88 sends a control signal corresponding to a wavelength λ5 to the variable wavelength transmitting unit IV 32, which is in response set at a transmission wavelength λ5 (cf. Table 1). In synchronization, the read control unit 83 sends, in the dual port memory reading time Td within the operation time T10, a control signal for enabling the reading of the dual port memory and disabling the reading of the FIFO to the selector 68, which in response connects the dual port memory 65 with the variable wavelength transmitting unit IV 32. In response to the read address value 6 from the ROM counter 84 of the wavelength control unit 5, each buffer control table provides the read address counter 64 with a control signal indicating the memory region, from which the packet is to be read, in the respective dual port memory. For example the buffer control table IV 79 provides the read address counter 64 with a head address A5 of the memory region V according to Table 2. Thus the packet B stored in the memory region V of the dual port memory 65 is supplied through the selector 68 to the variable wavelength transmitting unit IV 32, then converted therein into an optical signal of λ5 and supplied to the wavelength multiplexer 36. In an operation time T10, the variable wavelength transmitting units III 31 transmits the packet C as an optical signal of λ7 to the node device IV 60.

Function of Node Device IV 60

Figure 12:
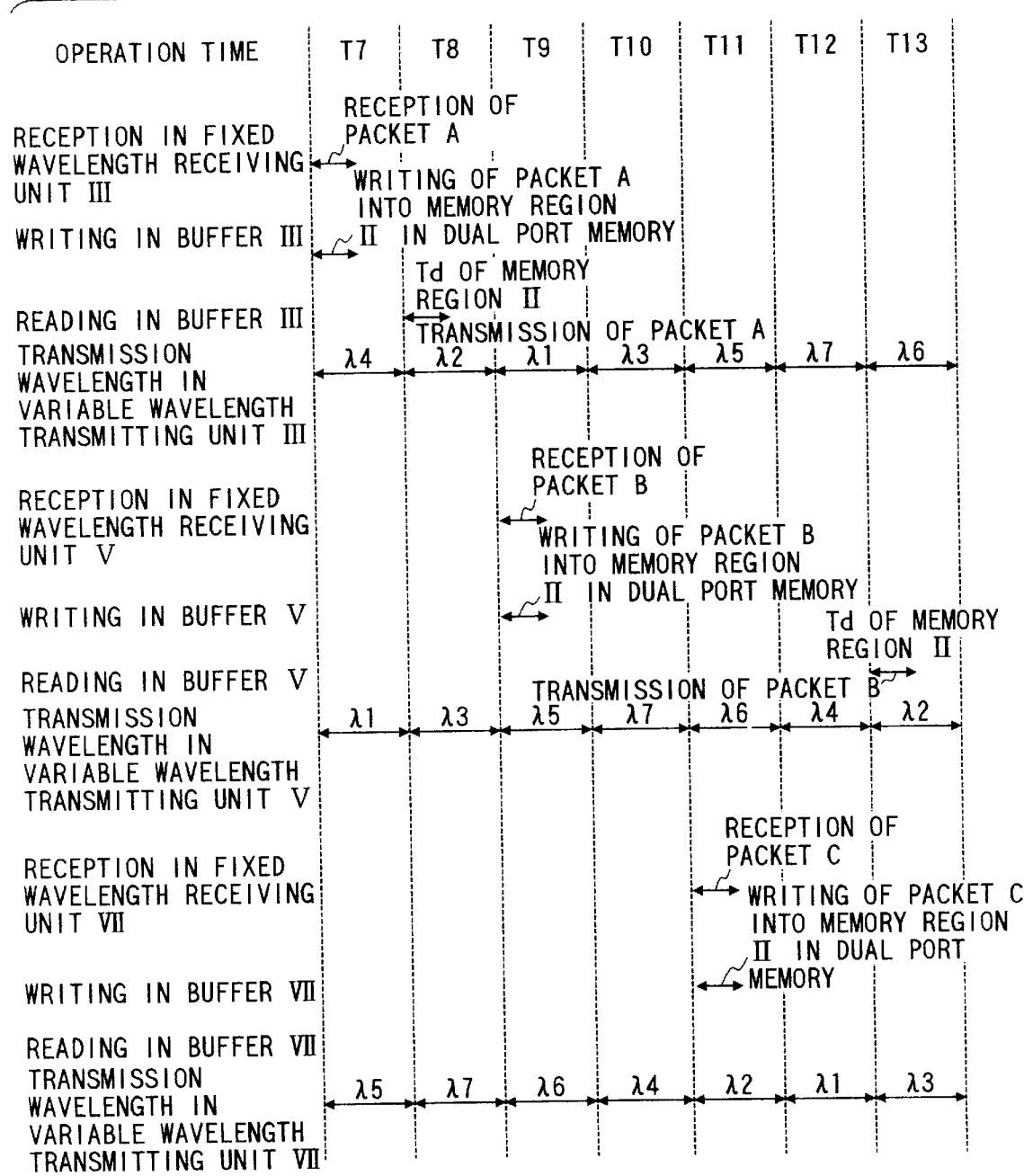
Figure 13:
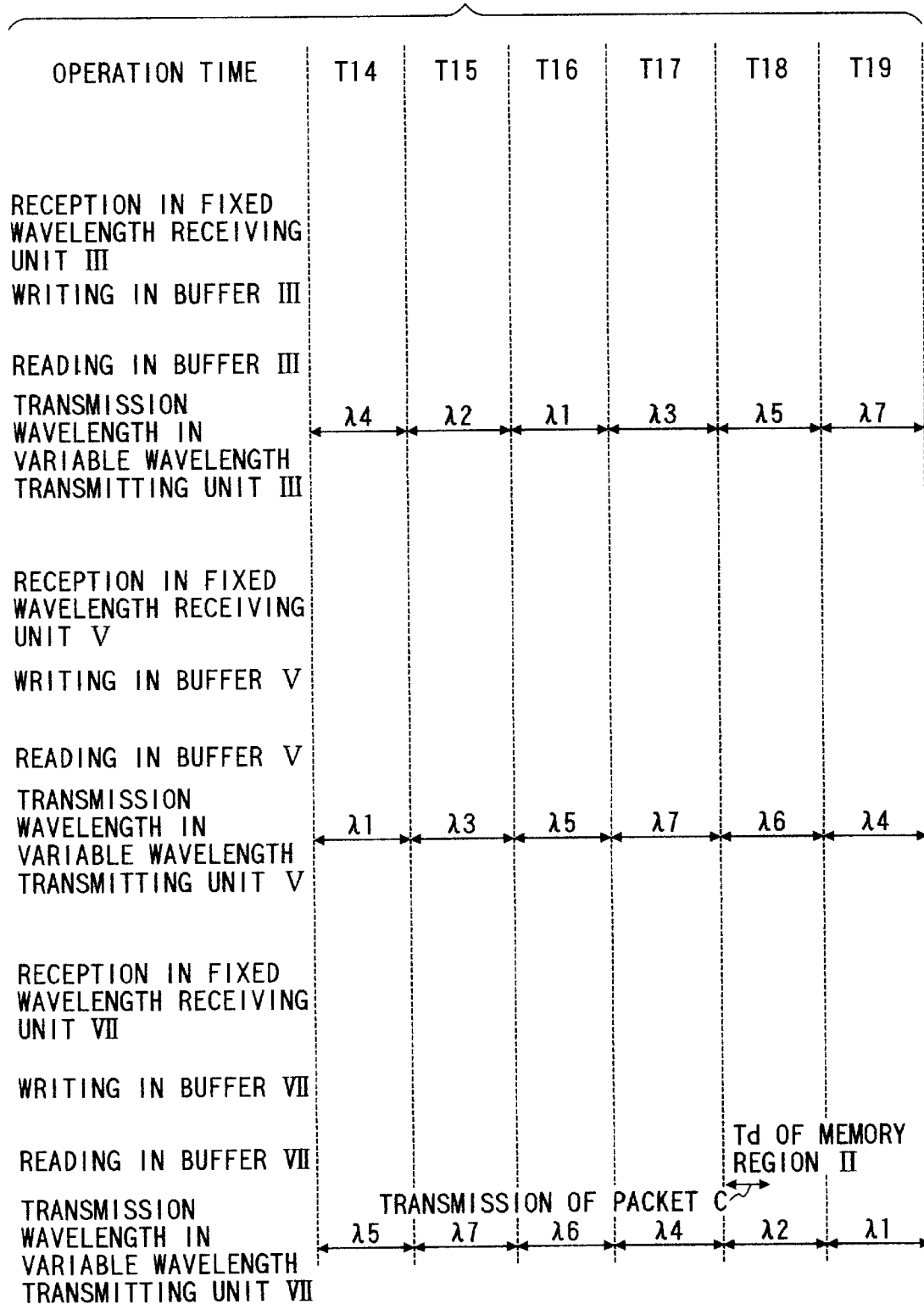

In the following there will be explained the function of the node device IV 60 with reference to FIGS. 12 and 13. It is assumed that the packets A, B and C are respectively received, in the operation times T7, T9 and T11, by the fixed wavelength receiving units III 10, V 12 and VII 14 in the node device IV 60.

In the operation time T7, the fixed wavelength receiving unit III 10 receives the packet A in the form of an optical signal of wavelength λ3 and sends it to the buffer III 24, in which the decoder 62 reads the address portion of the packet A. Since the destination of the packet A is the terminal equipment II 46 connected to the adjacent node device V 61, the transmission from the variable wavelength transmitting unit has to be made with channel designation, and the decoder 62 directs the output of the demultiplexer 66 to the dual port memory 65 and provides the buffer writing control unit 4 with the address value of the packet A. Thus, according to the transmission control algorithm shown in FIG. 15, the buffer writing control unit 4 sends a write start address value A2 for the packet A to the write address counter 63, which in response provides the dual port memory 65 with an identification signal of the write start address of the memory region II in which the packet A is to be written, starting from the write start address value, whereby the packet A is written in the memory region II.

In the operation time T8, the ROM counter 84 of the wavelength control unit 5 sends a read address value 4 simultaneously to the wavelength control tables I–VII to output the contents thereof. The wavelength control table III 87 sends a control signal corresponding to a wavelength λ2 to the variable wavelength transmitting unit III 31, which is set at a transmission wavelength λ2. In synchronization, in the dual port memory read time Td within the operation time T8, the read control unit 83 of the buffer reading control unit 3 sends a control signal for enabling the reading of the dual port memory and disabling the reading of the FIFO to the selector 68, which in response connects the dual port memory 65 and the variable wavelength transmitting unit III 31. Also in response to the read address value 4 from the ROM counter 84 of the wavelength control unit 5, the buffer control table III 78 provides the read address counter 64 with a head address A2 of the memory region. Thus the packet A stored in the memory region II of the dual port memory 65 is supplied through the selector 68 to the variable wavelength transmitting unit III 31, then converted therein into an optical signal of λ2 and supplied to the wavelength multiplexer 36.

In the operation time T9, the fixed wavelength receiving unit V 12 receives the packet B in the form of an optical signal of wavelength λ5 and sends it to the buffer V 26. The decoder 62 thereof reads the address portion of the entered packet B, and directs the output of the demultiplexer 66 to the dual port memory 65. Then the buffer writing control unit 4 outputs a write start address value A2 of the packet B to the write address counter 63, whereby the packet B is stored in the memory region II of the dual port memory 65.

In the operation time T11, the packet C is stored, like the packets A and B, in the memory region II of the dual port memory 65.

The packets B and C are read from the memory region II and transmitted when the variable wavelength transmitting unit connected with the buffer storing each packet is set at the transmission wavelength λ2. Thus, as will be apparent from FIGS. 12 and 13, the packets B and C are respectively transmitted in operation times T13 and T18.

Function of Node Device V 61

Figure 14:
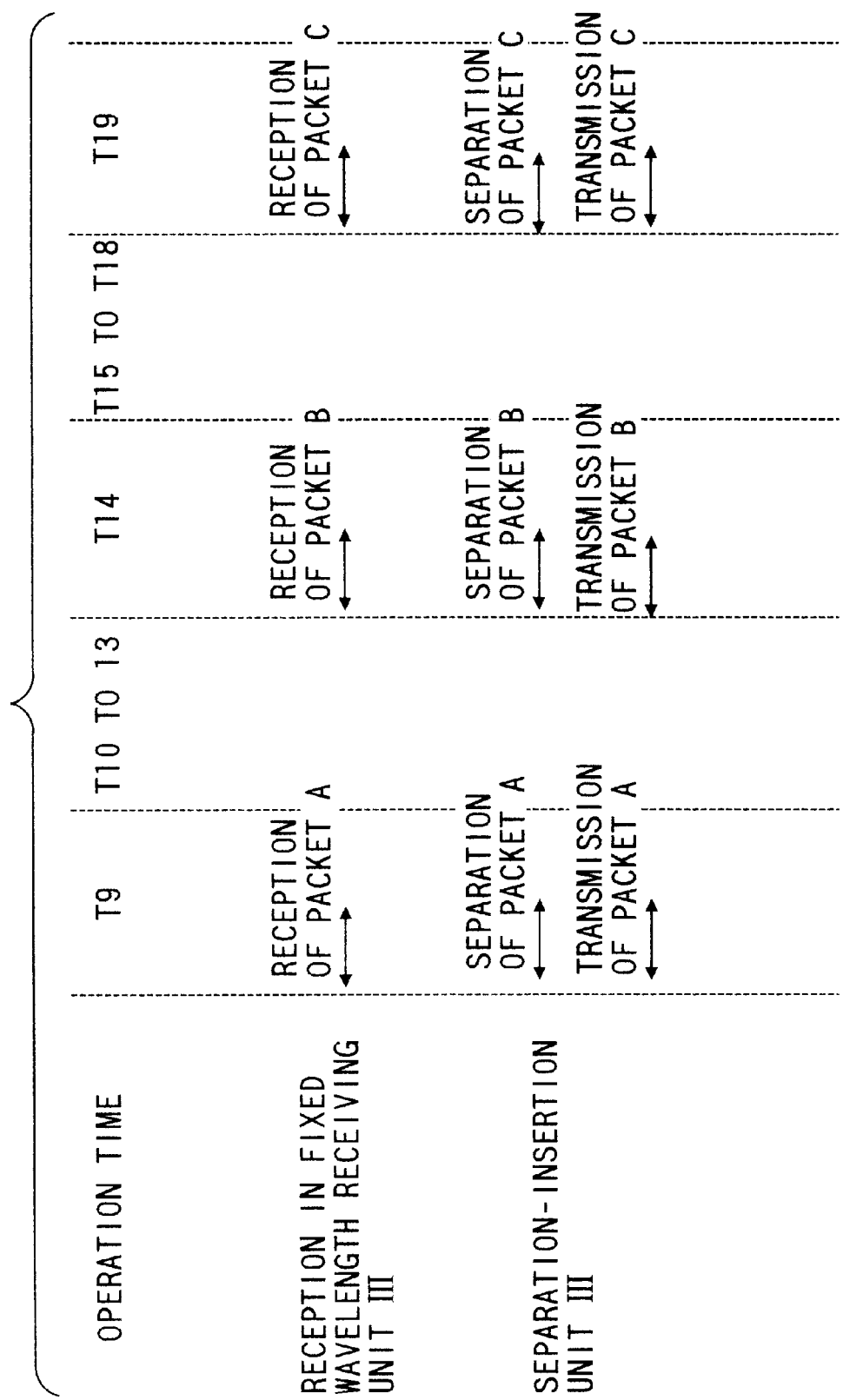

In the following there will be explained the function of the node device V 61 with reference to FIG. 14. It is assumed that the packets A, B and C are received, respectively in operation times T9, T14 and T19, by the fixed wavelength receiving unit II 9 in the node device V 61.

The packet A received in the operation time T9 is separated in the separation-insertion unit II 16 from the packets to be transmitted to the buffer II 23, and is transmitted to the destination terminal equipment II 46. Similarly, the packet B received in the operation time T14 is separated in the separation-insertion unit II 16 from the packets to be transmitted to the buffer II 23 and transmitted to the terminal equipment II 46. Also the packet C received in the operation time T19 is similarly transmitted to the terminal equipment II 46.

Thus the transmission control method of the present invention can resolve the drawback of long waiting time in the buffer of the node device, thereby allowing to reduce the delay in transmission.

In the above-explained embodiment employing the algorithm of the transmission control method shown in FIG. 15, the writing of the packets in the buffer of the node device is naturally controlled in the same manner as in the reference example in case the destination of the plural packets to be transmitted is in the adjacent node device, but, in case the destination is in a second adjacent node device which is adjacent to the adjacent node device, the writing of the packets is controlled in such a manner that the plural packets having the same destination are not entered by the same channel into the adjacent node device, whereby the destination node device can receive the plural packets within a short time.

In the configuration of the above-explained first embodiment, in order to avoid that the plural packets to be entered by a same channel into the node device of the destination (more specifically plural packets having a same destination) are entered, at a point of passing a last channel alteration unit such as a variable wavelength transmitting unit before reaching the destination node device, by the same channel into such last channel alteration unit, there is monitored whether plural packets of a given destination have been entered within a predetermined time, at a point where the packets have to pass two channel alteration units before reaching the destination node device, and, if entered, there is executed control to transmit such plural packets in respectively different channels.

The control to avoid entry by the same channel into the last channel alteration unit before reaching the destination node device can be achieved by various ways, in addition to the above-explained method. The following second embodiment shows a configuration of attaching, in a case of transmitting plural packets of the same destination, transmission channel information to be referred to in a channel alteration unit immediately preceding the last channel alteration unit to such plural packets in the transmitting side (not necessarily the originating terminal equipment).

Second Embodiment

Figure 21:
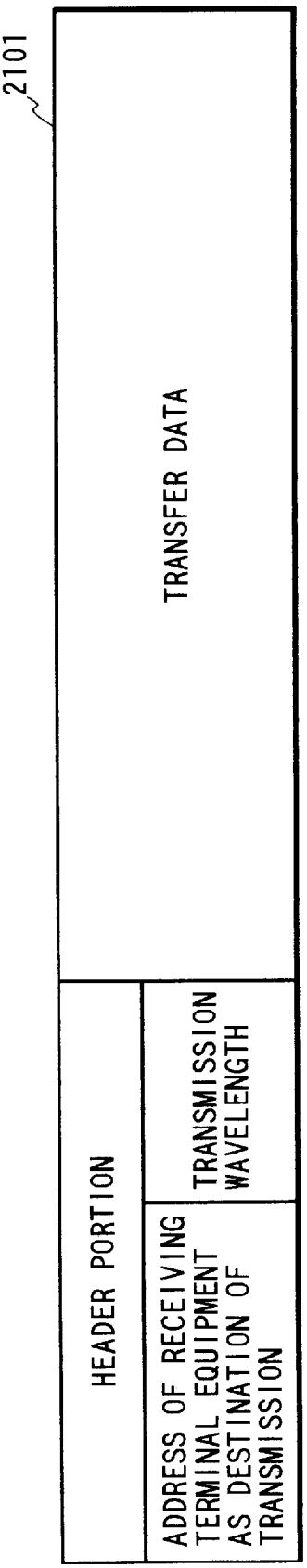
FIG. 21 is a view showing the configuration of a packet employed in a second embodiment of the present invention.

FIG. 21 shows the configuration of a packet header of the present invention. A packet 2101 includes a header portion composed of a code indicating the address of a receiving terminal equipment unit constituting the destination and a code indicating the wavelength and transfer data and is transmitted, for example in case of ATM LAN, by a unit cell of 53 bytes consisting of the header portion of 5 bytes and fixed-length data of 48 bytes. Each node device reads the destination of the received packet from the header portion thereof, and discriminates, according to the positional relationship between this node device and the destination, whether the received packet is to be converted into the optical signal of the transmission wavelength indicated by the header portion. If the result of discrimination indicates that the packet is to be converted in this node device into the optical signal of the wavelength information contained in the header portion, the received packet is converted into the optical signal of such wavelength. The detailed function sequence of the node device will be explained later.

In the present embodiment, the local (self) node device converts the received packet into the optical signal of the transmission wavelength contained in the header portion of such received packet, in case the node device connected to the receiving terminal equipment constituting the destination of the received packet is a second node device positioned at the downstream side. Consequently, in order to discriminate whether the local (self) node device is to convert the packet into the optical signal of the wavelength contained in the header portion, each node device only require the address information of the destination terminal equipment of the packet and that of terminal equipment units connected to the second downstream node device from the local node device. In the present embodiment, each node device is provided not only with the address information of the terminal equipments connected to the first downstream node device but also with that of the terminal equipments connected to the second downstream node device, so that the header portion of the packet does not contain an area for an identifier indicating the node device connected to destination terminal equipment.

Figure 22B:
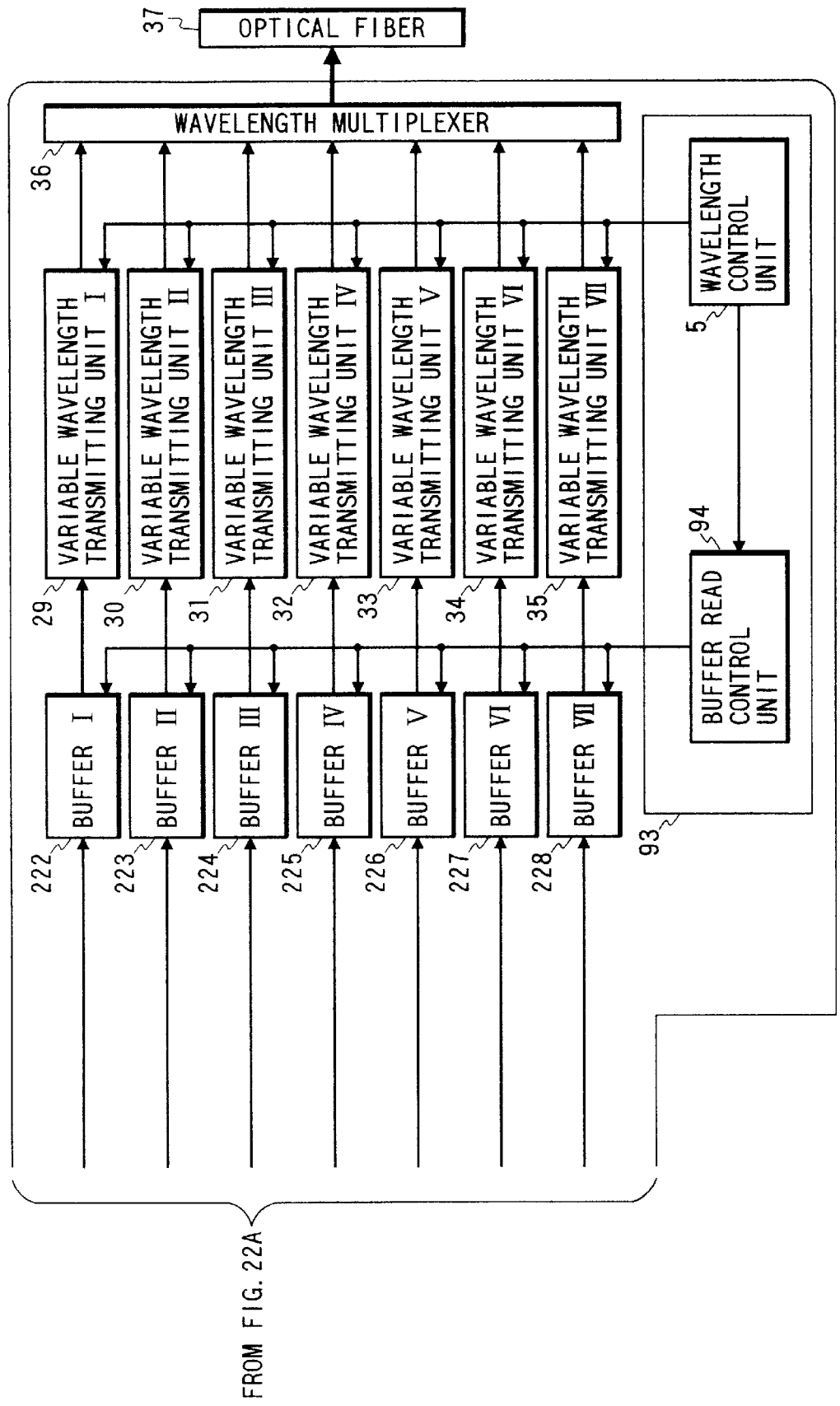
FIG. 22, which is composed of FIGS. 22A and 22B, 25B is a view showing the configuration of a node device employed in the second embodiment of the present invention.

FIGS. 22A and 22B show the configuration of a node device, which is different from the node device of the reference example in the structure of the buffers. In the following description, components named the same as in the reference example or in the first embodiment have equivalent functions, unless specified otherwise. In FIGS. 22A and 22B, there will not be explained certain components which are of equivalent functions as in the reference example. A control unit 93 of the present node device is provided therein with a buffer read control unit 3 and a wavelength control unit 5. A buffer reading control unit 3 controls the buffer reading operation in such a manner that, in a case where the sub-transmission path at the destination of the packet stored in the buffer is connected to the adjacent node device, the packet stored in the buffer is not read until the wavelength to be received, in the adjacent node device, by the fixed wavelength receiving unit which outputs the packet to the separation-insertion unit connected to the sub-transmission path of the destination coincides with the transmission wavelength of the variable wavelength transmitting unit for transmitting the packet. The wavelength control unit 5 controls the transmission wavelength of the variable wavelength transmitting unit according to the pattern of a predetermined wavelength control table to be explained later.

Buffers I–VII (222–228) constituting buffer means serve to temporarily store the packets, released from the separation-insertion unit, in the memory regions corresponding to the transmission wavelengths of the variable wavelength transmitting units.

The configuration of the network system of the present embodiment is the same as that explained in FIG. 2.

Figure 23:
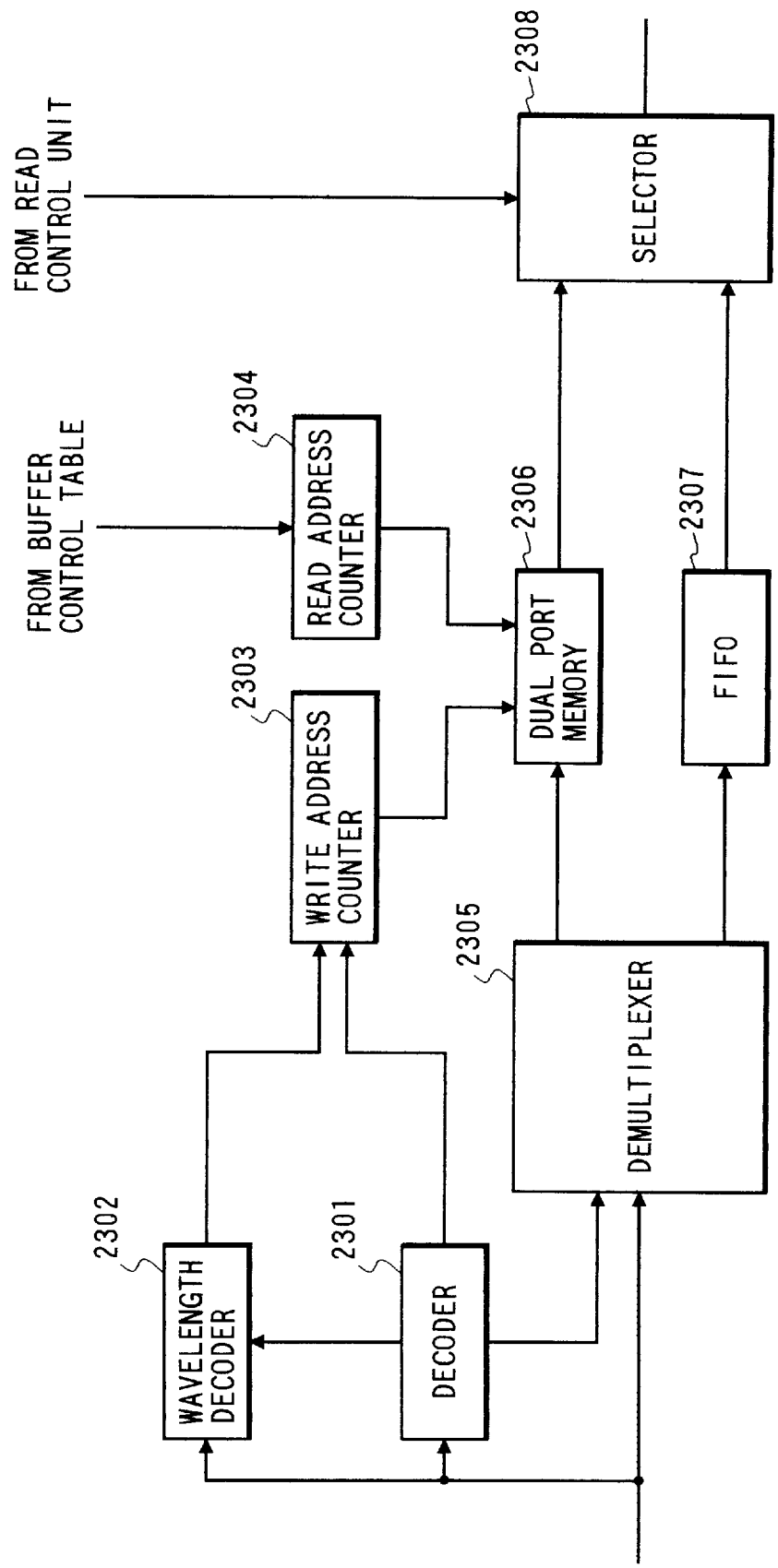
FIG. 23 is a view showing the configuration of a buffer employed in the second embodiment of the present invention.

FIG. 23 shows the internal configuration of the buffer in the second embodiment of the present invention. The buffers I to VII have an identical internal configuration. In FIG. 23, a decoder 2301 reads the address portion of the input packet, analyzes the number of relaying operations including that in the local (self) node device before the packet reaches the node device connected to the destination terminal equipment, and controls a demultiplexer 2305, a wavelength decoder 2302 and a write address counter 2303 according to the result of such judgment.

In a case where the packet cannot reach the destination node device within two relaying operations, the decoder 2301 directs the output of the demultiplexer 2305 to an FIFO 2307, but, in a case where the packet can reach the destination with two relaying operations, the decoder 2301 directs the output of the demultiplexer 2305 to a dual port memory 2306, and provides the wavelength decoder 2302 with a reading instruction for the transmission wavelength contained in the header portion of the packet. Also in a case where the local (self) node device directly can transmit the received packet to the node device connected to the destination terminal equipment of the received packet, the decoder 2301 directs the output of the demultiplexer 2305 to the dual port memory 2306 and provides the write address counter 2303 with a write start address value of the memory region for the packet.

The wavelength decoder 2302, upon receiving the reading instruction for the transmission wavelength of the header portion from the decoder 2301, reads such transmission wavelength from the header portion and provides the write address counter 2303 with a write start address value for the memory region corresponding to such transmission wavelength.

A write address counter 2303 provides the dual port memory 2306 with identification signals of address areas in which the packets are to be stored in succession, according to the write start address supplied either from the decoder 2301 or from the wavelength decoder 2302. A read address counter 2304 provides the dual port memory 2306 with read address for packet reading, starting from a read start address indicated by an offset value released from a corresponding buffer control table in the buffer reading control unit 3. A demultiplexer 2305 sends the entered packet either to the dual port memory 2306 or to the FIFO 2307 according to the instruction from the decoder 2301.

The dual port memory 2306 is provided for effecting the writing and the reading of the packet data in mutually independent manner, and is provided with memory regions for storing packets, corresponding to the wavelengths of the optical signals into which the packets are to be converted. For example, a packet stored in a memory region IV is read only when the transmission wavelength of the variable wavelength transmitting unit is set at the wavelength $\lambda 4$, and is transmitted thereby as the optical signal of wavelength $\lambda 4$. The packet stored in each memory region is converted into the optical signal of a wavelength corresponding to each memory region and released from the node device. The head addresses value of the memory regions are respectively A1, A2, A3, A4, A5, A6 and A7. A FIFO (first-in-first-out) register 2307 temporarily stores the input packets and releases them in the order of input to a selector 2308.

The selector 2308 connects the output of the dual port memory 2306 or the FIFO 2307 to the variable wavelength transmitting unit according to the instruction from the read control unit in the buffer read control unit 3. The present buffer is different from that of the reference example in the presence of the wavelength decoder 2302 and in that the received packet is stored in a predetermined memory region in the dual port memory 2306 by the write start address value from the decoder 2301 or from the wavelength decoder 2302.

In the present embodiment, at first the transmitting terminal equipment writes mutually different wavelength information in the header portions of each of the packets to be transmitted, one packet for each of the variable wavelengths. Each node device receiving such packet discriminates, from the address of the destination terminal equipment thereof, whether the received packet is to be converted in the local (self) node device into the optical signal of the transmission wavelength indicated in the header portion of the packet, and, if such conversion is to be made, converts the packet into the optical signal of the wavelength indicated in the header portion. Such conversion of the packet into the optical signal of the wavelength indicated in the header portion is executed in a second upstream node device of the node device connected to the destination receiving terminal equipment of the packet. The first upstream node device converts the packet into the wavelength according to the address information of the destination, as in the reference example or in the first embodiment.

In this transmission control method, the packets equal to number to the variable wavelengths, transmitted from a terminal equipment unit, have a smaller probability of being received by a fixed wavelength receiving unit in the first upstream node device of the node device connected to the destination receiving terminal equipment, whereby the delay in the packet transmission can be reduced.

Table 3 shows address information stored in the node device II 58, including the address information of the terminal equipment unit connected to the first downstream node device III 59 and that of the terminal equipment unit connected to the second downstream node device IV 60.

TABLE 3

| Terminal equipment addresses connected to the first downstream node device | |
|---|---|
| Terminal equipment | ca |
| Terminal equipment | cb |
| Terminal equipment | cc |
| Terminal equipment | cd |
| Terminal equipment | ce |
| Terminal equipment | cf |
| Terminal equipment | cg |
| Terminal equipment addresses connected to the second downstream node device | |
| Terminal equipment | da |
| Terminal equipment | db |
| Terminal equipment | dc |

TABLE 3-continued

| | |
|---|---|
| Terminal equipment | dd |
| Terminal equipment | de |
| Terminal equipment | df |
| Terminal equipment | dg |

The node device II 58 compares the address of the destination receiving terminal equipment of the received packet with the address information shown in Table 3, thereby discriminating whether the packet is to be converted into the optical signal of a transmission wavelength contained in the header portion of the received packet. The packet conversion into the optical signal of the wavelength contained in the transmission wavelength area of the header portion is conducted in a case where the receiving terminal equipment constituting the destination of the received packet is connected to a second downstream node device. In the example shown in Table 3, the packet conversion into the optical signal of the wavelength indicated in the header portion is executed in case the received packet is addressed to the terminal da, db, dc, dd, de, df or dg.

Tables 4 and 5 respectively show the address information stored in the node devices III 59 and IV 60.

TABLE 4

| | |
|---|---|
| Terminal equipment addresses connected to the first downstream node device | |
| Terminal equipment | da |
| Terminal equipment | db |
| Terminal equipment | dc |
| Terminal equipment | dd |
| Terminal equipment | de |
| Terminal equipment | df |
| Terminal equipment | dg |
| Terminal equipment addresses connected to the second downstream node device | |
| Terminal equipment | ea |
| Terminal equipment | eb |
| Terminal equipment | ec |
| Terminal equipment | ed |
| Terminal equipment | ee |
| Terminal equipment | ef |
| Terminal equipment | eg |

TABLE 5

| | |
|---|---|
| Terminal equipment addresses connected to the first downstream node device | |
| Terminal equipment | ea |
| Terminal equipment | eb |
| Terminal equipment | ec |
| Terminal equipment | ed |
| Terminal equipment | ee |
| Terminal equipment | ef |
| Terminal equipment | eg |
| Terminal equipment addresses connected to the second downstream node device | |
| Terminal equipment | aa |
| Terminal equipment | ab |
| Terminal equipment | ac |
| Terminal equipment | ad |
| Terminal equipment | ae |
| Terminal equipment | af |
| Terminal equipment | ag |

In the following there will be explained the transmission control method of the present network system, with reference to FIGS. 21, 22A and 22B, 2, 23, 4, 5, 7 and 8, Tables 1, 2, 3, 4 and 5, and timing charts in FIGS. 9 to 14. The operation times shown in FIGS. 8 to 14 are common in these timing charts. For example, an operation time T3 in FIG. 8 is same as that in FIG. 9. Also Tables 1 and 2 are the same as those explained in the reference example.

Conditions of Example of Transmission Control Method

Now the function of the transmission control method is explained by an example, as in the reference example and the first embodiment, of transmission of a packet dispatched from a terminal equipment I 45, connected to the sub-transmission path I 38 of the node device I 57, and having the destination at a terminal equipment II 46 connected to the sub-transmission path II 39 of the node device V 61. Also in the present embodiment there will be explained the transmission of three packets A, B and C. For the purpose of clarity, equivalent components in the different node device are represented by same numerals. The transmission control will not be explained where it is the same as in the reference example.

The operations of the node devices I 57–V 61 at different operation times will be explained with respective reference to FIGS. 9 to 14, employed in the description of the first embodiment. Also as in the first embodiment, it is assumed that the read address values (sync signals) from the ROM counter 702 for reading the buffer control tables and the wavelength control tables in the node device have the values in the respective operations times shown in FIG. 8. Also the read address values from the ROM counter 702 of the wavelength control unit 203 in each node device are given in FIG. 8 only for periods corresponding to the operation times of the packet relaying functions of the different node devices in the relevant drawings and are omitted in other periods.

In the following there will be explained the communicating operation of the node device I 57 with reference to FIG. 9. At the start of the operation time T1, the terminal equipment I 45 (terminal equipment aa) connected to the sub-transmission path I 38 of the originating node device I 57 writes, in the header portion of a packet to be transmitted, the address of the terminal equipment II 46 (terminal equipment eb) connected to the sub-transmission path II 39 of the destination node device V 61 and the information on the wavelength $\lambda 3$, and sends the packet to the separation-insertion unit I 15 of the node device I 57 through the sub-transmission path I 38. This packet is hereinafter called the packet A.

In the operation time T1, the packet A is inserted by the separation-insertion unit I 15 in a gap in the packet flow received by the fixed wavelength receiving unit I 8, and is sent to the buffer I 222. In the operation time T1, the decoder 2301 of the buffer I 222 reads the address portion of the entered packet A and discriminates whether the packet A can reach the node device connected to the destination terminal equipment within two relaying operations including that in the local (self) node device. The destination of the packet A is a terminal equipment connected to the node device V 61, and, for reaching the node device V 61, there are required four relaying operations including that in the local (self) node device I 57. If the packet cannot reach the destination within two relaying operations, the decoder 2301 directs the output of the demultiplexer 2305 to the FIFO 2307 whereby the packet A is written therein.

In the operation time T2, the terminal equipment I 45 (terminal equipment aa) writes, in the header portion of a packet to be transmitted, the address of the terminal equipment II 46 (terminal equipment eb) connected to the sub-transmission path II 39 of the destination node device V 61 and the information on the wavelength λ5 which is different from the transmission wavelength (to be used in the second upstream node device) of the packet A, and sends the packet to the separation-insertion unit I 15 of the node device I 57, through the sub-transmission path I 38. This packet is hereinafter called the packet B. The information of the wavelength λ5 in the header portion of the packet B is selected in order to select a different value from λ3 which is selected as the wavelength of the optical signal into which the packet A is to be converted in a desired node device. Therefore, the wavelength information written in the header portion of the packet B can be any of the wavelengths, other than the wavelength λ3, adoptable in the variable wavelength transmitting portion. The packet B is inserted by the separation-insertion unit I 15 in a gap in the packet flow, and is sent to the buffer I 222. The decoder 2301 of the buffer I 222 reads the address portion of the entered packet B and discriminates whether the packet B can reach the node device connected to the destination terminal equipment within two relaying operations including that in the local (self) node device. The destination of the packet B is a terminal equipment connected to the node device V 61, and, for reaching the node device V 61, there are required four relaying operations including that in the local (self) node device I 57. Stated differently, the packet has to pass four channel alteration units before reaching the destination terminal equipment. If the packet cannot reach the destination within two relaying operations, the decoder 2301 directs the output of the demultiplexer 2305 to the FIFO 2307 whereby the packet B is written therein.

Now there will be explained the transmission wavelength control of the variable wavelength transmitting units and the packet reading control from the buffers in the operation time T2. The ROM counter 84 of the wavelength control unit 5 sends a read address value 1 simultaneously to the wavelength control tables I–VII, for reading the contents thereof. In this content reading, as shown in Table 1, the wavelength control tables I, II, III, IV, V, VI and VII respectively provide control signals corresponding to wavelengths λ3, λ5, λ7, λ6, λ4, λ2 and λ1. These control signals are respectively supplied to the variable wavelength transmitting units I 29–VII 35, which in response emit optical signals of predetermined wavelengths.

The read address value 1 from the ROM counter 84 of the wavelength control unit 5 is also supplied to the buffer reading control unit 3, for reading the contents of the buffer control tables I–VII. In this content reading, as shown in Table 2, the buffer control tables I, II, III, IV, V, VI and VII respectively provide offset values A3, A5, A7, A6, A4, A2 and A1 respectively corresponding to the memory regions III, V, VII, VI, IV, II and I. These offset values are respectively supplied to the read address counters 2304 of the buffers I 222–VII 228. Also the read control unit 83 of the buffer read control unit 3 provides, based on the clock signal released from the wavelength control unit 5, the selector 2308 with a control signal for enabling the reading of the dual port memory 2306 and disabling the reading of the FIFO 2307 in a predetermined dual port memory reading time Td within the operation time T2, and then provides the selector 2308 with a control signal for enabling the reading of the FIFO 2307 and disabling the reading of the dual port memory 2306 in a predetermined FIFO reading time Tf (=operation time T−Td). Also in this embodiment, a packet is read in each of the times Td and Tf.

In the dual port memory reading time Td within the operation time T2, the read address counter 2304 in the buffer I 222 generates, for supply to the dual port memory 2306, an address for reading the packet written in the memory region III, by loading the offset value A3 released from the buffer control table I 76. In response to this read address, a packet is read from the output port of the dual port memory 2306 and is supplied to the variable wavelength transmitting unit I. Since no packet is stored in the memory region III of the buffer I 222 in the operation time T2, no packet is supplied to the variable wavelength transmitting unit.

In the FIFO reading time Tf (=operation time T−Td) within the operation time T2, the read control unit 83 in the buffer read control unit 3 sends a control signal, for enabling the reading of the FIFO 2307 and disabling the reading of the dual port memory 2306, to the selector 2308, which in response sends the packet A, stored in the FIFO 2307, to the variable wavelength transmitting unit I 229. Since the transmission wavelength of the variable wavelength transmitting unit I 229 is set at λ3 within the operation time T2 by the read address value 1, the packet A is converted into an optical signal of wavelength λ3 by the variable wavelength transmitting unit I 229 and supplied to the wavelength multiplexer 36. However, the transmission wavelength of each variable wavelength transmitting unit is constant, regardless of the time Tf or Td, within the operation time T. Also the variable wavelength transmitting units II 30–VII 35 respectively convert the packets released from the buffers II 223–VII 228 into optical signals of predetermined wavelengths, based on the wavelength control signal from the wavelength control unit 5 and sends these optical signals to the wavelength multiplexer 36. As explained in the foregoing, the optical signals released from the variable wavelength transmitting units II 30, III 31, IV 32, V 33, VI 34 and VII 35 respectively have wavelengths λ5, λ7, λ6, λ4, λ2 and λ1. Since the optical signals released from the seven variable wavelength transmitting units have mutually different wavelengths under the control of the wavelength control unit 5, these optical signals are mixed without mutual interference in the wavelength multiplexer 36, whereby the lights of all the wavelengths enter the optical fiber 37 and are transmitted to the downstream adjacent node device II 58.

Also in the operation time T3, the terminal equipment I 45 (terminal equipment aa) writes, in the header portion of a packet to be transmitted, the address of the terminal equipment II 46 (terminal equipment eb) of the destination node device V 61 and the information on the wavelength λ7 which is different from the transmission wavelengths λ3, λ5 in the transmission wavelength area of the header of the packets A, B and sends the packet to the separation-insertion unit I 15 of the node device I 57, through the sub-transmission path I 38. This packet is hereinafter called the packet C. The packet C is inserted by the separation-insertion unit I 15 in a gap in the packet flow, and is sent to the buffer I 222. The destination of the packet C is also the terminal equipment connected to the node device V 61, and, for reaching the node device V 61, there are required four relaying operations including that in the local (self) node device I 57. Therefore the decoder 2301 directs the output of the demultiplexer 2305 to the FIFO 2307 whereby the packet C is written therein.

The reading of the packet B from the buffer and the packet transmission in the operation time T3 are conducted in a similar manner as explained in the foregoing. The ROM counter 84 of the wavelength control unit 5 sends a read address value 2 simultaneously to the wavelength control tables I–VII, for reading the contents thereof. In this operation, the content read from the wavelength control table I is the control signal corresponding to the wavelength λ5, which is supplied to the variable wavelength transmitting unit I 229. In the dual port memory reading time Td within the operation time T3, no packet is supplied to the variable wavelength transmitting unit since no packet is stored in the memory region V. In the FIFO reading time Tf (=operation time T−Td) within the operation time T3, the read control unit 83 of the buffer read control unit 3 sends a control signal for enabling the reading of the FIFO 2307 and disabling the reading of the dual port memory 2306 to the selector 2308, which in response transmits the packet B stored in the FIFO 2307 to the variable wavelength transmitting unit I 29. In the operation time t3, the variable wavelength transmitting unit I 29 is set at a transmission wavelength λ5 by the read address value 2, whereby the packet B is converted into the optical signal of a wavelength λ5 and is supplied to the wavelength multiplexer 36.

The packet C in the operation time T4 is similarly read from the FIFO 2307 of the buffer I and through the selector 2308, and converted by the variable wavelength transmitting unit I 29 into an optical signal of λ7 and supplied to the wavelength multiplexer 36.

Consequently, the packets A, B and C are released to the optical fiber 37 from the node device I 57, respectively in the operation times T2, T3 and T4. The released packets A, B and C are respectively received, in the operation times T3, T4 and T5, by the fixed wavelength receiving units III 10, V 12 and VII 14 in the node device II 58.

Function of Node Device II 58

In the following there will be explained the function of the node device II 58 with reference to FIG. 10. In the operation time T3, the fixed wavelength receiving unit III 10 receives the packet A in the form of an optical signal of wavelength λ3. As the packet A is not addressed to the terminal equipments connected to this node device, it is not separated in the separation unit but is transmitted to the buffer III 224, in which the decoder 2301 reads the address portion of the entered packet A and discriminates whether the packet A can reach the node device connected to the destination terminal equipment within two relaying operations including that in the local (self) node device. The destination of the packet A is a unit of terminal equipment connected to the node device V 61, and, for reaching the node device V 61, the packet A has to pass three variable wavelength transmitting units constituting the channel alteration units. As the packet A cannot reach the destination within two relaying operations, the decoder 2301 directs the output of the demultiplexer 2305 to the FIFO 2307 whereby the packet A is written therein.

In the operation time T4, the fixed wavelength receiving unit V 12 receives the packet B as an optical signal of wavelength λ5 and sends it to the buffer V 226, in which the decoder 2301 directs, as in the case of packet A, the output of the demultiplexer 2305 to the FIFO 2307 whereby the packet B is written therein.

Also in the operation time T4, the read address value 0 (cf. FIG. 8) from the ROM counter 84 of the wavelength control unit 5 controls the variable wavelength transmitting units III, V and VII respectively at transmission wavelengths λ5, λ6 and λ2, whereby the packet A is converted by the variable wavelength transmitting unit III 31 into an optical signal of λ5 and transmitted to the node device III 59 in the FIFO read time Tf (=operation time T−Td) within the operation time T4.

In the operation time T5, the fixed wavelength receiving unit VII 14 receives the packet C as an optical signal of wavelength λ7. Also the packet B is transmitted by the variable wavelength transmitting unit V 33, as an optical signal of λ4, to the node device III 59.

In the operation time T6, the packet C is transmitted by the variable wavelength transmitting unit VII 35, as an optical signal of λ3, to the node device III 59.

Node Device III 59

In the following there will be explained the function of the node device III 59 with reference to FIG. 11. The packets A, B and C entered into the node device III 59 have to be transmitted by two channel alteration units before reaching the destination, and the control in this node device in combination with the designation of the transmission wavelength in the transmitting terminal equipment best represents the feature of the present invention. It is assumed that the packets A, B and C are respectively received, in operation times T5, T6 and T7 by the fixed wavelength receiving units V 12, IV 11 and III 10 of the node device III 59.

In the operation time T5, the fixed wavelength receiving unit V 12 receives the packet A in the form of an optical signal of wavelength λ5 and sends it to the buffer V 226, in which the decoder 2301 reads the address portion of the entered packet A and compares the read address information with the address information in Table 4. The destination of the packet A is the terminal equipment eb connected to the node device V 61, and, for reaching the node device V 61, there are required two relaying operations including that in the present node device III 59. Since the received packet reaches the destination node device by two relaying operations, the transmission of the received packet has to be made at a wavelength matching the transmission wavelength information in the header portion. Consequently the decoder 2301 directs the output of the demultiplexer 2305 to the dual port memory 2306 and sends an instruction for reading the transmission wavelength information contained in the header portion of the packet to the wavelength decoder 2302, which in response reads the wavelength λ3 from the transmission wavelength information in the header portion of the packet A and provides the write address counter 2303 with a write start address A3 of the memory region III corresponding to such transmission wavelength, whereby the packet A is stored in the memory region III of the dual port memory 2306 in the buffer V 226.

In the operation time T6, the fixed wavelength receiving unit IV 11 receives the packet B in the form of an optical signal of wavelength λ4 and sends it to the buffer IV 225, in which the decoder 2301 reads the address portion of the entered packet B and compares the read address information with the address information in Table 3. The destination of the packet B is the terminal equipment eb connected to the node device V 61, and, for reaching the node device V 61, there are required two relaying operations including that in the present node device III 59. Since the received packet reaches the destination node device by two relaying operations, the decoder 2301 directs the output of the demultiplexer 2305 to the dual port memory 2306 and sends an instruction for reading the transmission wavelength information contained in the header portion of the packet to the wavelength decoder 2302, which in response reads the wavelength λ5 from the transmission wavelength information in the header portion of the packet B and provides the write address counter 2303 with a write start address A5 of the memory region V corresponding to such transmission wavelength, whereby the packet B is stored in the memory region V of the dual port memory 2306 in the buffer V 226.

In the operation time T6, the ROM counter 84 of the wavelength control unit 5 sends a read address value 4 to the wavelength control tables I 85–VII 91 (cf. FIG. 8), whereby the variable wavelength transmitting unit V 33 is set at a transmission wavelength λ3 (cf. Table 1). In the dual port memory read time Td within the operation time T6, the read control unit 83 of the buffer reading control unit 3 sends a control signal for enabling the reading of the dual port memory 2306 and disabling the reading of the FIFO 2307 to the selector 2308. In response to the read address value 4 from the ROM counter 84 of the wavelength control unit 5, each buffer control table provides the address counter 2304 with a control signal indicating the memory region, from which the packet is to be read, in the respective dual port memory. For example the buffer control table V 80 provides the address counter 2304 with a head address A3 of the memory region III storing the packet A. Thus the packet A is supplied through the selector 2308 to the variable wavelength transmitting unit V 33, then converted therein into an optical signal of λ3 and supplied to the wavelength multiplexer 36. Also in the operation time T6, the variable wavelength transmitting units IV 32 and III 31 have respectively transmission wavelengths λ1 and λ2.

In the operation time T7, the fixed wavelength receiving unit III 10 receives the packet C, then controlled in a similar manner as in the case of the packet A and B, and stored in the memory region VII corresponding to the transmission wavelength λ7 contained in the header portion of the packet C.

In the operation time T8, the ROM counter 84 of the wavelength control unit 5 sends a read address value 6 to the wavelength control tables I 85–VII 91 (cf. FIG. 8). The wavelength control table IV 88 sends a control signal corresponding to a wavelength λ5 to the variable wavelength transmitting unit IV 32, which is in response set at a transmission wavelength λ5 (cf. Table 1). In synchronization, the read control unit 83 sends, in the dual port memory reading time Td within the operation time T8, a control signal for enabling the reading of the dual port memory 2306 and disabling the reading of the FIFO 2307 to the selector 2308, which in response connects the dual port memory 2306 with the variable wavelength transmitting unit IV 32. In response to the read address value 6 from the ROM counter 84 of the wavelength control unit 5, each buffer control table provides the read address counter 2304 with an offset value of the memory region, from which the packet is to be read, in the dual port memory 2306. For example the buffer control table IV 79 provides the address counter 2304 with a head address A5 of the memory region V according to Table 2. Thus the packet B stored in the memory region V of the dual port memory 2306 is supplied through the selector 2308 to the variable wavelength transmitting unit IV 32, then converted therein into an optical signal of λ5 and supplied to the wavelength multiplexer 36.

In an operation time T10, the variable wavelength transmitting unit III 31 transmits the packet C as an optical signal of λ7 to the node device IV 60.

Function of Node Device IV 60

In the following there will be explained the function of the node device IV 60 with reference to FIGS. 12 and 13. It is assumed that the packets A, B and C are respectively received, in the operation times T7, T9 and T11, by the fixed wavelength receiving units III 10, V 12 and VII 14 in the node device IV 60.

In the operation time T7, the fixed wavelength receiving unit III 10 receives the packet A in the form of an optical signal of wavelength λ3 and sends it to the buffer III 224, in which the decoder 2301 reads the address portion of the packet A and compares the read address information with the address information in Table 5. Since the destination of the packet A is the terminal equipment II 46 (terminal equipment eb) connected to the adjacent node device V 61, the decoder 2301 directs the output of the demultiplexer 2305 to the dual port memory 2306 and provides the write read address counter 2303 with a predetermined write start address A2 for the packet A according to the above-mentioned read address information. In response, the write address counter 2303 provides the dual port memory 2306 with an identification signal of the memory region in which the packet A is to be written, starting from the write start address value, whereby the packet A is read when the variable wavelength transmitting unit is set at a transmission wavelength λ2 and written in the memory region II.

In the operation time T8, the ROM counter 84 of the wavelength control unit 5 sends a read address value 4 simultaneously to the wavelength control tables I–VII to output the contents thereof. The wavelength control table III 87 sends a control signal corresponding to a wavelength λ2 to the variable wavelength transmitting unit III 31, which is thus set at a transmission wavelength λ2. In synchronization, in the dual port memory read time Td within the operation time T8, the read control unit 83 of the buffer reading control unit 3 sends a control signal for enabling the reading of the dual port memory 2306 and disabling the reading of the FIFO 2307 to the selector 2308, which in response connects the dual port memory 2306 and the variable wavelength transmitting unit III 31. Also in response to the read address value 4 from the ROM counter 84 of the wavelength control unit 5, the buffer control table III 78 provides the read address counter 2304 with a head address A2 of the memory region. Thus the packet A stored in the memory region II of the dual port memory 2306 is supplied through the selector 2308 to the variable wavelength transmitting unit III 31, then converted therein into an optical signal of λ2 and supplied to the wavelength multiplexer 36.

In the operation time T9, the fixed wavelength receiving unit V 12 receives the packet B in the form of an optical signal of wavelength λ5 and sends it to the buffer V 226. The decoder 2301 thereof reads the address portion of the entered packet B, and compares the read address information with the address information of Table 5. Since the destination of the packet B, like the packet A, is also the terminal equipment II 46 (terminal equipment eb) connected to the adjacent node device V 61, the decoder directs the output of the demultiplexer 2305 to the dual port memory 2306 and outputs a write start address value A2 of the packet B to the write address counter 2303, whereby the packet B is stored in the memory region II of the dual port memory 2306.

In the operation time T11, the packet C is stored, like the packets A and B, in the memory region II of the dual port memory 2306.

The packets B and C are read from the memory region II when the variable wavelength transmitting unit connected to the buffer storing the packet is set at a transmission wavelength λ2, and transmitted as optical signals of a transmission wavelength λ2. Thus, as will be apparent from FIGS. 12 and 13, the packets B and C are respectively transmitted in operation times T13 and T18.

Function of Node Device V 61

In the following there will be explained the function of the node device V 61 with reference to FIG. 14. It is assumed that the packets A, B and C are received, respectively in operation times T9, T14 and T19, by the fixed wavelength receiving unit II 9 in the node device V 61.

As the destination terminal equipment is connected to this node device, the packet A received in the operation time T9 is separated in the separation-insertion unit II 16 from the packets to be transmitted to the buffer II 223, and is transmitted to the destination terminal equipment II 46 (terminal equipment eb). Similarly, the packet B received in the operation time T14 is separated in the separation-insertion unit II 16 from the packets to be transmitted to the buffer II 223 and transmitted to the terminal equipment II 46 (terminal equipment eb). Also the packet C received in the operation time T19 is similarly transmitted to the terminal equipment II 46 (terminal equipment eb).

Thus the transmission control method of the present invention can resolve the drawback of long waiting time of the packets in a node device immediately upstream of the node device to which the destination receiving terminal equipment is connected, thereby allowing to reduce the delay in transmission.

The foregoing embodiment shows a network system with five node devices, but the number of such node devices is not particularly limited and the present invention is applicable if there are present at least three node devices. Also in such case, the waiting time of the packets in the buffer can be reduced by setting the wavelengths of the variable wavelength transmitting units in case the node device connected to the destination terminal equipment can be reached by two more relaying operations.

Also the present invention is not limited by the number of terminal equipments connected to each node device, in addition to the number of the node devices.

Third Embodiment

In the foregoing embodiments, the channel alteration unit for switching the channels is composed of the variable wavelength transmitting units provided respectively corresponding to the input channels, and such configuration allows to dispense with the switch for channel shifting, thereby simplifying the configuration. However the present invention is not limited to such configuration but can be applied to a configuration employing switches.

In the configuration employing the above-mentioned variable wavelength transmitting units, the transmission wavelength of each variable wavelength transmitting unit is varied in succession. In the foregoing embodiments, the wavelengths are numbered as $\lambda 1, \lambda 2, \ldots, \lambda 7$ in the increasing or decreasing order of the wavelength, and the channel alteration is so patterned as to at first select the first wavelength, then to select odd-numbered wavelengths in succession in the increasing order to the largest odd-numbered wavelength, then to select the largest even-numbered wavelength, to select the even-numbered wavelengths in succession in the decreasing order, and to return to the first wavelength, such as $\lambda 1, \lambda 3, \lambda 5, \lambda 7, \lambda 6, \lambda 4, \lambda 2, \lambda 1$, thereby minimizing the amount of shift of the wavelength at the wavelength switching and allowing to adopt a same wavelength shifting pattern in all the variable wavelength transmitting units. (There may also be adopted a pattern of at first selecting the second wavelength, then selecting the even-numbered wavelengths in succession in the increasing order to the largest even-numbered wavelength, then selecting the largest odd-numbered wavelength, further selecting the odd-numbered wavelengths in succession in decreasing order and returning to the second wavelength.)

Even in such configuration, there is required a certain time for stabilization of the wavelength after the wavelength shift, depending on the characteristics of the variable wavelength transmitting units such as variable wavelength semiconductor lasers of distributed feedback type or distributed reflection type.

The following embodiment resolves such drawback associated with the wavelength shift, by employing a switch configuration in the channel alteration unit. As in the foregoing embodiments, the following embodiment employs a predetermined pattern in switching the connection between the input channels and the output channels, and utilizes a configuration of reading, from the buffer corresponding to each input channel, a packet to be outputted through an output channel connected according to the connection of the buffers with the respective output channels through the channel alteration unit, thereby dispensing with the arbitration control.

Figure 24B:
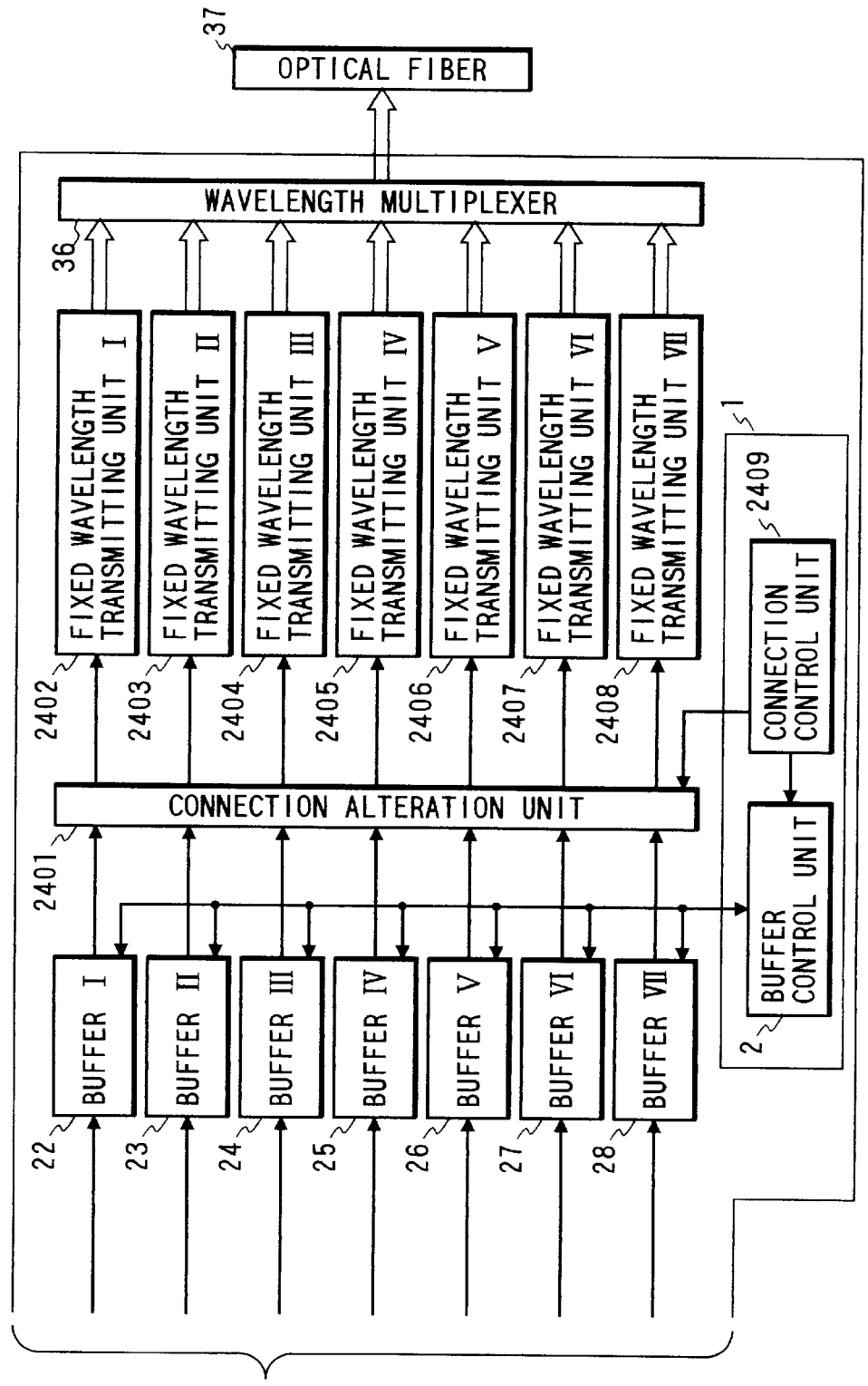
FIG. 24, which is composed of FIGS. 24A and 24B is a view showing the configuration of a node device employed in a third embodiment of the present invention.

FIGS. 24A and 24B show the configuration of a node device of the present embodiment, employing a connection alteration unit 2401 as the channel alteration unit, in contrast to the variable wavelength transmitting units employed in the first embodiment. As the channel alteration in the present embodiment is executed by the connection alteration unit, the wavelength control unit in the first embodiment is replaced by a connection control unit 2409. The connection alteration unit, having a configuration to be explained later, is equivalent in function to the variable wavelength transmitting units provided in the first embodiment respectively corresponding to the input channels, and the connection control unit is also equivalent in function to the wavelength control unit in the first embodiment. Also the present embodiment utilizes optical communication, and for this purpose, there are provided fixed wavelength transmitting units I–VII (2402–2408) for converting the signals after the channel alteration into optical signals. Also in the present embodiment, there is employed wavelength division multiplexed transmission utilizing respectively different wavelengths as the plural channels between the node devices, so that respectively different wavelengths are fixedly assigned to the fixed wavelength transmitting units.

Figure 25:
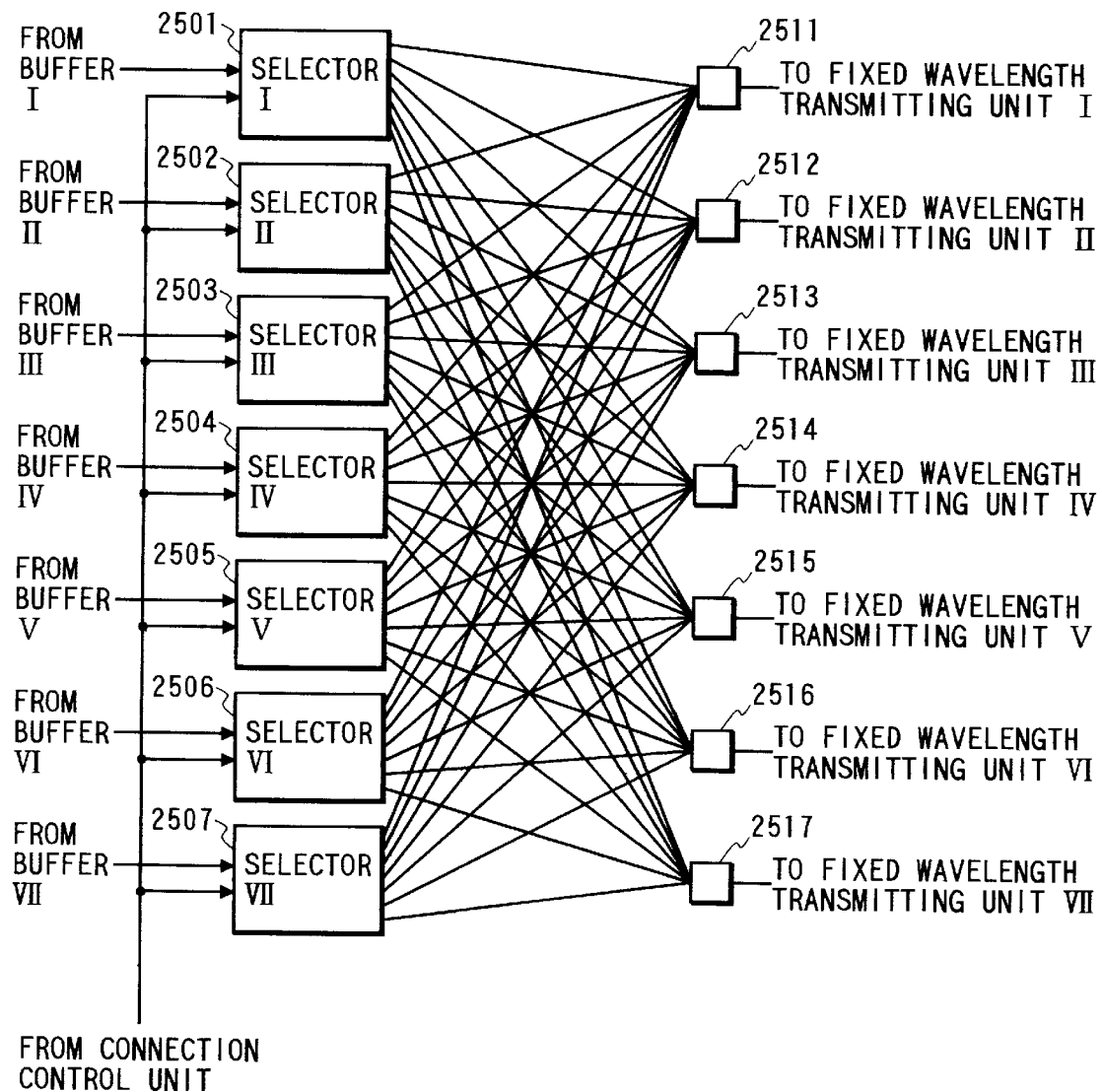
FIG. 25 is a view showing the configuration of a connection alteration unit employed in the third embodiment of the present invention.

FIG. 25 shows the configuration of the connection alteration unit, wherein each of selectors I 2501–VII 2507 select one of output terminals 2511–2517 according to the control by the connection control unit, thereby connecting buffers I–VII in a successive pattern to the output channels. As explained in the foregoing, the present embodiment employs optical transmission between the node devices and utilizes electrical signals for the channel alteration, so that the signals released from the output terminals 2511–2517 are supplied to the fixed wavelength transmitting unit I–VII and converted into optical signals therein.

Figure 26:
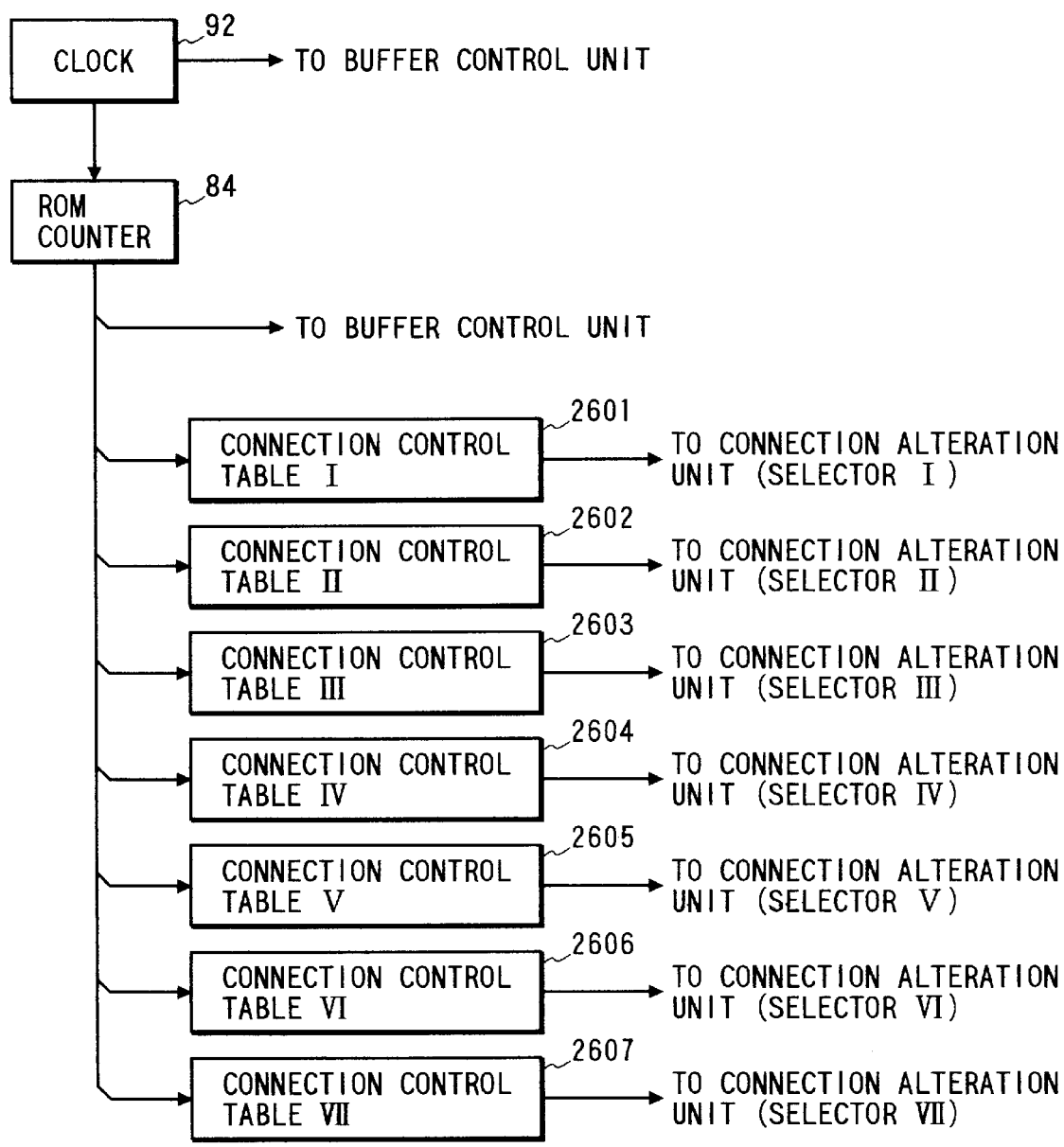
FIG. 26 is a view showing the configuration of a connection control unit employed in the third embodiment of the present invention.

FIG. 26 shows the configuration of the connection control unit, which is similar in configuration to the wavelength control unit in the first embodiment, except that the wavelength control tables are replaced by connection control tables. The outputs of these tables are supplied to the respectively corresponding selectors of the connection alteration unit. In FIG. 25, the signals from the connection control unit are supplied by a single line to the connection alteration unit and are distributed to the selectors, but such configuration may be suitably modified as long as the signals from the tables are supplied to the respective selectors (connection control tables I, II, III, IV, V, VI and VII respectively corresponding to selectors I, II, III, IV, V, VI and VII). Each table may have any pattern as long as plural inputs are not simultaneously connected to a single output. Such pattern can be generated almost limitlessly, and can be arbitrarily selected because, in the configuration of the present embodiment with selectors, it is no longer necessary to consider minimization of the wavelength shift which is desirable for example in the first embodiment, but for the purpose of simplicity of explanation, patterns similar to those employed in the first and second embodiments will be adopted also in this embodiment. In the following there are shown the contents of the tables, wherein the numerals correspond to the ordinal numbers of the output terminals I–VII. Also since the present embodiment employs connection control tables similar to the wavelength control tables in the first and second embodiments, the buffer control tables are identical with those in the first and second embodiments.

TABLE 6

| Table name | Address | | | | | | |
|---|---|---|---|---|---|---|---|
| | 0 | 1 | 2 | 3 | 4 | 5 | 6 |
| Connection control table I | 1 | 3 | 5 | 7 | 6 | 4 | 2 |
| Connection control table II | 3 | 5 | 7 | 6 | 4 | 2 | 1 |
| Connection control table III | 5 | 7 | 6 | 4 | 2 | 1 | 3 |
| Connection control table IV | 7 | 6 | 4 | 2 | 1 | 3 | 5 |
| Connection control table V | 6 | 4 | 2 | 1 | 3 | 5 | 7 |
| Connection control table VI | 4 | 2 | 1 | 3 | 5 | 7 | 6 |
| Connection control table VII | 2 | 1 | 3 | 5 | 7 | 6 | 4 |

In the present embodiment, the output terminals selected by the selectors of the connection alteration unit are altered in succession according to above-shown connection control table, and, in synchronization with the alteration of the output terminals selected by the selectors at the input terminals for entering the signals from the buffers, the buffers output the packets to be transmitted by thus connected channels. As in the first and second embodiments, there are provided a time Td for packet transmission with channel designation, and a time Tf for packet transmission without channel designation.

The controls other than that in the above-explained connection alteration unit are same as in the first embodiment, for example the control, in passing a channel alteration unit (connection alteration unit) immediately preceding the last channel alteration unit before reaching the destination, of transmitting plural packets, which have to be transmitted in a same channel from the last channel alteration unit, within a predetermined time by respectively different channels, and, in the last channel alteration unit, transmitting such packets in a channel required for reaching the destination according to the addresses of the packets.

The above-explained channel alteration unit may naturally be adopted also in the configuration of the foregoing second embodiment in which the transmitting side effects transmission with channel information to be referred to in a channel alteration unit immediately preceding the last channel alteration unit, and such immediately preceding channel alteration unit effects transmission by referring to such channel information.

Also in the foregoing embodiments, for effecting the wavelength-division multiplexed communication between the node devices, the wavelength division multiplexed signal entered into the node device is divided by a divider and fixed wavelength receiving units receive the respectively corresponding wavelengths, but it is also possible to divide the signal, entered into the node device, by a wavelength demultiplexer into respectively wavelengths and to effect O/E conversion on each wavelength for storage in each buffer.

Also the foregoing embodiments employ, between the node devices, the wavelength division multiplexed transmission with a single optical fiber as the transmission path between the node devices, but it is also possible to employ separate transmission paths as the channels between the node devices. In such case it is no longer necessary to use the wavelength multiplexer 36 and the divider 7 shown in FIGS. 24A and 24B and to distinguish the received wavelength from other wavelengths. FIGS. 27A and 27B show such configuration, which employs a ribbon fiber consisting of a bundle of plural optical fibers, in order to facilitate installation of the plural transmission paths between the node devices.

The foregoing embodiments utilize optical transmission between the node devices, but the transmission may also be conducted by electrical signals, and, in such case, there can be dispensed with the receiving units for O/E conversion and the transmitting units for E/O conversion. Also in such case, a driver may be employed to alter the signal form, if that for processing in the node device is to be different from that for transmission between the node devices.

Also in the foregoing embodiments, particularly in the second embodiment, the node device is provided at least with information on the terminal equipment connected to the immediately adjacent and second adjacent two node devices, namely information on the connections of the terminal equipment with the channels, and discriminates, by comparing the address of the packet with such connection information, whether the received packet is to pass only one more (namely last) channel alteration unit or a channel alteration unit immediately preceding the last one, but such discrimination may be achieved in various configurations. In a configuration, the transmitting source provides each packet with the number of channel alteration units to be passed by the packet before reaching the destination, then the channel alteration units relaying such packet subtract such number in succession, and a buffer and a channel alteration unit, having received plural packets which have two or more passings and have to be transmitted in a same channel in the next channel alteration unit, transmit such plural packets in respectively different channels. For transmitting such plural packets in respectively different channels, there may be adopted a configuration as in the first embodiment of monitoring the packets entered within a predetermined time and transmitting such entered packets as mentioned above in the respectively different channels, or a configuration as in the second embodiment of attaching reference channel information to the packet in advance at the transmitting side and effecting transmission by referring to such channel information. There may also be adopted a configuration in which an address indicating each channel alteration unit (or indicating each node device since each node device contains a channel alteration unit in the foregoing embodiments) is assigned to each channel alteration unit (or node device), then the transmitting side attaches, to each packet, information indicating a channel alteration unit in which the plural packets are to be transmitted in respectively different channels, and the corresponding buffer and channel alteration unit effect transmission according to such information.

In case the channel alteration is conducted, as in the first and second embodiments, by the variable channel transmitting units respectively corresponding to the input channels, there is required a configuration for separately extracting the channels from the outputs of the respectively variable channel transmitting units. Therefore, in each node device, the separation unit or the separation-insertion unit for effect separation (insertion) of the packet from each channel is preferably positioned in front of the channel alteration unit, but, in case of employing a channel alteration unit in which the output terminals correspond to the channels as in the third embodiment, the channel alteration unit may be positioned in front of the separation unit since the component for channel separation is unnecessary. In either case, the plural packets in proximity which are to be transmitted in a same channel from the last channel alteration unit are transmitted in respectively different channels at a point where such packets are to pass two more channel alteration units before reaching the destination.

According to the present invention, the plural packets, which have to be transmitted by a same channel from a certain first channel alteration unit, are less likely entered by a same channel into such first channel alteration unit, so that such plural packets which have to be transmitted by a same channel from the first channel alteration unit have a higher probability of being transmitted faster. Consequently there is enabled efficient packet transmission, and an efficient network system can thus be realized.

What is claimed is:

1. A transmission control method for a network system provided with plural channel alteration units each of which is adapted to receive signals through plural channels and to output each of the signals entered by said plural channels in any of plural channels, and adapted for effecting signal transmission among said plural channel altheration units, comprising a step of:

entering mutually proximate plural signals which have to be outputted by a designated channel from a first channel alteration unit, by a second channel alteration unit; and transmitting said plural signals entered in said entering step into said first channel alteration unit using respectively different channels.

2. A transmission control method according to claim 1, wherein said second channel alteration unit is proximate to said first channel alteration unit.

3. A transmission control method according to claim 2, wherein the mutually proximate plural signals have channel designation information for the second channel alteration unit for designating output channels at the output therefrom, the channel designation information indicate respectively different channels, and said second channel alteration unit is adapted to output said mutually proximate plural signal in the channels according to the channel designation information.

4. A transmission control method according to claim 1, wherein said channel alteration unit is a ed to receive the signals transmitted through said plural channels through a storage unit for temporarily storing said signals, and said storage unit is adapted to store the input signals in divided manner according to the input channels and to output said signals from different output units respectively corresponding to the input channels.

5. A transmission control method according to claim 4, wherein said storage unit stores the input signals in further divided manner in signals to be outputted with designation of channels from the channel alteration unit which outputs the signals entered from said storage unit, and signals to be outputted without designation of channels.

6. A transmission control method according to claim 4, wherein said storage unit stores the input signals in further divided manner according to the channels at the output of said signals from the channel alteration unit which outputs the signals entered from said storage unit.

7. A transmission control method according to claim 4, wherein said channel alteration unit is adapted to alter channels capable of outputting the signals entered from said separate output units, and said storage unit is adapted to output, from each of said separate output units, the signal to be outputted by a channel which is set by said channel alteration unit for the output of the signal from each of said separate output units.

8. A transmission control method according to claim 7, wherein said channel alteration unit is adapted to so alter the channels that plural ones among said separate output units can effect simultaneous outputs to mutually different channels.

9. A transmission control method according to claim 8, wherein said channel alteration unit effects alteration of said channels according to a predetermined pattern.

10. A transmission control method according to claim 4, wherein said channel alteration unit includes switching means, said switching means includes input terminals for respectively receiving signals from said separate output units and output terminals corresponding to said plural channels, for switching the connection relationship between said input terminals and said output terminals, said channel alteration unit is adapted to alter said connection relationship, and said storage unit is adapted to output, respectively from said separate output units, the signals to be outputted from the output terminals connected, according to said connection relationship set by said channel alteration unit, to the input terminals respectively corresponding to said separate output units.

11. A transmission control method according to claim 4, wherein said channel alteration unit includes variable channel transmission units for respectively receiving the signals from said separate output units and is adapted to alter the transmission channels of said variable channel transmission units, and said storage unit is adapted to output, respectively from said separate output units, the signals to be outputted by the channels which are set for the signal outputs from said separate output units by said variable channel transmission units respectively corresponding to said separate output units.

12. A transmission control method according to claim 1, wherein each of the signals transmitted by said plural channels is separated at a predetermined position from said channel and reaches a destination.

13. A transmission control method according to claim 1, wherein each of said signals is provided with address information of the destination.

14. A transmission control method according to claim 13, wherein said address information includes information indicating a channel for the output of said signal in said first channel alteration unit, and said first channel alteration unit is adapted to output said signal by a channel according to the information indicating the channel for the output of said signal in said first channel alteration unit.

15. A network system for effecting signal transmission by plural channels, comprising:

at least first and second channel alteration units each of which is adapted to receive signals through plural channels and to output each of the signals entered by said plural channels in any of plural channels, wherein said second channel alteration unit comprises:

means for recognizing that mutually proximate signals which have to be outputted by a designated channel from said first channel alteration unit is entered; and means for transmitting the plural entered signals into said first channel alteration unit using respectively different channels.

16. A network system according to claim 15, wherein said second channel alteration unit is proximate to said first channel alteration unit.

17. A network system according to claim 16, wherein said second channel alteration unit includes monitor means for monitoring the signals entered through said plural channels and, said second channel alteration unit monitors the signals entered by said plural channels, and, in case plural signals, which have to be outputted by a designated same channel among said plural channels from said first channel alteration unit, are received within a predetermined time, outputs said plural signals by respectively different channels.

18. A network system according to claim 15, wherein said channel alteration unit is adapted to receive the signals transmitted through said plural channels through a storage unit for temporarily storing said signals, and said storage unit is adapted to store the input signals in divided manner according to the input channels and to output said signals from different output units respectively corresponding to the input channels.

19. A network system according to claim 18, wherein said storage unit stores the input signals in further divided manner in signals to be outputted with designation of channels from the channel alteration unit which outputs the signals entered from said storage unit, and signals to be outputted without designation of channels.

20. A network system according to claim 18, wherein said storage unit stores the input signals in further divided manner according to the channels at the output of said signals from the channel alteration unit which outputs the signals entered from said storage unit.

21. A network system according to claim 18, wherein said channel alteration unit is adapted to alter channels capable of outputting the signals entered from said separate output units, and said storage unit is adapted to output, from each of said separate output units, the signal to be outputted by a channel which is set by said channel alteration unit for the output of the signal from each of said separate output units.

22. A network system according to claim 21, wherein said channel alteration unit is adapted to so alter the channels that plural ones among said separate output units can effect simultaneous outputs to mutually different channels.

23. A network system according to claim 22, wherein said channel alteration unit effects alteration of said channels according to a predetermined pattern.

24. A network system according to claim 18, wherein said channel alteration unit includes switching means, said switching means includes input terminals for respectively receiving signals from said separate output units and output terminals corresponding to said plural channels, for switching the connection relationship between said input terminals and said output terminals, said channel alteration unit is adapted to alter said connection relationship, and said storage unit is adapted to output, respectively from said separate output units, the signals to be outputted from the output terminals connected, according to said connection relationship set by said channel alteration units, to the input terminals respectively corresponding to said separate output units.

25. A network system according to claim 18, wherein said channel alteration unit includes variable channel transmission units for respectively receiving the signals from said separate output units, and said storage unit is adapted to output, respectively from said separate output units, the signals to be outputted by the channels which are set for the signal outputs from said separate output units by said variable channel transmission units respectively corresponding to said separate output units.

26. A network system according to claim 15, further comprising separation means for separating each of the signals transmitted through said plural channels from the channel, and each of the signals transmitted through said plural channels is separated by said separation means from said channel at a predetermined position.

27. A network system according to claim 26, wherein said channel alteration unit and said separation unit are provided in a node device.

28. A network system according to claim 15, further comprising an insertion unit for inserting a signal into one of said channels.

29. A network system according to claim 28, wherein said channel alteration unit and said separation unit are provided in a node device.

30. A network system according to claim 15, wherein each of said signals is provided with address information of the destination.

31. A network system according to claim 30, wherein said address information includes information indicating a channel for the output of said signal in said first channel alteration unit, and said first channel alteration unit is adapted to output said signal by a channel according to the information indicating the channel for the output of said signal in said first channel alteration unit.

32. A transmission control method according to claim 2, wherein said second channel alteration unit monitors the signals entered through said plural channels and, in case plural signals, which have to be outputted by a designated same channel among said plural channels from said first channel alteration unit, are received within a predetermined time, outputs said plural signals by respectively different channels.

33. A network system according to claim 16, wherein the mutually proximate plural signals have channel designation information for the second channel alteration unit for designating output channels at the output therefrom, the channel designation information indicate respectively different channels, and said second channel alteration unit includes means for reading the channel designation information and outputting said mutually proximate plural signal in the channels according to the channel designation information.

* * * * *

UNITED STATES PATENT AND TRADEMARK OFFICE
CERTIFICATE OF CORRECTION

PATENT NO.   : 6,038,236
DATED         : March 14, 2000
INVENTOR(S)  : Kazuhiko Houjou et al.

It is certified that error appears in the above-identified patent and that said Letters Patent is hereby corrected as shown below:

Title page,
Item [30], Foreign Application Priority Data, "Feb. 9, 1996" (both occurrences) should read -- Feb. 2, 1996 --.

Drawings,
Sheet No. 16: Figure 15, "COINSIDE" should read -- COINCIDE --.

Column 1,
Line 21, "plural" should read -- plural pieces of --, and "equipments" should read -- equipment --;
Line 23, "equipments" should read -- equipment --, and "are" should read -- is --;
Line 25, "are" should read -- is --; and
Line 28, "are" should read -- is --.

Column 2,
Line 21, "storing" should read -- store --.

Column 5,
Line 5, "wavelength" should read -- wavelengths --;
Line 14, "same" should read -- the same --; and
Line 24, "same" should read -- the same --.

Column 6,
Line 2, "sub transmission" should read -- sub-transmission --.

Column 10,
Line 28, "7," should read -- $\lambda 7$, --; and
Line 62, "same)" should read -- the same) --.

Column 11,
Line 35, "alterning" should read -- altering --;
Line 40, "such" should read -- in such --;
Line 44, "example" should read -- example, --;
Line 45, "same" should read -- a same --; and
Line 59, "receive" should read -- receives --.

UNITED STATES PATENT AND TRADEMARK OFFICE
CERTIFICATE OF CORRECTION

PATENT NO.   : 6,038,236
DATED        : March 14, 2000
INVENTOR(S)  : Kazuhiko Houjou et al.

It is certified that error appears in the above-identified patent and that said Letters Patent is hereby corrected as shown below:

<u>Column 12,</u>
Line 2, "the" should be deleted.

<u>Column 13,</u>
Line 22, "relation-ship" should read -- relationship --;
Line 35, "plural" should read -- the plural --;
Line 43, "input/" should read -- image input/ --;
Line 45, "example" should read -- example, --; and
Line 51, "also" should be deleted.

<u>Column 14,</u>
Line 9, "according" should read -- according to -- and "indication" should read -- indicating --.

<u>Column 15,</u>
Line 1, "25B" should be deleted;
Line 8, "24B" should read -- 24B, --; and
Line 36, "same" should read -- the same --.

<u>Column 16,</u>
Line 26, "later" should read -- later, --; and
Line 45, "example" should read -- example, --.

<u>Column 17,</u>
Line 34, "same" should read -- the same --;
Line 50, "cyclically" should read -- cyclical --;
Line 65, "a same" should read -- the same --; and
Line 66, "the node should read -- a node --.

<u>Column 18,</u>
Line 17, "drawback," should read -- a drawback, --;
Line 18, "packet" should read -- packets --;
Line 32, "relying" should read -- relaying --; and
Line 57, "respectively" should read -- respective --.

UNITED STATES PATENT AND TRADEMARK OFFICE
CERTIFICATE OF CORRECTION

PATENT NO.    : 6,038,236
DATED         : March 14, 2000
INVENTOR(S)   : Kazuhiko Houjou et al.

It is certified that error appears in the above-identified patent and that said Letters Patent is hereby corrected as shown below:

Column 19,
Line 8, "example" should read -- example, --.

Column 24,
Line 15, "units" should read -- unit --.

Column 25,
Line 52, "a same" should read -- the same --; and
Line 53, "specifically" should read -- specifically, --.

Column 26,
Line 39, "require" should read -- requires --; and
Line 60, "reading" should read -- read --.

Column 28,
Line 39, "equal to" should read -- equal in --;
Line 48, "unit" should read -- units --; and
Line 49, "unit" should read -- units --.

Column 30,
Line 18, "same" should read -- the same --.

Column 37,
Line 29, "equipments" should read -- equipment units --.

Column 39,
Line 37, "same" should read -- the same --; and
Line 62, "respectively" should read -- respective --.

Column 40,
Line 33, "destination," should read -- destination; --; and
Line 46, "packet" should read -- packets --.

Column 41,
Line 24, "altheration" should read -- alteration --; and
Line 47, "a ed" should read -- adopted --.

UNITED STATES PATENT AND TRADEMARK OFFICE
CERTIFICATE OF CORRECTION

PATENT NO.    : 6,038,236
DATED         : March 14, 2000
INVENTOR(S)   : Kazuhiko Houjou et al.

It is certified that error appears in the above-identified patent and that said Letters Patent is hereby corrected as shown below:

<u>Column 42,</u>
Line 61, "is" should read -- are --.

Signed and Sealed this

Twenty-fifth Day of February, 2003

JAMES E. ROGAN
*Director of the United States Patent and Trademark Office*